US007662738B2

(12) United States Patent
Krekeler et al.

(10) Patent No.: US 7,662,738 B2
(45) Date of Patent: Feb. 16, 2010

(54) COUNTER WEAPON CONTAINMENT

(75) Inventors: Mark P. S. Krekeler, Centreville, VA (US); Stephen C. Elmore, Stafford, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 348 days.

(21) Appl. No.: 11/419,579

(22) Filed: May 22, 2006

(65) Prior Publication Data

US 2007/0149842 A1 Jun. 28, 2007

Related U.S. Application Data

(60) Provisional application No. 60/682,830, filed on May 20, 2005.

(51) Int. Cl.
*B01J 29/06* (2006.01)

(52) U.S. Cl. .............................................. 502/63; 588/9

(58) Field of Classification Search ..................... 588/9, 588/13, 20; 502/411, 63
See application file for complete search history.

(56) References Cited

U.S. PATENT DOCUMENTS

| | | | | |
|---|---|---|---|---|
| 3,959,172 | A * | 5/1976 | Brownell et al. | 588/14 |
| 4,182,785 | A * | 1/1980 | Price | 427/361 |
| 4,913,850 | A | 4/1990 | Puppe et al. | |
| 5,502,267 | A * | 3/1996 | Aubert | 588/250 |
| 6,372,333 | B1 | 4/2002 | Sugiyama et al. | |
| 2007/0112241 | A1 | 5/2007 | Krekeler et al. | |

OTHER PUBLICATIONS

Lacy(Industrial and Engineering Chemistry, 1954, vol. 45, pp. 1061-1065).*
Liu et al(Effect of silica sand on activation energy for diffusion of sodium ions in montmorillonite and silica sand mixture, J. Contam Hydro, 61 (2003), 85-93).*
Lacy, WJ, "Decontamination of Radioactively Contaminated Water by Slurrying with Clay", Industrial & Engineering Chemistry, 1954.
Anderson, J.R., "Laboratory 6, Sand Sieve Analysis", Department of Geology, Georgia Perimeter College, Jun. 6, 2003.
Schroeder, Paul, "Lecture Notes for Clay Mineralogy", University of Georgia, Nov. 20, 2004, Lectures 3-5 and 19.
Choi, Sunkyung et al., "Cesium and Strontium Uptake to Clay Minerals and Their Weathering Products in a Caustic Waste", Department of Soil, Water, and Environmental Science, University of Arizona at Tucson, Mar. 28, 2004.
Gabor, M. et al., "Effect of Ambient Atmosphere on Solid State Reaction of Kaolin-Salt Mixtures", Clays and Clay Minerals, vol. 34, No. 5, pp. 529-533, 1986.
Knight, R.D. et al., "Geochemical Modeling: Mapping Soil Mineralogy by EDS Methods", Apr. 15, 2005.

* cited by examiner

*Primary Examiner*—Melvin C Mayes
*Assistant Examiner*—Michael Forrest
(74) *Attorney, Agent, or Firm*—David Yee; David G. Grossman

(57) ABSTRACT

A radioactive containment composition may be created for containing radionuclides from a radioactive material by mixing a clay mineral with water. This mixture may form an aqueous clay suspension, which in turn can be refined by filtering to remove coarse material. The aqueous clay suspension may be applied to a radioactive material, allowing the radionuclides to be exchanged with cations in the aqueous clay suspension. The resulting aqueous slurry may be collected, heated and analyzed.

3 Claims, 50 Drawing Sheets

| Examples of Exchange Reactions |
| --- |
| $\equiv XNa + H^{+} \Longleftrightarrow \equiv XH + Na^{+}$ |
| $\equiv XNa + CaCl^{+} \Longleftrightarrow \equiv XCaCl + Na^{+}$ |
| $\equiv XMg + NaCl^{+} \Longleftrightarrow \equiv XNaCl + Mg^{+}$ |
| $\equiv XMg + NaCl^{+} \Longleftrightarrow \equiv XNaCl + Mg^{+}$ |
| $2 \equiv XCa + Fe^{2+} \Longleftrightarrow \equiv X_2Fe + 2\ Ca^{2+}$ |
| $2 \equiv XNa + Mg^{+} \Longleftrightarrow \equiv X_2Mg + 2\ Na^{+}$ |

FIG. 6

COUNTER WEAPON CONTAINMENT

CROSS REFERENCE TO RELATED APPLICATIONS

The present application claims the benefit of provisional patent application Ser. No. 60/682,830 to Krekeler et al., filed on May 20, 2005, entitled "Counter Weapon Containment," which is hereby incorporated by reference.

BRIEF DESCRIPTION OF THE DRAWINGS

FIG. 6 shows examples of exchange reactions.

DETAILED DESCRIPTION OF THE INVENTION

Figure 1:
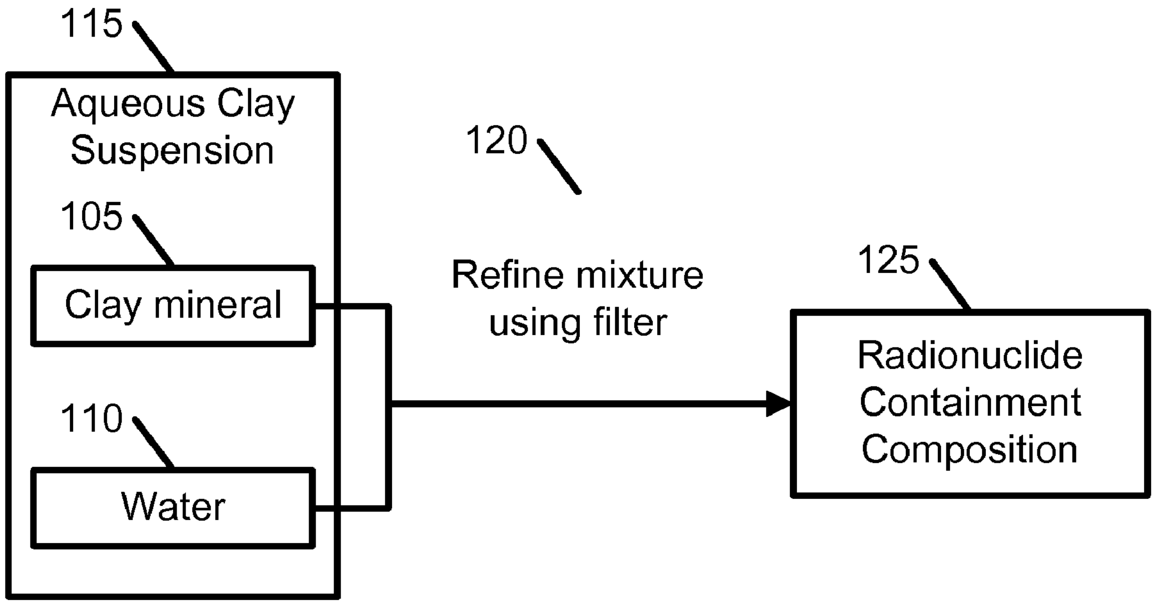
FIG. 1 shows an example of creating a radionuclide containment composition.

The invention embodies a radionuclide containment composition for containing radioactive materials. The radionuclide containment composition may comprise a mixture of a clay mineral and water to form an aqueous clay suspension. The mixture may be refined into a uniform suspension by filtering the mixture to remove coarse material.

I. Introduction

Radioactive isotopes (also referred to herein as radionuclides) are naturally occurring in the environment or are created using nuclear technologies, such as nuclear reactors, etc. Human exposure to many types of radioactive isotopes may lead to several detrimental health effects, such as cancer, skin burn, organ malfunction, etc. Examples of radioactive isotopes, which are of concern to human health, include, but are not limited to, americium-241 ($^{241}Am$), cesium ($^{134}Cs$, $^{137}Cs$), cobalt-60 ($^{60}Co$), iodine-131 ($^{131}I$), iridium-192 ($^{192}Ir$), plutonium ($^{238}Pu$, $^{239}Pu$, $^{240}Pu$, and $^{242}Pu$), strontium-90 ($^{90}Sr$), uranium-235 ($^{235}U$) and uranium-238 ($^{238}U$).

Radiological materials can be weaponized in many forms by terrorists. For instance, materials can be packed in a traditional explosive device and detonated in a public area. Such deployment is commonly referred to as a radiological dirty bomb or a radiological dispersal device (RDD).

One particular radioactive isotope of current interest that may be used in RDD is cesium-137 ($^{137}Cs$). Cesium-137 commonly occurs as $^{137}CsCl$ and as a major component of nuclear waste stream generated from nuclear technologies worldwide.

$^{137}Cs$ decays by emission of beta particles and gamma rays to barium-137 m ($^{137}Ba$), a short-lived decay product, which in turn decays to a nonradioactive form of barium ($^{134}Ba$). $^{137}Cs$ has a half-life of approximately 30 years.

As one of the most common radioactive isotopes used in various industries, $^{137}Cs$ can be implemented in numerous devices. Examples include, but are not limited to, moisture-density gauges in the construction industry, leveling gauges in the piping industry, thickness gauges in industries (such as metal, paper and film), and well-logging devices in the drilling industry.

Another fairly common radioactive isotope is $^{134}Cs$. Having similar properties to $^{137}Cs$, $^{134}Cs$ decays (e.g., beta decay) to $^{134}Ba$. The half life of $^{134}Cs$ is approximately 2 years. $^{134}Cs$ may be used in photoelectric cells in ion propulsion systems under development.

However, when comparing $^{137}Cs$ with $^{134}Cs$, $^{137}Cs$ tends to have more significant environment and health concerns than $^{134}Cs$. For instance, $^{137}Cs$ is often a greater environmental contaminant than $^{134}Cs$. Moreover, although $^{137}Cs$ is sometimes used in medical therapies to treat cancer, exposure to $^{137}Cs$ (like other radionuclides) can also increase the risk of cancer and damage tissue because of its strong gamma ray source. Nonetheless, $^{134}Cs$ can still be a concern for the environment.

Because of cesium's chemical nature, cesium can easily move through the environment, and thus making the cleanup of $^{137}Cs$ releases difficult. For example in April 1986, large amounts of $^{137}Cs$ were released during the Chernobyl incident. Significant amounts of $^{137}Cs$ were deposited in Europe and Asia. Today, $^{137}Cs$ can still be found in those areas. Healthwise, Great Britain's National Radiological Protection Board predicts that there will be up to 1,000 additional cancers over the next 70 years among the population of Western Europe exposed to fallout from the nuclear accident at Chernobyl, in part due to $^{137}Cs$. Yet, of course, the magnitude of the health risk depends on exposure conditions. These conditions include factors such as strength of the source, length of exposure, distance from the source, and whether there was shielding between you and the source (such as metal plating).

Although several routes may exist in delivering $^{137}Cs$ as a weapon, one expected route is dispersing $^{137}Cs$ in the form of radioactive cesium chloride powder ($^{137}CsCl$) in populated areas (e.g., downtowns, malls, etc.). Another anticipated route of dispersing $^{137}Cs$ is through water supplies. For example, if 5 kg of $^{137}CsCl$ were deposited and dispersed (whether via a dirty bomb or other means) in a large city (e.g., Chicago) having 5 m.p.h. winds, a computer model generated by the Los Alamos National Labs predicts that approximately 300 city blocks would be affected one hour after detonation. The high solubility in water and the relatively low hardness of $^{137}CsCl$ are both properties that are normally characteristic of an effective "radiological powder weapon."

In addition to $^{137}Cs$, it is well within the scope of this invention that other radioactive isotopes may be used as the radioactive ingredient in a radioactive material for use in a dirty bomb or some form of weapon. Examples include all of the radioactive isotopes previously mentioned.

To contain dispersed radioactive material as a weapon (e.g., RDD) having a radioactive isotope or radionuclide, a radionuclide containment composition may be used. The radionuclide containment composition is defined as an aqueous clay suspension comprising a mixture of a clay mineral and water. This suspension may be filtered to remove residual coarse material to impart a processed uniform suspension.

II. Radionuclide Containment Composition

Referring to FIG. 1, the radionuclide containment composition 125 can be made by mixing a clay mineral 105 with water 110 to form an aqueous clay suspension 115. This mixture 115 can be further refined by filtering the suspension to remove residual coarse material 120. Filtering may be achieved by using sieves with aperture sizes ranging from 300 μm to <38 μm.

A. Clay Mineral

Figure 2:
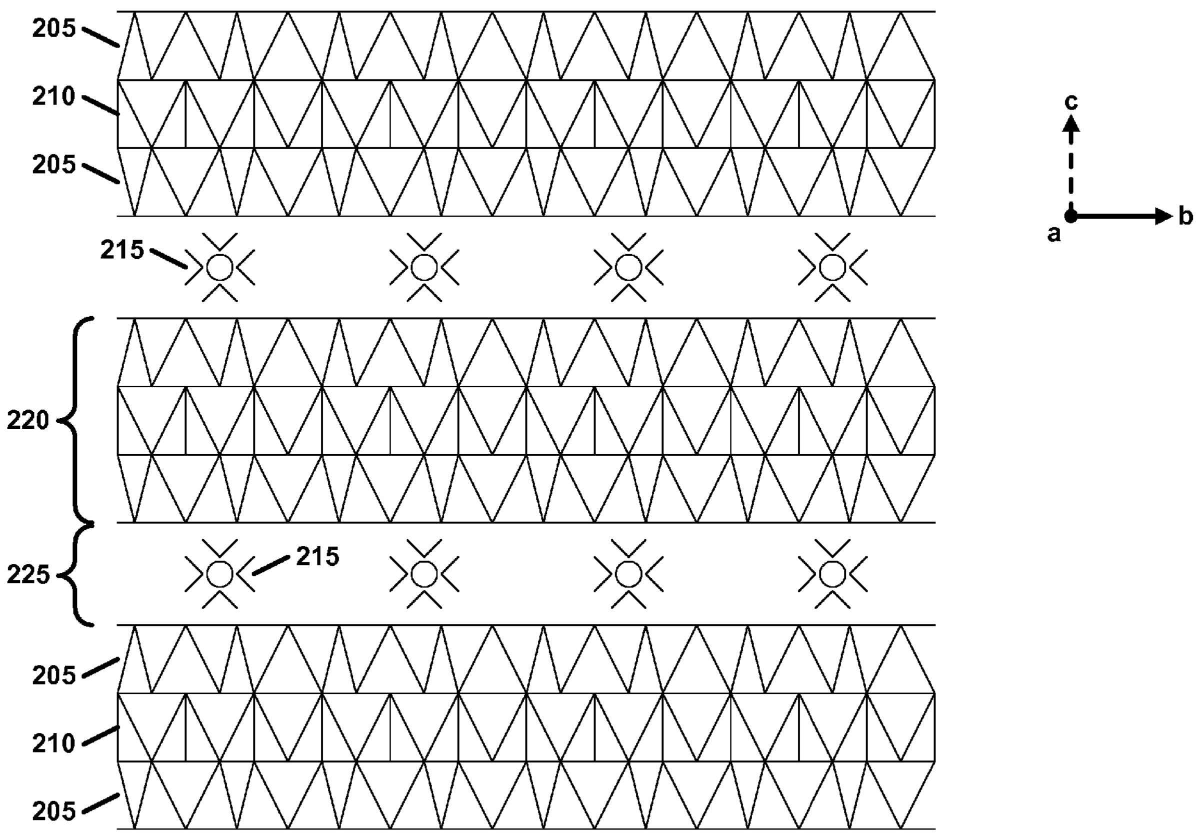
FIG. 2 shows the structure of an expanding 2:1 clay mineral.

The clay mineral is a layer silicate having at least one tetrahedral sheet 205 and an octahedral sheet 210, as shown in FIG. 2.

The tetrahedral sheet 205 is made up of a layer of horizontally linked, tetrahedral-shaped units coordinated to oxygen atoms and arranged in a hexagonal pattern. Each unit may include a central coordinated atom (e.g., $Si^{4+}$, $Al^{3+}$, $Fe^{3+}$, etc.) surrounded by (and maybe bonded to) oxygen atoms that, in turn, may be linked with other nearby atoms (e.g., $Si^{4+}$, $Al^{3+}$, $Fe^{3+}$, etc.).

The octahedral sheet 210 is made up of a layer of horizontally linked, octahedral-shaped units that may also serve as one of the basic structural components of silicate clay minerals. Arranged in an octahedral pattern, each unit may include a central coordinated metallic atom (e.g., $Al^{3+}$, $Mg^{2+}$, $Fe^{3+}$, $Zn^{2+}$, $Fe^{2+}$, etc.) surrounded by (and maybe bonded to) a oxygen atoms and/or hydroxyl groups. The oxygen atoms and/or hydroxyl groups may be linked with other nearby metal atoms (e.g., $Al^{3+}$, $Mg^{2+}$, $Fe^{3+}$, $Zn^{2+}$, $Fe^{2+}$, etc.). This combination may serve as inter-unit linkages that hold the sheet together.

Within both the tetrahedral and octahedral layers, $O^{2-}$ and/or $OH^{-}$ ions may be present.

Where only one tetrahedral and one octahedral sheet are present for each layer, the clay is known as a 1:1 clay. Where, for each layer, there are two tetrahedral sheets with the unshared vertex of each sheet pointing towards each other and forming each side of the octahedral sheet 220, the clay is known as a 2:1 clay.

Of particular interest are 2:1 clays. Examples include, but are not limited to, those from the smectite group, such as montmorillonite, bentonite, beidellite, hectorite, nontronite, sauconite, saponite, etc. Another example is illite-smectites. The crystalline structure includes a stack of layers interspaced with at least one interlayer site 225. Each interlayer site may include cations (e.g., $Na^{+}$, $K^{+}$, etc.) 215 or a combination of cations and water.

Depending on the composition of the tetrahedral 205 and octahedral 210 sheets, the layers may either have no charge or will have a net negative charge. If the layers are neutral in charge, the tetrahedral 205 and octahedral 210 sheets are likely to be held by weak van der Waals forces. If the layers are charged, this charge may be balanced by interlayer cations.

In one embodiment, the clay mineral is montmorillonite. Montmorillonite is a common smectite having one layer of aluminum atoms (i.e., middle layer) connected to two opposing layers of silicon atoms (i.e., outer layer) in a 2:1 layer structure. Its basic chemical formula, as a hydrous magnesium aluminum silicate, is $MgAl_2Si_5O_{14}.nH_2O$ or $MgO.Al_2O_35SiO_2.nH_2O$, where n for both may vary from 5 to 8. $H_2O$ may be approximately 20.0 to 25.0 percent, of which half of this volume may be found at a temperature of about 100° C. Some calcium may replace some of the magnesium. Alternatively, montmorillonte's chemical formula may also be written as:

$$R_{0.33}+(Al_{1.67}Mg_{0.33})Si_4O_{10}(OH)_2),\quad \text{with}\quad VI=-0.33 \text{ and } IV=0 \tag{1}$$

VI (denoted as such because of the 6-fold coordination) indicates the octahedral sheet and its charge. IV (denoted as such because of the 4-fold coordination) indicates the tetrahedral sheet and its charge. R is the exchangeable cation in the interlayer space. Variations of this chemical formula are also well known in the art.

Montmorillonite is a chief constituent of bentonite, a clay-like material which may be formed by altering volcanic ash. Bentonite is the name of the rock which includes largely of the mineral montmorillonite. Besides bentonite, montmorillonite may also be found in granite pegmatites as an altered product of some silicate mineral.

In another embodiment, the clay mineral is sodium montmorillonite (Na-montmorillonite). Na-montmorillonite is a 2:1 layer silicate which may be derived from bentonite. Two tetrahedral sheets, which may be composed predominantly of $Si^{4+}$ tetrahedrons, may be bonded to an octahedral sheet, which may be composed of $Mg^{2+}$, $Al^{3+}$ and $Fe^{3+}$ octahedrons. Each $Si^{4+}$ tetrahedron may be coordinated to oxygen atoms. Each octahedron may be coordinated to oxygen atoms and/or hydroxyl groups.

It should be noted that unless otherwise specified (e.g., distinguished separately), the description described herein with respect to montmorillonite also applies to M-montmorillonite, where M is an exchangeable cation.

Naturally, montmorillonite tends to have defects in its crystal structure. Most evident is the turbostratic stacking of the 2:1 layers. This defect structure is believed to be the cause of the small crystallite size commonly observed. Having a flake-like shape resembling a corn flake, crystallites commonly vary in diameter from approximately 10 micrometers to approximately 0.01 micrometers.

A distinguishing feature of montmorillonite is its ability to swell with water. After surpassing a certain swelling threshold, montmorillonite tends to slump and goes into pieces. Montmorillonite can expand from approximately 12 Å to approximately 140 Å in aqueous systems. Fundamentally, the reason for this expansion is that cation substitution (e.g., $Mg^{2+}$ for $Al^{3+}$) in the octahedral sheet combined with minimal cation substitution (e.g., $Al^{3+}$ for $Si^{4+}$) in the tetrahedral sheet may give rise to a low negative charge on the 2:1 layer. This result may cause the crystal structure to have weak bonding along [001]. In essence, this effect may give rise to exchange sites between the 2:1 layer that may take up $M^+$ or $M^{2+}$ cations from aqueous solutions.

The low negative charge on the 2:1 layer may enable cation exchange to take place. The charge deficiency in the 2:1 layer may need to be balanced by exchangeable cations. The quantity of cations required to create a net charge balance is called the cation exchange capacity.

Commonly, the cation exchange capacity of montmorillonite varies between about 80 and about 150 meq/100 g. The pH dependence on this physical property may be absent or negligible. The internal charge deficiency of the clay mineral may result in a net negative charge of the particle. Examples of exchangeable cations include, but are not limited to, sodium, calcium, magnesium, and potassium.

Cation exchangeability tends enable montmorillonite to remove heavy metals from water. Removal of heavy metals is often associated with, inter alia, significant impacts, such as wastewater treatment. Additionally, ion exchange may also remove cationic organics, resulting in polymer interaction.

The combination of ion exchange capacity and capacity to swell may allow the material to form flocculi with suspended solids that can be precipitated out. Removal of flocculi may be achieved via washing and/or centrifugation.

These features, along with its chemical composition, are key elements to montmorillonite's exchange behavior with cesium and other cations.

B. Aqueous Clay Suspension Preparation

Figure 3:
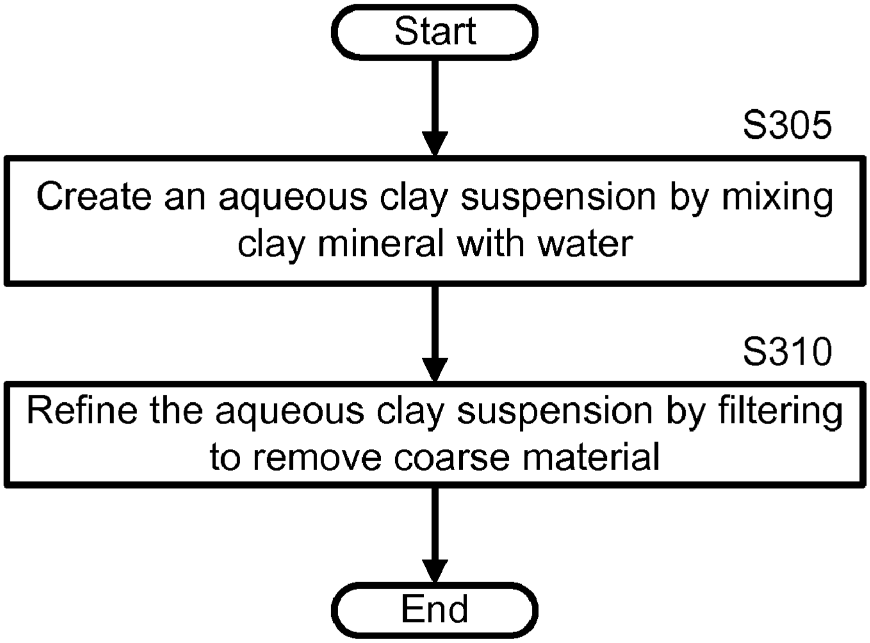
FIG. 3 shows a flow diagram of an embodiment for creating a radionuclide containment composition.

As shown in FIG. 3, the aqueous clay suspension 115 may be prepared by mixing a clay mineral 105 with water 110, S305. In one embodiment, the clay mineral is montmorillonite. In another embodiment, the clay mineral is Na-montmorillonite. The water may be tap, distilled, deionized, etc.

The weight ratio of clay mineral 105 to water 110 may range in the order from about 1:99 to about 99:1. For example, as a nonlimiting range, 20 to 60 ounces of montmorillonite may be immersed with 5 gallons of water.

In another embodiment, the aqueous clay suspension 115 may be prepared by mixing the clay mineral 105 with a liquid mixture. The liquid mixture may include part water and some other liquid, such as hydrogen peroxide. Hydrogen peroxide may be advantageous for decontaminating the clay mineral from bacteria, viruses, other microparasites, parasites, etc. Where the liquid mixture is part hydrogen peroxide and part water, the weight ratio of hydrogen peroxide to water may range from about 1:99 to about 1:2.

Once the mixture is created and allowed to sit, the aqueous clay suspension 115 may be refined using a filter, such as a sieve S310. Filtering may help remove coarse material. One or more containers (e.g., beaker, bucket, silo, etc.) may be used to receive the filtered aqueous clay suspension.

In general, where a sieve is exercised, smaller sieve apertures tend to result in a processed suspension that is more uniform with less residual coarse material. Hence, embodied sieve aperture sizes may range from 300 μm to <38 μm. Although some fragments of coarse material (or fractions) may penetrate through the filter, they contribute minimally to the aqueous clay suspension being employed. Nevertheless, the penetrable fragments may be used for forensic purposes to identify original materials.

The makeup and grain size of the filtered coarse fractions may be analyzed to determine the composition of the clay mineral. Analysis may be achieved by, for instance, back scatter scanning electron microscopy. Having mineralogical data may provide some insight into the nature of the clay minerals used.

C. Optional Clay Mineral Pretreatment

Figure 4:
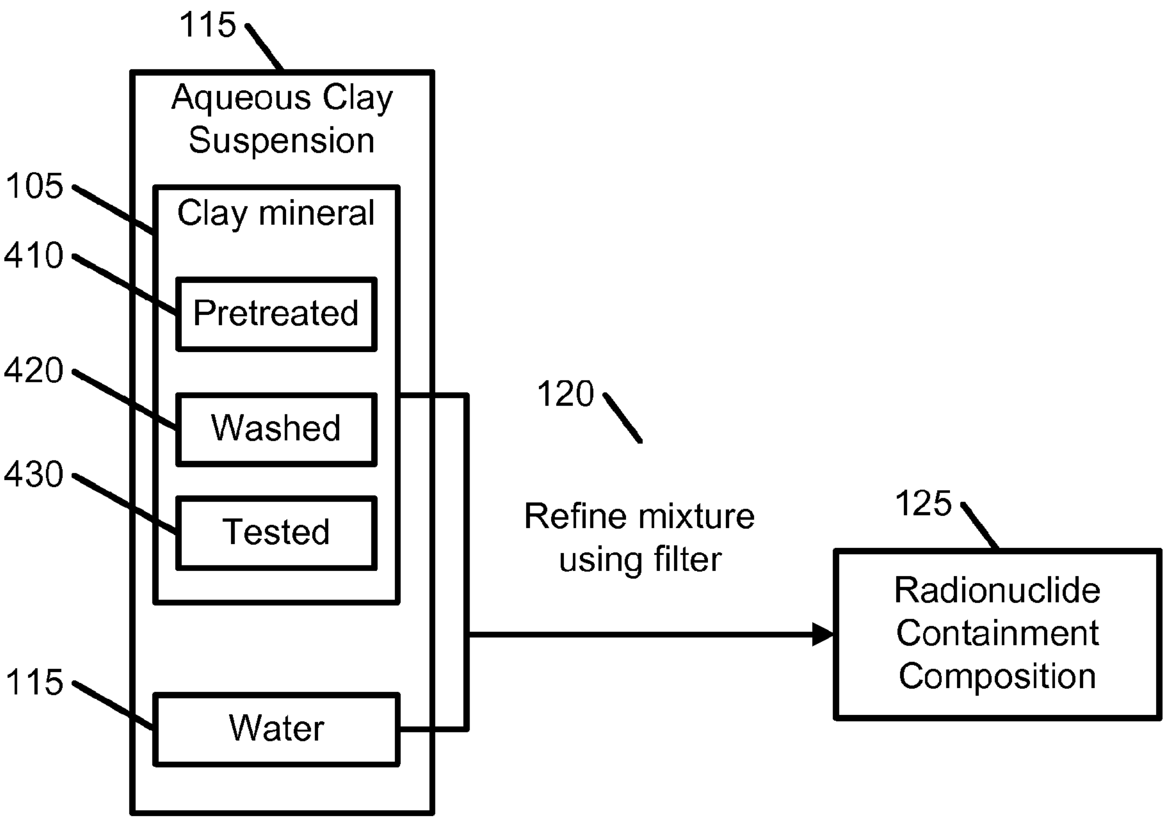
FIG. 4 shows another example of creating a radionuclide containment composition.
Figure 5:
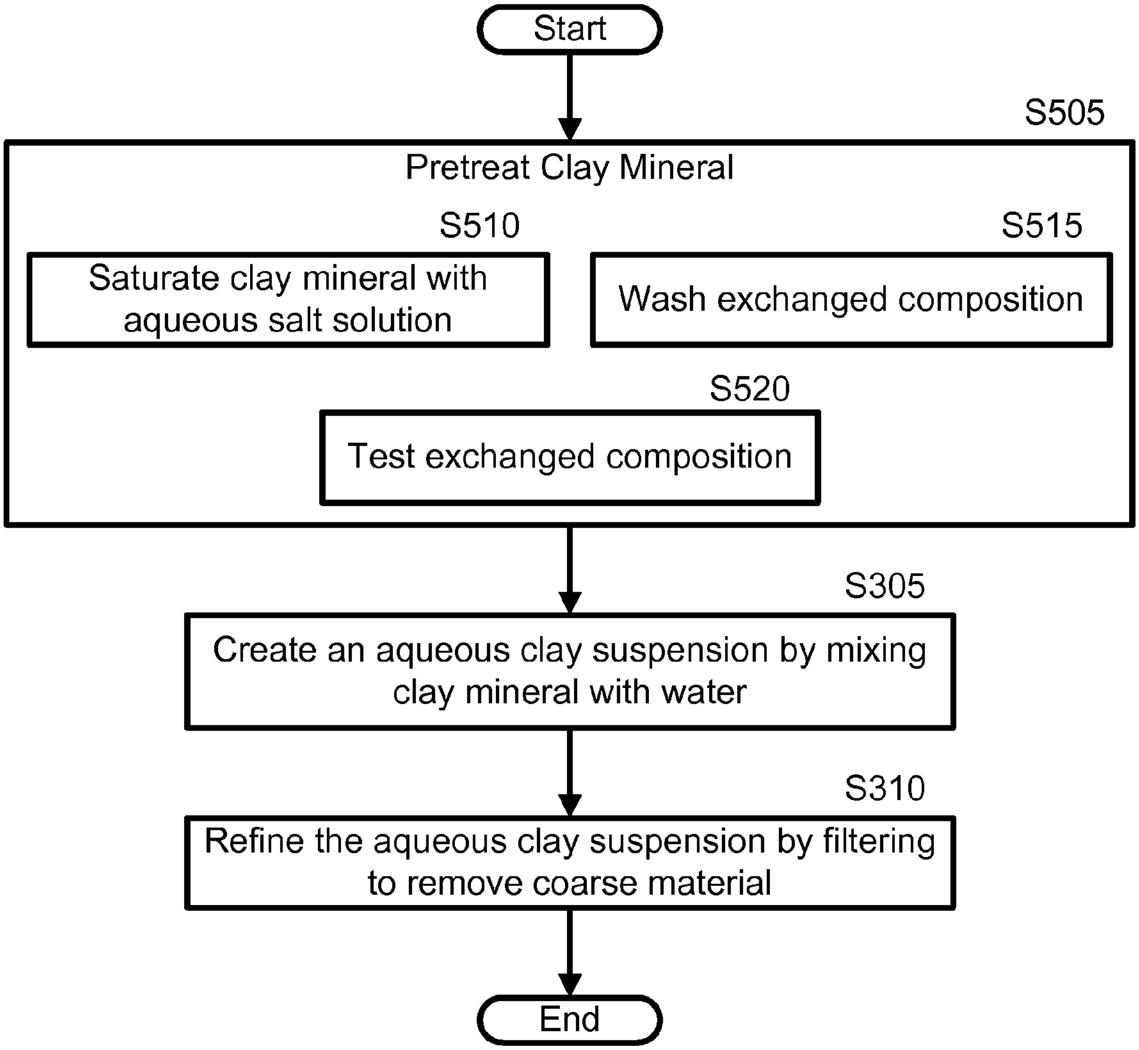
FIG. 5 shows another flow diagram of an embodiment for creating a radionuclide containment composition.

Illustrated in FIGS. 4 and 5 as another embodiment, if desired and/or necessary, the clay mineral 105 may be (prior to mixing) pretreated 410, S505 with an aqueous salt solution 115, S510. The aqueous salt solution 115 may include a salt having a formula X-R. X is a cation that can be an alkali metal, an alkaline earth metal, a poor metal or a metalloid. R is an anion that can be a metal, a nonmetal, a halogen or a combination thereof. Examples of aqueous salt solutions include, but are not limited to, halides (e.g., NaCl, $FeCl_2$, CaCl, LiBr, KI, etc.), hydroxides (e.g., $Al(OH)_3$, $Mg(OH)_2$, $Fe(OH)_2$, $Fe_2(OH)_3$, etc.), carbonates (e.g., $Na_2CO_3$, $ZnCO_3$, $CaCO_3$, etc.), chromates (e.g., $Na_2CrO_4$, $K_2CrO_4$, etc.), sulfates (e.g., $Na_2SO_4$, $Mg_2SO_4$, etc.) and nitrates (e.g., $NaNO_3$, $Mg(NO_3)_2$, etc.). Alternatively, ammonia may also be a possible aqueous salt solution.

When the clay mineral 105 is combined with the aqueous salt solution, other exchangeable cations (e.g., $Ca^{2+}$, $Mg^{2+}$, $K^+$, etc.) in the clay mineral 105 may be replaced with the salt cations by repetitious exchange. For example, the exchange may be repeated 3 to 5 times by replacing the liquid mixture each time with fresh aqueous salt solution containing an excess of salt cations. As a result, sorption of the exchanged salt ions is likely to occur. FIG. 6 highlights mere nonlimiting examples of exchange reactions.

Depending on the type of aqueous salt solution used, the length of time for a full exchange of the salt ions to occur may vary. For example, it may take seconds, minutes, hours or even days for the exchange to take place. Nevertheless, treatment should take as long as necessary and may be repeated for the exchange to be completed or be completed as nearly as possible. Numerous methods may be implemented to facilitate treatment. Nonlimiting examples of such methods include mixing, stirring, shaking, immersing, etc.

In one embodiment, the aqueous salt solution used to treat the clay mineral is aqueous NaCl solution. When combined, the clay mineral may become saturated with $Na^+$ ions by repetitious exchange. As a result, sorption of the $Na^+$ salt ions may occur.

Since montmorillonite naturally has sodium ions, an advantage of using $Na^+$ is that the relative purity of montmorillonite may be measured by the amount of Na-montmorillonite as compared to other minerals present. Another advantage of $Na^+$ is that $Na^+$ is a monovalent ion that lacks sufficient charge density to promote aggregation. In essence, purity may be measured using an aqueous salt solution having a cation that is also present in montmorillonite. Thus, if a different aqueous salt solution, for instance $Mg_2SO_4$, is used in treating the clay mineral, the relative purity of Mg-montmorillonite may also be measured between Mg and the other minerals present.

The result of the pretreatment should be an exchanged composition. The physical appearance of the exchanged composition may be characterized as an aqueous slurry or a gel.

The exchange composition should be washed at least once 420, S515. Washing 420, S515 can help remove the exchanged aqueous cations and/or any excess aqueous salt. Additionally, washing 420, S515 may also remove any floc with suspended solids that may be produced as a result of dissolved salt in the clay mineral 105.

Washing 420, S515 may be accomplished using a variety of techniques. One example is washing the exchanged composition first with deionized water, followed by a 50/50 ethanol/water mixture. The ethanol/water mixture may aid in minimizing hydrogen ion substitution for other exchangeable cations, or in other words, stopping hydrolysis. Another technique is dialysis. For instance, the exchanged composition may be immersed in a semi-permeable dialysis tubing containing warm deionized water. For each washing technique, the exchanged composition may be gently stirred. Stirring may be achieved by hand or centrifugation (e.g., 2000 rpm). Additionally, each washing technique may be repeated using fresh liquids (i.e., deionized water and/or ethanol/water mixture).

The washed composition may be tested for the presence of salt anions, for example halogens (such as $Cl^-$, $I^-$, etc) 430, S520. The presence of salt anions generally means that salt cations have not been completely removed. However, the absence of salt anions generally means that the cations from the aqueous salt solution have also been essentially removed.

In one embodiment, the clay mineral is treated with an aqueous salt solution containing chloride ions. After washing, a chloride ion test may be conducted using a precipitating agent (e.g., silver nitrate). A portion of the washed composition may be placed in a container filled with water. Drops of silver nitrate are then added to the container. If the precipitation of AgCl occurs (i.e., the solution turns whitish), then chloride ions are proven to be present. Hence, washing still needs to be repeated until essentially all chloride ions are removed. However, if the solution remains clear and transparent after silver nitrate drops are added, then there is an absence of chloride ions.

In another embodiment, the clay mineral is treated with an aqueous salt solution containing iodide ions. An iodine ion test may be conducted using a starch or a precipitating agent. A portion of the washed composition may be placed in a container filled with water. Drops of soluble starch solution are then added to the container. Iodide ions are proven to be present if the color of the solution turns bluish-blackish. If the solution remains clear and transparent, then the presence of iodide ions should be lacking.

Where a precipitating agent (e.g., silver nitrate) is used, the presence of iodide ions are proven to be present when drops of silver nitrate are added to a portion of the washed composition in a container filled with water and the color turns yellowish.

After washing 420, S515 and testing 430, S520, there may be a tendency for the exchanged composition to produce flocculi because of some dissolved salts in the exchanged composition. To remove any possible flocculi, the exchanged composition may be dispersed in distilled water and centrifuged (e.g., about 2000 rpm). If flocculation has occurred, the supernatant liquid will likely be clear. In such case, the liquid should be decanted and discarded. Dispersal and centrifugation may then be repeated until the exchanged composition exhibits some turbidity. This condition signals full or incipient dispersion, in which this process may be completed with the addition of a dispersing agent. Examples of dispersing agents include, but are not limited to, buffers with phosphate ions, alcohol, etc.

III. Radionuclide Containment

Figure 7:
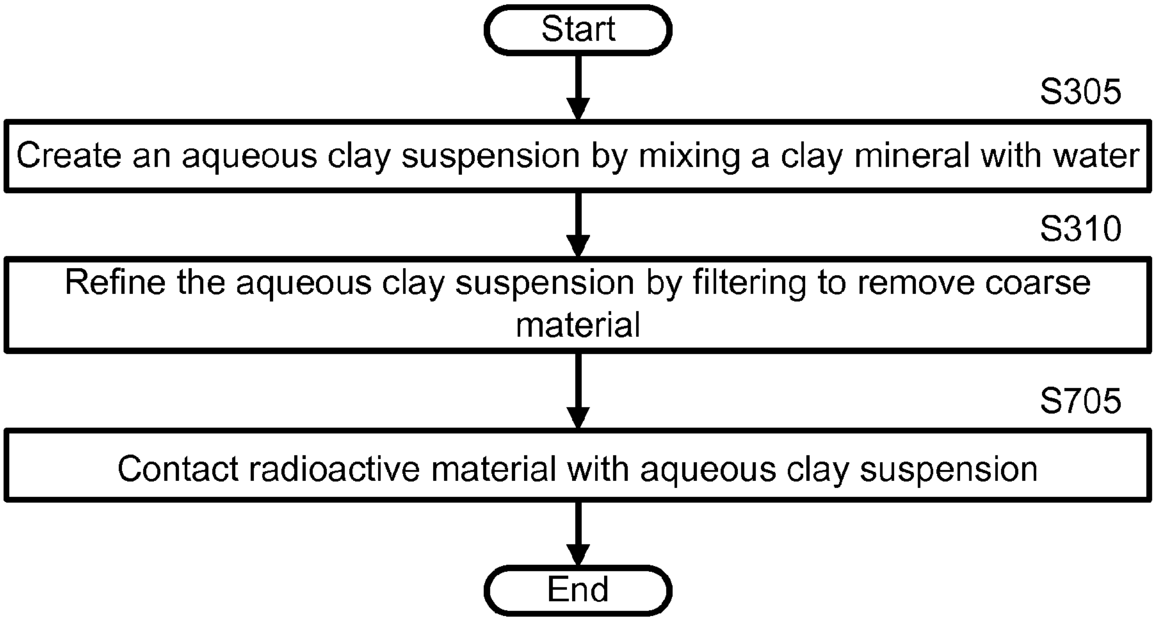
FIG. 7 shows a flow diagram as an embodiment for containing radionuclides from radioactive materials.
Figure 8:
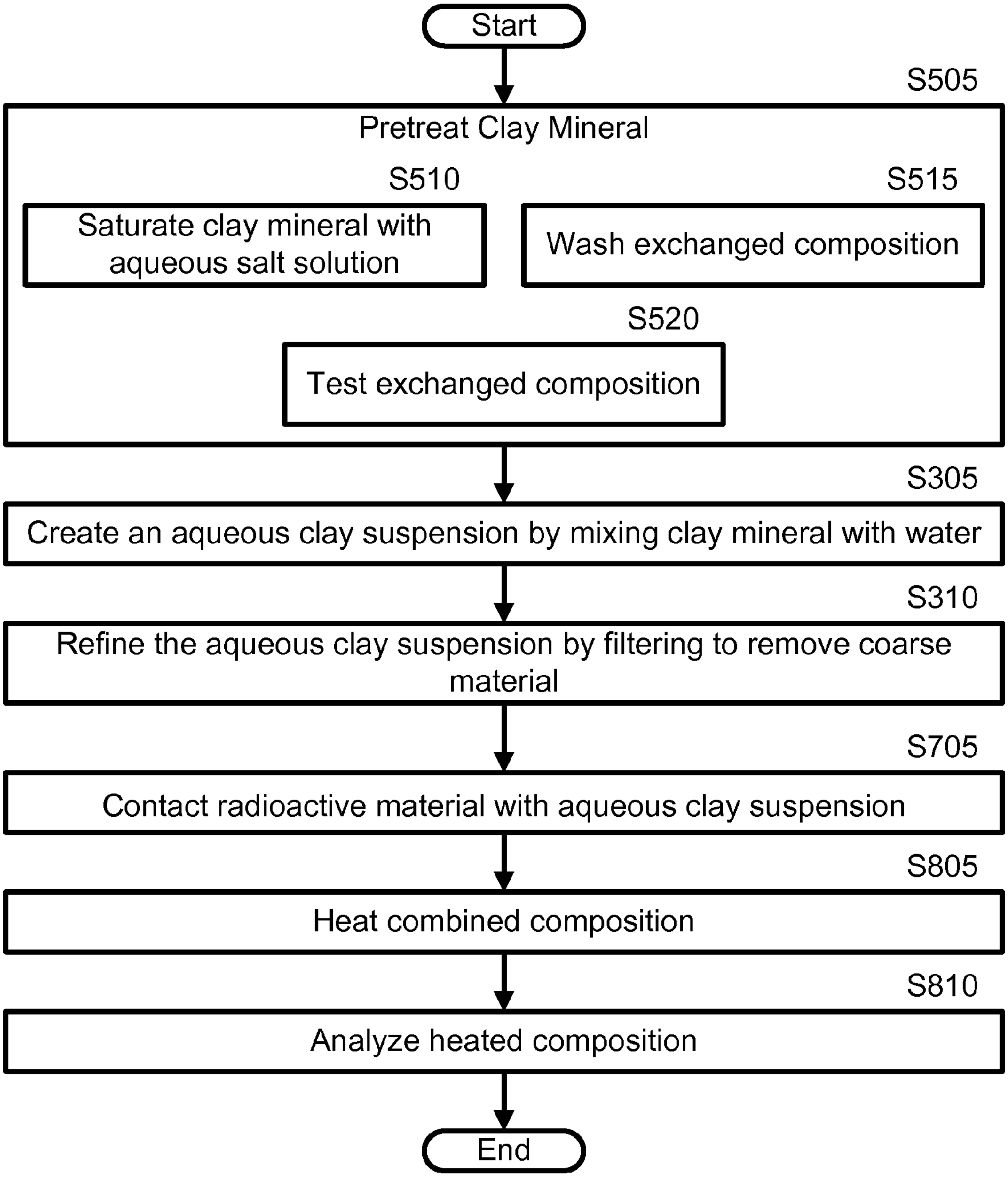
FIG. 8 shows another flow diagram as an embodiment for containing radionuclides from radioactive materials.

FIGS. 7 and 8 show a way to contain radionuclides from radioactive materials. Removal may be accomplished by contacting the radioactive material with an aqueous clay suspension 115 to form an aqueous slurry S705. Generally, this aqueous clay suspension 115 is a processed, uniform suspension (having a possible gel-like consistency) comprising a clay mineral 105 mixed with water 110. At the point of contact, radionuclides may be absorbed by the aqueous clay suspension 115, resulting in an aqueous slurry. The aqueous slurry may be collected (such as by vacuuming, scooping, sweeping, etc.) for chemical analysis.

To determine the texture and/or morphology, chemical composition, atomic structure, element mapping, etc. of the collected slurry, the collected slurry may be heated S805 and analyzed S810. Heating S805 should transform and immobilize this substance into a hard, functionally insoluble material. The substance may be heated to a temperature of at least about 250° C. The temperature may range to a ceiling of about 1400° C. The solidified material may be reduced to particle sizes acceptable for analysis. Nonlimiting examples of analysis include x-ray diffraction, electron diffraction, selected area electron diffraction (SAED), Bragg diffraction, electron backscatter diffraction, etc. Analysis S810, such as x-ray diffraction, helps identify phases that are produced in the heated combined composition.

For example, as an embodiment, the radioactive material is $^{137}CsCl$, where the radionuclide is $^{137}Cs$. Cesium has an affinity to bond with chloride ions. When the two ions are combined, a crystallized powder is formed. A combination of $^{137}Cs$ ions and chloride ions can produce $^{137}CsCl$.

$^{137}CsCl$ may be contained with a smectite mineral as the clay mineral.

Using montmorillonite as an exemplified embodiment of smectite, this selection for containing $^{137}CsCl$ may be based on a variety of factors. One, montmorillonite is generally expandable. Two, because of montmorillonite has the ability exchange alkali cations in aqueous systems, $Cs^+$ cations may be readily exchanged when these two are combined. Commonly, when Cs is exchanged, Cs is irreversibly sorbed on smectite minerals. This interaction can be exploited for transporting and storing $^{137}CsCl$ and could be used to respond to $^{137}CsCl$ release. Three, there are many sources of montmorillonite. Four, montmorillonite is comparatively low in cost.

Optionally, montmorillonite may be pretreated with aqueous salt solution, such as NaCl. Where NaCl is used for pretreatment, montmorillonite's sorption of $Na^+$ cations is expected to produce Na-montomorillonite. Having an aqueous or gel-like consistency, this exchanged composition may be washed to remove excess aqueous salt solution. Additionally, the exchanged composition may be tested for residual anions by using a precipitating agent (e.g., silver nitrate, etc.).

Made with either montmorillonite or Na-montmorillonite, the radionuclide containment composition may be applied to powder or aqueous solutions of $^{137}CsCl$ using numerous techniques. Techniques include, but are not limited to, contacting, spraying (e.g., using a spray bottle, squirt gun, hose, etc.), pouring, covering, mixing, etc. Because of the rheological properties of the aqueous clay suspension, little to no agitation and/or dispersal of $^{137}CsCl$ powder occurs.

As a result of the application, the aqueous clay suspension may directly and irreversibly absorb $^{137}Cs$ cations. It may be the case where exchange occurs spontaneously or essentially immediately. A dramatic change in the rheological properties should occur where the aqueous/gel-like consistency of the radionuclide containment composition disappears and becomes a waxy paste in the Cs-montmorillonite form. This waxy paste may be collected, heated and chemically mapped.

IV. Experiments

Volclay SPV 200, an American Colloid product, is placed in aqueous suspension using a ratio range of 20 oz to 60 oz volume Volclay 200 to 5 gallons of water. Forty analyses were prepared.

Optionally, prior to saturation with water, Volclay SPV 200 may be pretreated with aqueous NaCl solution. This process may create an exchanged composition wherein the ions in the interlayer of montmorillonite may be exchanged with $Na^+$ (aq) from the aqueous salt solution. Saturation was allowed to occur overnight. After saturation, the exchanged composition was washed. The process was repeated 5 times to allow for full exchange to take place. Afterwards, the exchanged composition can be washed and tested for residual anions from the aqueous salt solution.

The material is mixed mechanically for 5 minutes and is allowed to stand overnight. The suspension is then filtered through a 45 μm metal screen to remove coarse material. The filtration process breaks up the material and imparts a uniform suspension.

A. Properties of Starting Material

Grain size analysis was performed on the raw starting material (Volclay SPV 200, American Colloid) using standard mechanical sieves. Approximately 100 grams of raw material was analyzed using 8" sieves using fractions between 300 μm and 38 μm. The percentage that passed the 38 μm sieve was included in the analysis. Sieve stacks were shaken mechanically for 15 minutes. Fractions captured in each sieve were then weighed. Normalized percentages of each size fraction were calculated based on the total sum of mass retained in each sieve. Differences between total mass analyzed and total mass retained varied from 3% to 7%.

Grain size analysis indicates that for most analyses, a single normal distribution of particles does not exist in the starting material. The variability in the size distribution of particles is attributed to variation in processing, or natural variability of source material in the mine at the manufacturer's source. The modes at 180 μm, 106 μm, 75 μm, and <38 μm are common. Analyses of grain size distribution at various modes are shown in Table 1. These analyses have single and multiple modes.

TABLE 1

| | Grain Size Distribution by Normalized Percentages for Analyses 1-10 | | | | | | | | | |
|---|---|---|---|---|---|---|---|---|---|---|
| | 1 | 2 | 3 | 4 | 5 | 6 | 7 | 8 | 9 | 10 |
| 300 μm | 0.11 | 0.14 | 0.06 | 0.22 | 1.62 | 0.67 | 0.37 | 0.07 | 0.070 | 0.051 |
| 250 μm | 0.22 | 0.36 | 0.40 | 0.78 | 0.30 | 0.21 | 0.52 | 0.43 | 0.087 | 0.174 |
| 212 μm | 11.84 | 7.53 | 0.43 | 14.79 | 0.36 | 0.32 | 1.73 | 7.66 | 0.210 | 0.245 |
| 180 μm | 7.68 | 30.14 | 0.58 | 26.61 | 0.73 | 0.53 | 3.76 | 23.54 | 0.576 | 0.562 |
| 150 μm | 3.30 | 19.44 | 0.89 | 16.88 | 1.35 | 1.21 | 9.61 | 17.20 | 0.960 | 1.094 |
| 125 μm | 13.18 | 13.01 | 1.62 | 13.16 | 2.21 | 2.23 | 16.79 | 16.30 | 2.113 | 1.809 |
| 106 μm | 14.10 | 0.78 | 2.50 | 8.09 | 3.24 | 3.02 | 24.71 | 14.00 | 2.235 | 3.741 |
| 90 μm | 0.75 | 5.31 | 8.01 | 1.26 | 5.58 | 6.95 | 0.66 | 0.47 | 20.080 | 13.493 |
| 75 μm | 2.76 | 11.77 | 12.60 | 2.84 | 29.92 | 30.70 | 4.51 | 0.09 | 13.236 | 13.544 |
| 63 μm | 5.13 | 1.71 | 26.66 | 3.89 | 21.48 | 23.87 | 7.44 | 2.03 | 4.226 | 6.930 |
| 53 μm | 14.22 | 6.88 | 24.95 | 7.60 | 13.39 | 18.74 | 14.53 | 9.21 | 11.053 | 15.476 |
| 43 μm | 11.67 | 2.17 | 14.94 | 3.54 | 10.29 | 6.60 | 8.23 | 3.50 | 12.135 | 12.144 |
| 38 μm | 9.88 | 0.77 | 5.96 | 0.30 | 6.80 | 3.07 | 7.13 | 5.51 | 15.872 | 14.535 |
| <38 μm | 5.16 | 0.00 | 0.40 | 0.02 | 2.72 | 1.90 | 0.00 | 0.00 | 17.147 | 16.202 |
| Sum | 100.00 | 100.00 | 100.00 | 100.00 | 100.00 | 100.00 | 100.00 | 100.00 | 100.00 | 100.00 |

The raw material used to make the aqueous clay suspension (e.g., uniform aqueous Na-montmorillonite suspension) is a processed bentonite. The coarse fraction of the raw starting material used to make this technology was investigated using back scatter scanning electron microscopy as a means to characterize the raw material. The mineralogical characteristics of the coarse fraction provide some insight into the nature of the raw material. However, the coarse fraction has a very minimal role in contributing to the properties of the aqueous clay suspension. Because the raw material is processed, some small fragments of the coarse fraction minerals may enter the technology product. Therefore, the data on the coarse fraction is useful for forensic purposes once the aqueous clay suspension is deployed. The coarse mineral data also serves as a characteristic of the original material.

Coarse fraction mineral grains varied between very angular to rounded shapes. However, most grains are very angular to angular. Minerals commonly observed are plagioclase, biotite, zircon, quartz, K-feldspar, calcite, and iron oxides. PbS (galena) was also observed. There are two general groups of minerals based on geologic processes. Plagioclase, biotite, zircon, and quartz are volcanic in origin while calcite, K-feldspar, iron oxides, and galena are authigenic in origin. K-feldspar (sanidine) can also be volcanic in origin. Aggregates of calcite and K-feldspar were observed, and galena was observed with these two minerals. Such authigenic mineral associations have been observed in Ordovician bentonites. Energy dispersive spectroscopy (EDS) spectra analyses indicate that the biotite is intermediate in composition with respect to Fe and Mg concentrations. There is also Ti and Cl in the biotite. EDS analyses indicate that the plagioclase is commonly labradoritic to albitic in composition. Zircon crystals are end member composition and no Hf was detected. The detection limit is approximately 1%.

B. Grain Size Analysis of the Aqueous Clay Suspension

For transmission electron microscopy investigation, grain mounts were prepared of the Na-montmorillointe using alcohol as a dispersing medium. Analyses were prepared on 300 mesh hole carbon Cu grids. Analyses were investigated using a 300 kV JEM 3010 transmission electron microscope (TEM) and a 200 kV 2010 scanning transmission electron microscope (SEM).

TEM imaging indicates that the aqueous clay suspension is dominantly composed of montmorillonite particles (>95%) and with a lesser amount of silica particles. With respect to the montomorillointe fraction of the aqueous clay suspension, foliated lamellar aggregates compose approximately 50 to 75% of the montmorillonite particles. Subhedral platelets and compact subhedral lamellar aggregates both make up 10 to 30% of the montmorillonite particles. Subhedral lamellar aggregates make up 5 to 10% of the montmorillonite particles. Foliated lamellar aggregates vary in diameter from approximately 0.25 μm to >5.0 μm. Subhedral lamellar aggregates vary in diameter from approximately 0.2 μm to 3.5 μm. Subhedral platelets vary in diameter from approximately 0.6 μm to 3.5 μm. Compact subhedral lamellar aggregates vary in diameter from approximately 0.5 μm to >5.0 μm.

SAED patterns taken along 001 on discrete particles show concentric rings. Discrete diffraction spots occur but are not common. Such diffraction patterns are indicative of turbostratic stacking of the 2:1 layers in montmorillonite.

EDS spectra analyses were conducted using a 300 kV JEM 3010 TEM and a spot size of 2-3. Spectra with Si peaks greater than 100 counts were deemed significant. Variation in intensity was related to apparent thickness. The higher contrast particles produced more intense spectra. Analyses were done on the center of particles.

Si, Al, Fe, Ca, K, Na and Mg were elements observed. Systematic drift in EDS analyses occur. $SiO_2$ concentrations tend to be elevated and $Na_2O$ concentrations may be lower than actual concentrations due to diffusion in either the solid state or release of hydrated interlayer sodium cations. The average, standard deviation, maximum and minimum of elements expressed as oxide constituents is given in Table 2. Data are presented in Tables 3-14. FIGS. 9-31 show images of observed particle aggregates of the aqueous clay suspension (Na-montmorillonite). Plot concentrations of oxides from these tables are illustrated in FIGS. 32-36.

TABLE 2

Summary of Weight % of Oxides in Na-montmorillonite Analyses 1-116

| | $SiO_2$ | $Al_2O_3$ | $Fe_2O_3$ | MgO | CaO | $Na_2O$ | $K_2O$ |
|---|---|---|---|---|---|---|---|
| Average | 61.44 | 25.81 | 3.27 | 5.54 | 1.25 | 2.60 | 0.07 |
| Std. Dev. | 4.15 | 2.69 | 1.20 | 1.45 | 0.31 | 0.78 | 0.08 |
| Maximum | 77.43 | 29.83 | 6.78 | 8.55 | 2.04 | 4.68 | 0.48 |
| Minimum | 55.37 | 15.28 | 1.33 | 0.71 | 0.29 | 0.00 | 0.00 |

TABLE 3

Weight % of Oxides in Na-montmorillonite Analyses 1-10

| | 1 | 2 | 3 | 4 | 5 | 6 | 7 | 8 | 9 | 10 |
|---|---|---|---|---|---|---|---|---|---|---|
| $SiO_2$ | 61.44 | 56.72 | 66.32 | 77.43 | 55.37 | 56.32 | 68.92 | 61.86 | 57.58 | 58.72 |
| $Al_2O_3$ | 26.27 | 26.86 | 22.72 | 15.28 | 29.48 | 29.44 | 21.59 | 24.35 | 27.48 | 27.61 |
| $Fe_2O_3$ | 3.16 | 5.66 | 3.18 | 2.50 | 2.64 | 3.04 | 3.70 | 1.33 | 3.56 | 3.08 |
| MgO | 5.22 | 6.23 | 4.06 | 2.47 | 7.70 | 6.53 | 0.95 | 5.98 | 7.28 | 6.81 |
| CaO | 1.26 | 1.46 | 1.65 | 0.98 | 1.60 | 1.34 | 2.03 | 1.58 | 1.49 | 1.59 |
| $Na_2O$ | 2.64 | 2.98 | 2.07 | 1.33 | 3.11 | 3.30 | 2.82 | 4.68 | 2.61 | 2.18 |
| $K_2O$ | 0.00 | 0.09 | 0.01 | 0.01 | 0.10 | 0.03 | 0.00 | 0.21 | 0.00 | 0.00 |
| Total | 99.99 | 100.00 | 100.01 | 100.00 | 100.00 | 100.00 | 100.01 | 99.99 | 100.00 | 99.99 |

TABLE 4

| | Weight % of Oxides in Na-montmorillonite Analyses 11-20 | | | | | | | | | |
|---|---|---|---|---|---|---|---|---|---|---|
| | 11 | 12 | 13 | 14 | 15 | 16 | 17 | 18 | 19 | 20 |
| $SiO_2$ | 56.12 | 58.30 | 58.38 | 59.83 | 66.51 | 62.01 | 58.77 | 60.52 | 60.61 | 59.54 |
| $Al_2O_3$ | 29.83 | 29.22 | 29.04 | 26.91 | 23.06 | 26.60 | 27.30 | 26.85 | 27.85 | 27.63 |
| $Fe_2O_3$ | 3.14 | 2.35 | 3.09 | 2.99 | 3.00 | 2.69 | 2.20 | 2.29 | 2.21 | 2.55 |
| MgO | 7.05 | 6.25 | 5.93 | 5.61 | 4.00 | 5.50 | 7.56 | 6.34 | 5.50 | 5.82 |
| CaO | 1.38 | 1.54 | 1.71 | 1.08 | 1.27 | 0.95 | 1.01 | 1.08 | 1.04 | 0.93 |
| $Na_2O$ | 2.44 | 2.17 | 1.68 | 3.47 | 1.97 | 2.15 | 3.15 | 2.96 | 2.74 | 3.53 |
| $K_2O$ | 0.05 | 0.16 | 0.17 | 0.11 | 0.20 | 0.10 | 0.01 | 0.00 | 0.06 | 0.00 |
| Total | 100.01 | 99.99 | 100.00 | 100.00 | 100.01 | 100.00 | 100.00 | 100.04 | 100.01 | 100.00 |

TABLE 5

| | Weight % of Oxides in Na-montmorillonite Analyses 21-30 | | | | | | | | | |
|---|---|---|---|---|---|---|---|---|---|---|
| | 21 | 22 | 23 | 24 | 25 | 26 | 27 | 28 | 29 | 30 |
| $SiO_2$ | 59.22 | 59.33 | 63.98 | 58.32 | 59.53 | 59.90 | 60.98 | 58.83 | 67.99 | 63.92 |
| $Al_2O_3$ | 27.48 | 26.90 | 26.02 | 28.33 | 28.73 | 28.54 | 28.36 | 28.47 | 21.92 | 25.06 |
| $Fe_2O_3$ | 2.65 | 2.75 | 2.91 | 2.68 | 2.85 | 2.87 | 2.94 | 2.79 | 1.74 | 3.29 |
| MgO | 5.75 | 6.23 | 4.00 | 6.21 | 4.67 | 5.22 | 4.14 | 5.67 | 4.51 | 4.33 |
| CaO | 1.06 | 0.85 | 1.06 | 1.17 | 1.16 | 1.03 | 1.13 | 1.17 | 0.68 | 1.43 |
| $Na_2O$ | 3.76 | 3.89 | 2.00 | 3.30 | 3.04 | 2.40 | 2.41 | 3.01 | 3.10 | 1.92 |
| $K_2O$ | 0.09 | 0.05 | 0.04 | 0.00 | 0.02 | 0.04 | 0.04 | 0.05 | 0.07 | 0.05 |
| Total | 100.01 | 100.00 | 100.01 | 100.01 | 100.00 | 100.00 | 100.00 | 99.99 | 100.01 | 100.00 |

TABLE 6

| | Weight % of Oxides in Na-montmorillonite Analyses 31-40 | | | | | | | | | |
|---|---|---|---|---|---|---|---|---|---|---|
| | 31 | 32 | 33 | 34 | 35 | 36 | 37 | 38 | 39 | 40 |
| $SiO_2$ | 58.32 | 68.96 | 60.12 | 60.17 | 62.20 | 64.36 | 65.36 | 64.77 | 58.77 | 57.48 |
| $Al_2O_3$ | 28.75 | 23.65 | 28.51 | 26.80 | 26.86 | 25.30 | 24.86 | 25.24 | 27.92 | 28.46 |
| $Fe_2O_3$ | 2.62 | 3.33 | 2.32 | 2.12 | 2.62 | 2.76 | 2.73 | 2.78 | 2.74 | 2.72 |
| MgO | 5.58 | 0.71 | 5.03 | 6.96 | 5.16 | 4.35 | 2.99 | 4.12 | 5.74 | 6.59 |
| CaO | 1.15 | 1.11 | 1.27 | 1.03 | 1.11 | 1.39 | 1.06 | 1.14 | 1.15 | 1.25 |
| $Na_2O$ | 3.51 | 2.23 | 2.74 | 2.87 | 2.00 | 1.76 | 2.88 | 1.90 | 3.51 | 3.42 |
| $K_2O$ | 0.07 | 0.00 | 0.01 | 0.04 | 0.05 | 0.09 | 0.13 | 0.05 | 0.17 | 0.07 |
| Total | 100.00 | 99.99 | 100.00 | 99.99 | 100.00 | 100.01 | 100.01 | 100.00 | 100.00 | 99.99 |

TABLE 7

| | Weight % of Oxides in Na-montmorillonite Analyses 41-50 | | | | | | | | | |
|---|---|---|---|---|---|---|---|---|---|---|
| | 41 | 42 | 43 | 44 | 45 | 46 | 47 | 48 | 49 | 50 |
| $SiO_2$ | 64.14 | 58.91 | 61.51 | 63.40 | 63.49 | 61.01 | 60.48 | 58.65 | 62.02 | 57.04 |
| $Al_2O_3$ | 25.04 | 28.56 | 28.28 | 26.20 | 26.55 | 28.14 | 28.27 | 28.32 | 25.38 | 28.06 |
| $Fe_2O_3$ | 3.17 | 3.02 | 2.87 | 3.11 | 3.14 | 2.95 | 3.06 | 3.40 | 3.29 | 3.26 |
| MgO | 4.18 | 5.45 | 3.98 | 3.88 | 3.66 | 4.56 | 4.31 | 5.73 | 5.21 | 7.11 |
| CaO | 1.34 | 1.06 | 1.15 | 1.20 | 1.22 | 1.06 | 1.00 | 1.31 | 1.28 | 1.18 |
| $Na_2O$ | 2.08 | 2.95 | 2.17 | 2.20 | 1.85 | 2.22 | 2.78 | 2.57 | 2.16 | 3.32 |
| $K_2O$ | 0.05 | 0.05 | 0.05 | 0.00 | 0.09 | 0.06 | 0.10 | 0.03 | 0.04 | 0.04 |
| Total | 100.00 | 100.00 | 100.01 | 99.99 | 100.00 | 100.00 | 100.00 | 100.01 | 99.38 | 100.01 |

TABLE 8

| | Weight % of Oxides in Na-montmorillonite Analyses 51-60 | | | | | | | | | |
|---|---|---|---|---|---|---|---|---|---|---|
| | 51 | 52 | 53 | 54 | 55 | 56 | 57 | 58 | 59 | 60 |
| $SiO_2$ | 61.39 | 60.33 | 61.17 | 65.13 | 59.18 | 60.10 | 59.09 | 61.20 | 63.28 | 60.19 |
| $Al_2O_3$ | 25.49 | 26.79 | 25.91 | 23.06 | 27.72 | 27.09 | 27.71 | 26.28 | 24.26 | 26.86 |

TABLE 8-continued

| Weight % of Oxides in Na-montmorillonite Analyses 51-60 | | | | | | | | | | |
|---|---|---|---|---|---|---|---|---|---|---|
| | 51 | 52 | 53 | 54 | 55 | 56 | 57 | 58 | 59 | 60 |
| $Fe_2O_3$ | 4.21 | 2.50 | 4.04 | 3.09 | 2.78 | 2.70 | 2.94 | 3.14 | 2.99 | 2.54 |
| MgO | 4.92 | 6.47 | 5.08 | 5.58 | 5.95 | 6.26 | 6.22 | 6.20 | 5.09 | 5.92 |
| CaO | 1.25 | 1.05 | 1.51 | 0.75 | 1.17 | 1.05 | 1.07 | 1.00 | 1.18 | 1.01 |
| $Na_2O$ | 2.75 | 2.84 | 2.16 | 2.39 | 3.18 | 2.75 | 2.96 | 2.18 | 3.19 | 3.43 |
| $K_2O$ | 0.00 | 0.02 | 0.13 | 0.00 | 0.02 | 0.05 | 0.00 | 0.00 | 0.00 | 0.05 |
| Total | 100.01 | 100.00 | 100.00 | 100.00 | 100.00 | 100.00 | 99.99 | 100.00 | 99.99 | 100.00 |

TABLE 9

| Weight % of Oxides in Na-montmorillonite Analyses 61-70 | | | | | | | | | | |
|---|---|---|---|---|---|---|---|---|---|---|
| | 61 | 62 | 63 | 64 | 65 | 66 | 67 | 68 | 69 | 70 |
| $SiO_2$ | 60.01 | 59.21 | 62.33 | 62.28 | 62.98 | 62.19 | 60.75 | 62.25 | 65.58 | 56.69 |
| $Al_2O_3$ | 27.63 | 27.71 | 25.17 | 25.63 | 21.30 | 23.42 | 25.43 | 24.02 | 21.55 | 26.95 |
| $Fe_2O_3$ | 2.78 | 2.46 | 2.87 | 2.90 | 6.52 | 5.98 | 5.09 | 5.40 | 6.78 | 5.66 |
| MgO | 5.56 | 6.49 | 5.91 | 5.54 | 4.83 | 5.53 | 4.97 | 6.37 | 2.98 | 6.16 |
| CaO | 1.16 | 1.11 | 1.16 | 1.14 | 1.57 | 1.23 | 1.37 | 1.25 | 1.48 | 1.52 |
| $Na_2O$ | 2.84 | 3.03 | 2.56 | 2.48 | 2.79 | 1.66 | 2.26 | 0.70 | 1.60 | 3.02 |
| $K_2O$ | 0.03 | 0.00 | 0.00 | 0.02 | 0.00 | 0.00 | 0.12 | 0.00 | 0.03 | 0.00 |
| Total | 100.01 | 100.01 | 100.00 | 99.99 | 99.99 | 100.01 | 99.99 | 99.99 | 100.00 | 100.00 |

TABLE 10

| Weight % of Oxides in Na-montmorillonite Analyses 71-80 | | | | | | | | | | |
|---|---|---|---|---|---|---|---|---|---|---|
| | 71 | 72 | 73 | 74 | 75 | 76 | 77 | 78 | 79 | 80 |
| $SiO_2$ | 55.87 | 65.62 | 58.36 | 58.10 | 57.40 | 59.69 | 57.64 | 60.06 | 59.32 | 62.93 |
| $Al_2O_3$ | 27.04 | 20.34 | 25.70 | 26.49 | 26.29 | 25.47 | 26.77 | 25.81 | 25.92 | 23.38 |
| $Fe_2O_3$ | 5.86 | 5.94 | 5.06 | 4.70 | 4.42 | 4.55 | 4.50 | 5.19 | 4.56 | 4.93 |
| MgO | 6.28 | 4.75 | 6.84 | 6.11 | 7.62 | 5.76 | 6.47 | 5.45 | 6.30 | 4.85 |
| CaO | 1.21 | 1.62 | 1.69 | 1.50 | 1.52 | 1.76 | 1.71 | 1.65 | 1.75 | 1.94 |
| $Na_2O$ | 3.68 | 1.43 | 2.27 | 3.03 | 2.68 | 2.64 | 2.87 | 1.76 | 2.14 | 1.96 |
| $K_2O$ | 0.06 | 0.30 | 0.08 | 0.07 | 0.07 | 0.13 | 0.04 | 0.08 | 0.02 | 0.01 |
| Total | 100.00 | 100.00 | 100.00 | 100.00 | 100.00 | 100.00 | 100.00 | 100.00 | 100.01 | 100.00 |

TABLE 11

| Weight % of Oxides in Na-montmorillonite Analyses 81-90 | | | | | | | | | | |
|---|---|---|---|---|---|---|---|---|---|---|
| | 81 | 82 | 83 | 84 | 85 | 86 | 87 | 88 | 89 | 90 |
| $SiO_2$ | 57.41 | 58.66 | 57.15 | 60.49 | 55.99 | 57.06 | 57.34 | 57.88 | 58.66 | 63.76 |
| $Al_2O_3$ | 26.28 | 26.61 | 25.79 | 26.35 | 27.07 | 28.17 | 27.57 | 28.70 | 28.86 | 23.82 |
| $Fe_2O_3$ | 5.06 | 5.02 | 5.16 | 2.61 | 4.83 | 3.45 | 3.32 | 3.18 | 3.50 | 4.34 |
| MgO | 6.19 | 5.55 | 7.31 | 5.94 | 6.94 | 7.04 | 7.57 | 5.63 | 5.24 | 4.18 |
| CaO | 1.76 | 1.58 | 1.85 | 2.04 | 1.52 | 1.35 | 1.30 | 1.22 | 1.34 | 1.58 |
| $Na_2O$ | 3.28 | 2.40 | 2.67 | 2.56 | 3.46 | 2.82 | 2.90 | 3.23 | 2.31 | 2.31 |
| $K_2O$ | 0.02 | 0.20 | 0.07 | 0.01 | 0.19 | 0.11 | 0.00 | 0.15 | 0.09 | 0.00 |
| Total | 100.00 | 100.02 | 100.00 | 100.00 | 100.00 | 100.00 | 100.00 | 99.99 | 100.00 | 99.99 |

TABLE 12

| Weight % of Oxides in Na-montmorillonite Analyses 91-100 | | | | | | | | | | |
|---|---|---|---|---|---|---|---|---|---|---|
| | 91 | 92 | 93 | 94 | 95 | 96 | 97 | 98 | 99 | 100 |
| $SiO_2$ | 66.81 | 58.94 | 57.10 | 69.78 | 70.01 | 61.08 | 58.04 | 57.93 | 66.69 | 66.35 |
| $Al_2O_3$ | 23.12 | 26.97 | 26.70 | 21.84 | 19.06 | 24.17 | 27.51 | 28.84 | 23.26 | 23.47 |
| $Fe_2O_3$ | 2.94 | 3.38 | 3.66 | 5.58 | 6.13 | 4.18 | 1.47 | 1.54 | 2.37 | 1.92 |
| MgO | 4.23 | 6.95 | 7.63 | 2.05 | 2.58 | 5.67 | 8.17 | 6.62 | 4.67 | 4.68 |

TABLE 12-continued

| | Weight % of Oxides in Na-montmorillonite Analyses 91-100 | | | | | | | | | |
|---|---|---|---|---|---|---|---|---|---|---|
| | 91 | 92 | 93 | 94 | 95 | 96 | 97 | 98 | 99 | 100 |
| CaO | 1.39 | 1.26 | 0.89 | 0.29 | 0.80 | 0.86 | 1.28 | 1.43 | 1.63 | 1.59 |
| $Na_2O$ | 1.51 | 2.40 | 3.98 | 0.00 | 1.07 | 3.78 | 3.44 | 3.55 | 1.32 | 1.95 |
| $K_2O$ | 0.00 | 0.10 | 0.04 | 0.48 | 0.36 | 0.26 | 0.08 | 0.09 | 0.07 | 0.04 |
| Total | 100.00 | 100.00 | 100.00 | 100.02 | 100.01 | 100.00 | 99.99 | 100.00 | 100.01 | 100.00 |

TABLE 13

| | Weight % of Oxides in Na-montmorillonite Analyses 100-110 | | | | | | | | | |
|---|---|---|---|---|---|---|---|---|---|---|
| | 101 | 102 | 103 | 104 | 105 | 106 | 107 | 108 | 109 | 110 |
| $SiO_2$ | 70.86 | 57.61 | 59.88 | 57.84 | 56.98 | 58.18 | 68.83 | 59.47 | 65.48 | 66.59 |
| $Al_2O_3$ | 21.61 | 27.91 | 25.27 | 27.57 | 27.81 | 26.64 | 22.82 | 28.01 | 24.10 | 23.32 |
| $Fe_2O_3$ | 2.03 | 1.47 | 2.07 | 1.69 | 1.58 | 3.19 | 2.13 | 2.30 | 2.82 | 1.96 |
| MgO | 3.72 | 8.50 | 8.43 | 8.55 | 8.19 | 7.26 | 4.14 | 6.16 | 4.81 | 4.59 |
| CaO | 1.43 | 1.07 | 1.17 | 1.10 | 1.67 | 1.27 | 1.41 | 0.70 | 0.71 | 0.84 |
| $Na_2O$ | 0.20 | 3.32 | 3.06 | 3.22 | 3.66 | 3.28 | 0.68 | 3.11 | 2.08 | 2.63 |
| $K_2O$ | 0.15 | 0.11 | 0.12 | 0.03 | 0.10 | 0.18 | 0.00 | 0.25 | 0.00 | 0.07 |
| Total | 100.00 | 99.99 | 100.00 | 100.00 | 99.99 | 100.00 | 100.01 | 100.00 | 100.00 | 100.00 |

TABLE 14

| | Weight % of Oxides in Na-montmorillonite Analyses 111-116 | | | | | |
|---|---|---|---|---|---|---|
| | 111 | 112 | 113 | 114 | 115 | 116 |
| $SiO_2$ | 67.92 | 75.86 | 60.64 | 67.06 | 66.06 | 66.10 |
| $Al_2O_3$ | 20.75 | 16.23 | 25.38 | 21.01 | 22.42 | 21.89 |
| $Fe_2O_3$ | 2.21 | 2.48 | 3.22 | 2.09 | 2.16 | 1.80 |
| MgO | 5.13 | 2.98 | 6.29 | 6.37 | 5.53 | 6.40 |
| CaO | 0.94 | 1.16 | 0.65 | 0.84 | 0.84 | 0.92 |
| $Na_2O$ | 2.99 | 1.19 | 3.72 | 2.63 | 2.91 | 2.73 |
| $K_2O$ | 0.06 | 0.11 | 0.11 | 0.01 | 0.07 | 0.16 |
| Total | 100.00 | 100.01 | 100.01 | 100.01 | 99.99 | 100.00 |

Figure 9:
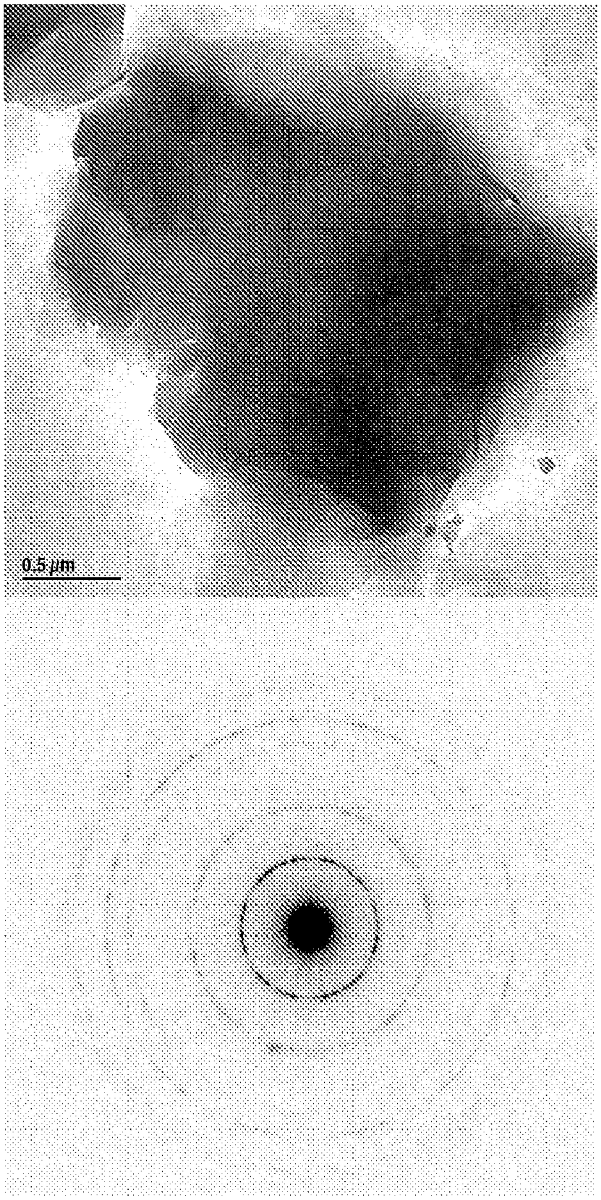
FIG. 9 shows an embodiment of montmorillonite with a compacted subhedral lamellar aggregate surrounded by subhedral platelets.

FIG. 9 shows compacted subhedral lamellar aggregate, from ~2.25 μm to ~2.75 μm, surrounded by subhedral platelets. Curling is occurring along the edges varying from ~0.3 μm to ~0.5 μm. Subangular quartz fragments, ~0.05 μm to ~0.1 μm, accumulated at the lower portion of the main fragment. The main particle is joined by a smaller hexagonal lamella with straight edges. SAED pattern taken at 60 cm is dominated by rings indicates turbostratic stacking.

Figure 10:
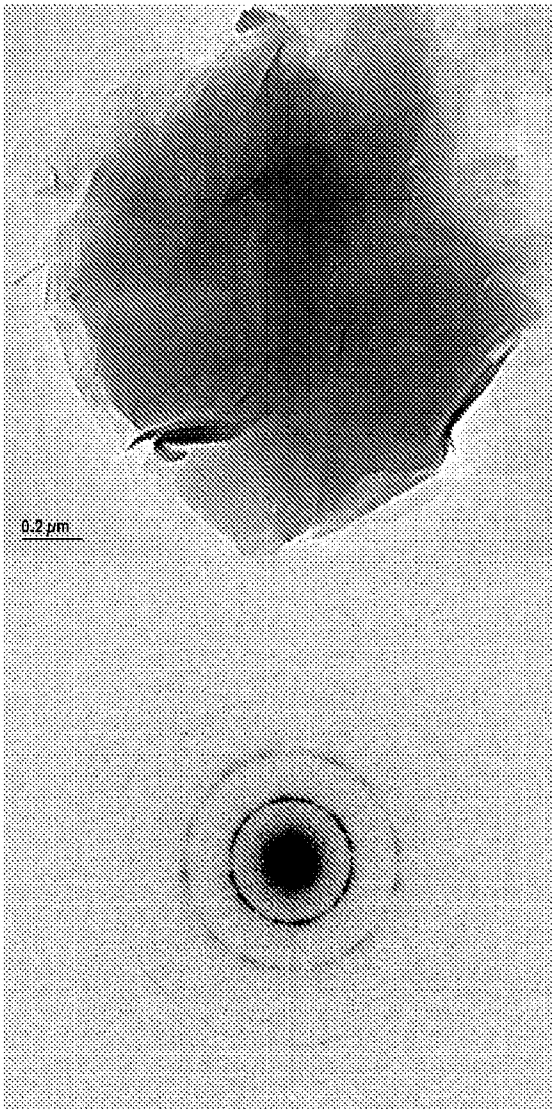
FIG. 10 shows another embodiment of montmorillonite with a compacted subhedral lamellar aggregate surrounded by subhedral platelets.

FIG. 10 shows compacted subhedral lamellar aggregate, from ~2.5 μm to ~2.8 μm in diameter, surrounded by subhedral platelets. The darkest areas show particle folds that vary from ~0.6 μm to ~0.75 μm in length. A small quartz particle, ~0.3 μm, is located above the main aggregate. SAED pattern taken at 60 cm is dominated by rings indicates turbostratic stacking.

Figure 11:
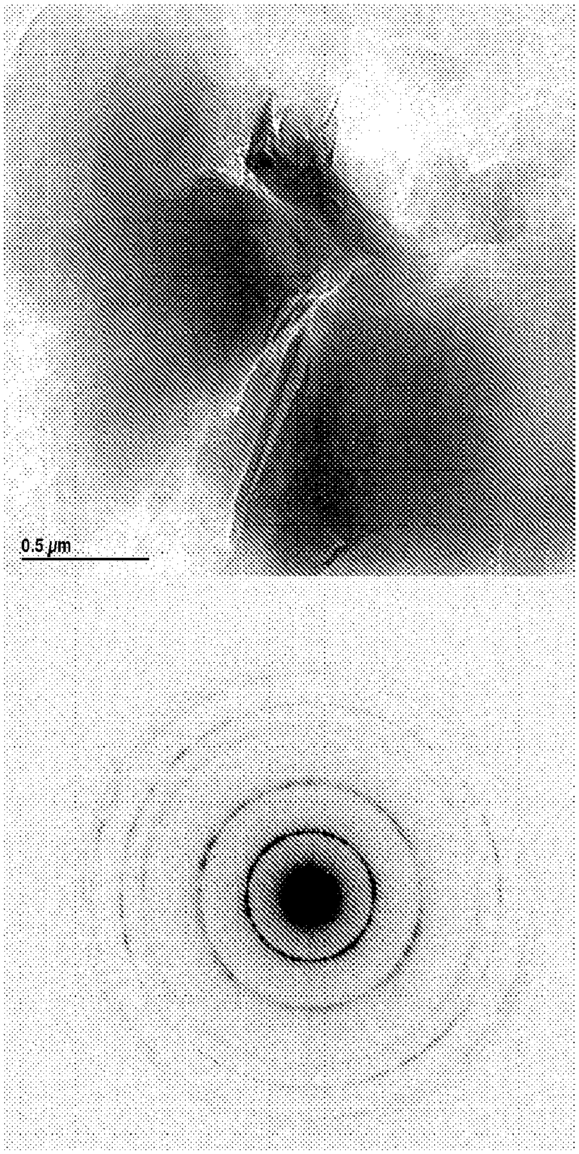
FIG. 11 shows foliated lamellar aggregates, compacted subhedral lamellar aggregate, and compacted subhedral lamellar aggregate with lath formations between the middle and bottom particles of montmorillonite.

FIG. 11 shows at top: foliated lamellar aggregate, ~0.25 μm to ~0.75 μm in length, with fibrous formations along the top portion of the particle. In the middle, what is shown is compacted subhedral lamellar aggregate with dimensions ranging from ~0.5 μm to ~0.75 μm. At the bottom, what is shown is compacted subhedral lamellar aggregate with dimensions ranging from ~0.9 μm to ~1.1 μm, with lath formations between the middle and bottom particles. All three aggregates are surrounded by subhedral platelets. SAED pattern taken at 60 cm is dominated by rings indicates turbostratic stacking.

Figure 12:
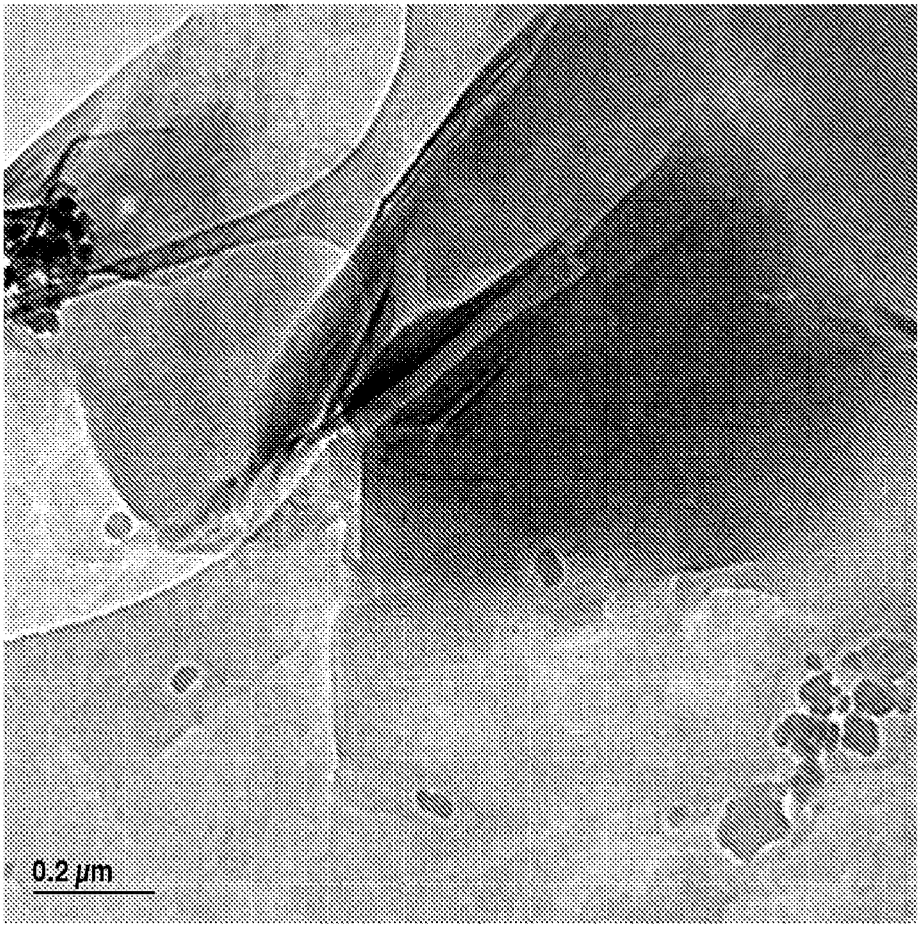
FIG. 12 shows an embodiment of montmorillonite with a foliated lamellar aggregate surrounded by subangular quartz fragments.

FIG. 12 shows foliated lamellar aggregate, ~3.4 μm to 5.0+ μm, surrounded by subangular quartz fragments, ~0.1 m to ~0.6 μm. Particles are bordered by subhedral platelets.

Figure 13:
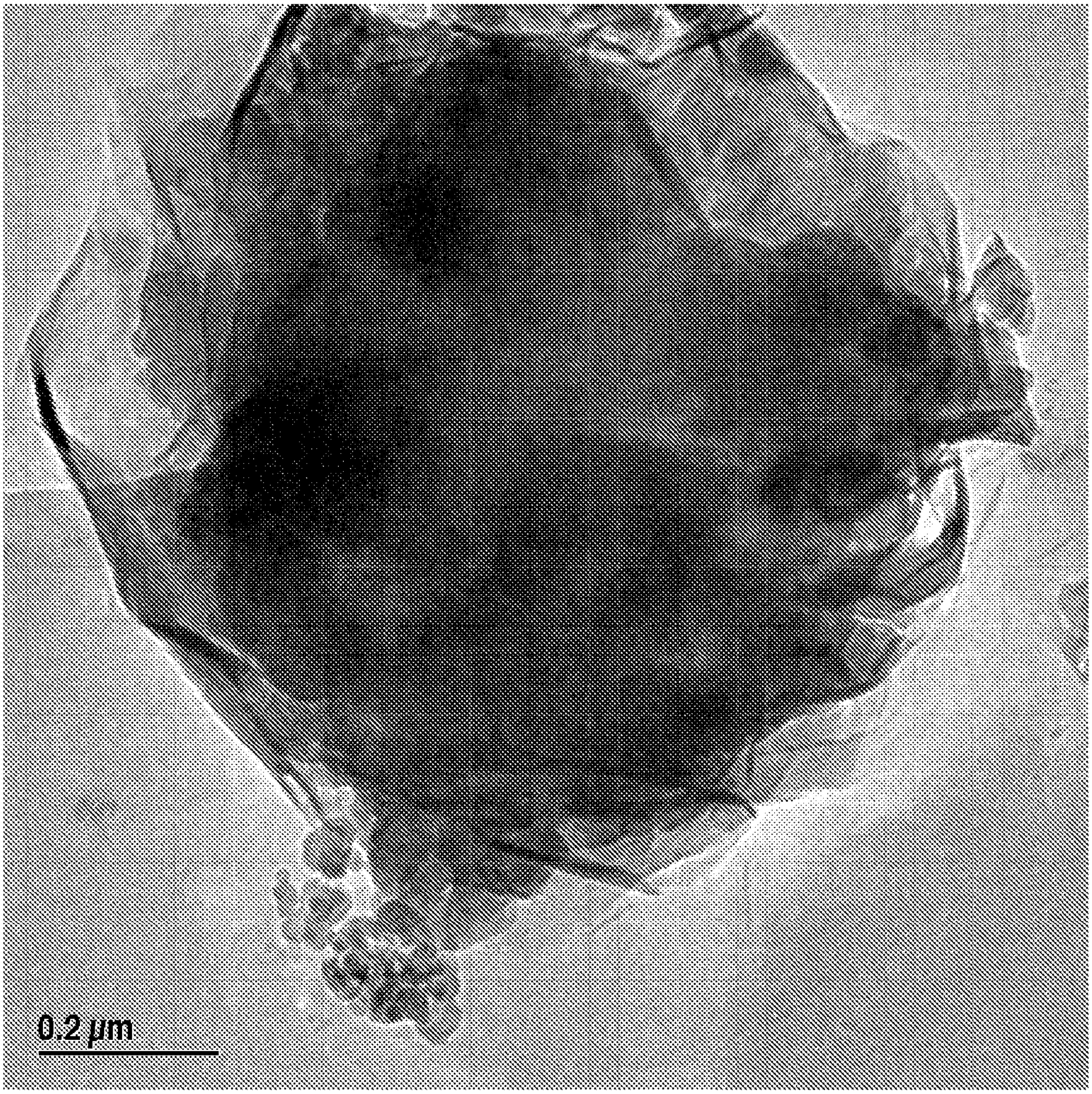
FIG. 13 shows a foliated lamellar aggregate of montmorillonite with folded, curled, and straight edges.

FIG. 13 shows foliated lamellar aggregate, ~1.0 μm to ~1.2 μm, with folded, curled, and straight edges. Subangular quartz fragments, ~0.05 μm to ~0.2 μm, accumulated at lower portion of main particle. Aggregate is surrounded by subhedral platelets.

Figure 14:
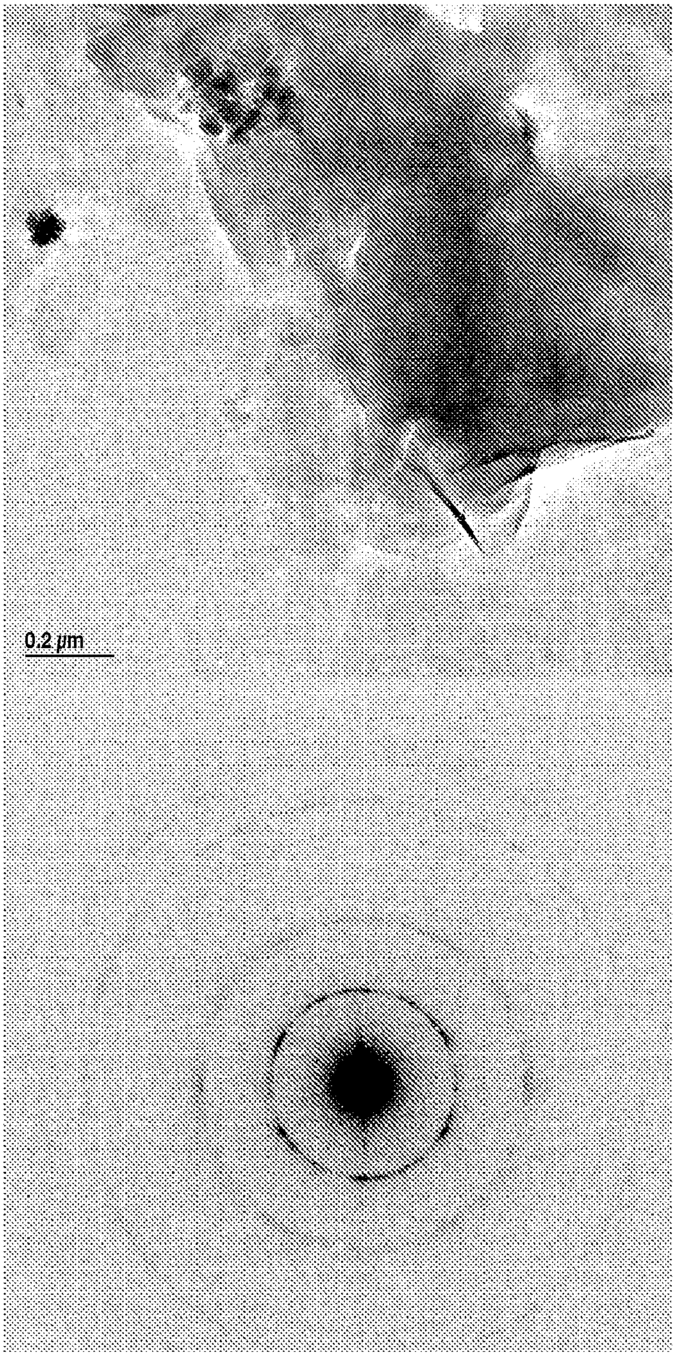
FIG. 14 shows a compacted subhedral lamellar aggregate of montmorillonite with straight and curled edges.

FIG. 14 shows compacted subhedral lamellar aggregate, ~2.8 μm to ~5.4 μm in diameter, with straight and curled edges. Recrystallizing, subangular quartz fragments, ~0.1 μm to ~0.4 μm, form within main aggregate. Subangular quartz aggregate, ~0.4 μm, left side of main aggregate. Analysis is surrounded by subhedral platelets. SAED pattern taken at 60 cm is dominated by rings indicates turbostratic stacking.

Figure 15:
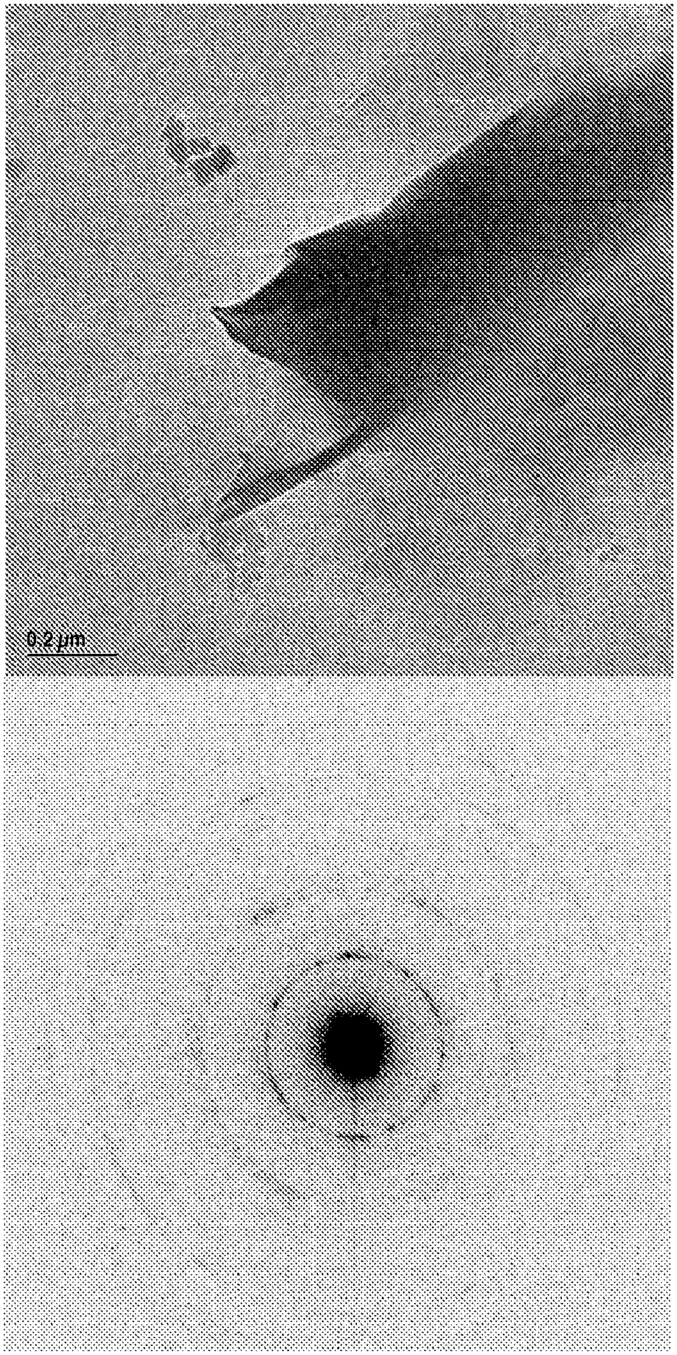
FIG. 15 shows a foliated lamellar aggregate of montmorillonite with straight and folded edges.

FIG. 15 shows foliated lamellar aggregate, ~1.6 μm to ~4.6+ μm, with straight and folded edges. Subangular quartz aggregates located above the main fragment, ~0.2 μm, and below the main fragment, ~0.1 m to ~0.2 μm. Subhedral platelets surrounding the bottom side of the particle. SAED pattern taken at 60 cm is dominated by rings indicates turbostratic stacking.

Figure 16:
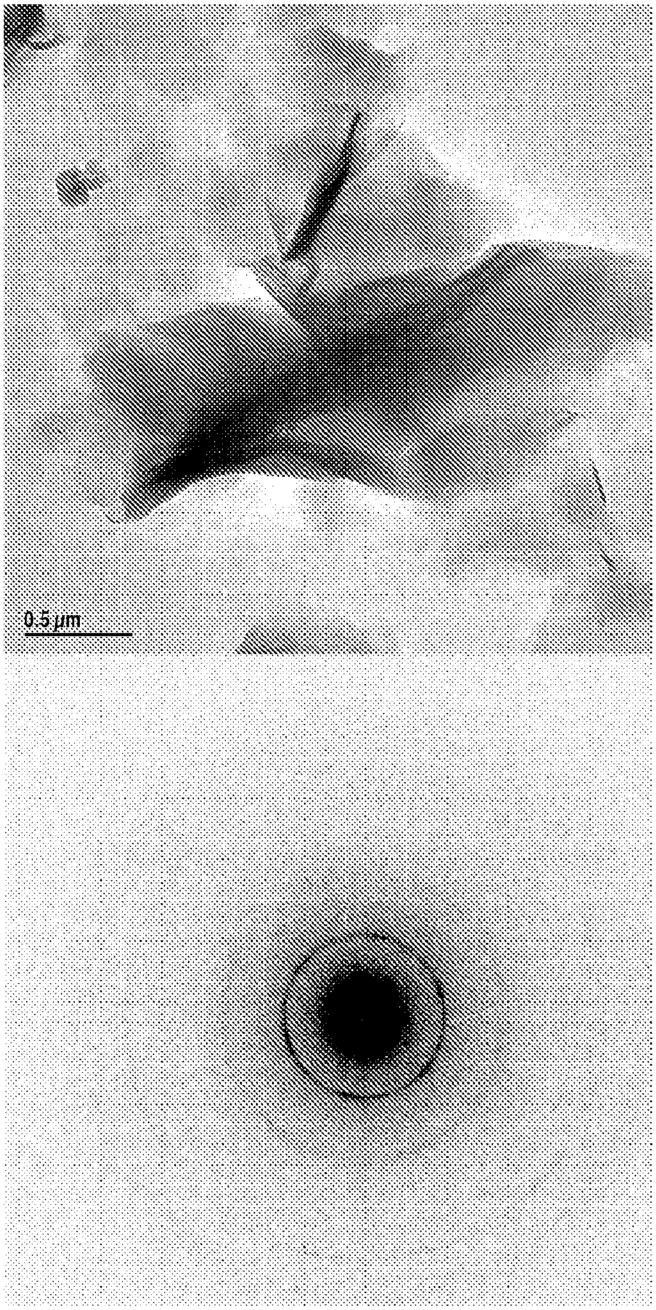
FIG. 16 shows a foliated lamellar aggregate of montmorillonite with a folded aggregate.

FIG. 16 shows foliated lamellar aggregate, ~1.0 μm to ~2.9 μm, with a folded aggregate, ~0.8 μm. Subangular quartz aggregates, ~0.25 μm to ~0.3 μm. Particle surrounded by subhedral platelets. SAED pattern taken at 60 cm is dominated by rings indicates turbostratic stacking.

Figure 17:
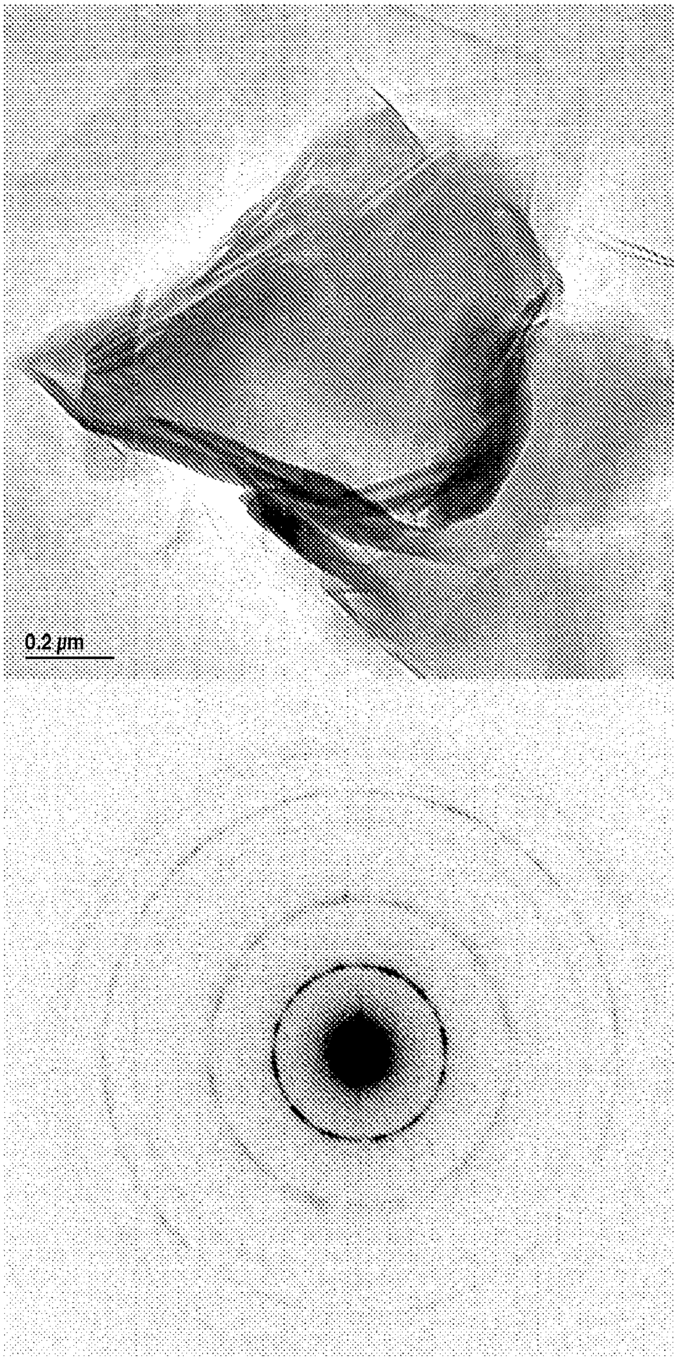
FIG. 17 shows an angular foliated lamellar aggregate of montmorillonite.

FIG. 17 shows angular foliated lamellar aggregate, ~1.6 μm to ~2.2 μm. Particle edges are folded, ~2.4 μm to ~3.8 μm. Particle is surrounded by angular platelets. SAED pattern taken at 60 cm is dominated by rings indicates turbostratic stacking.

Figure 18:
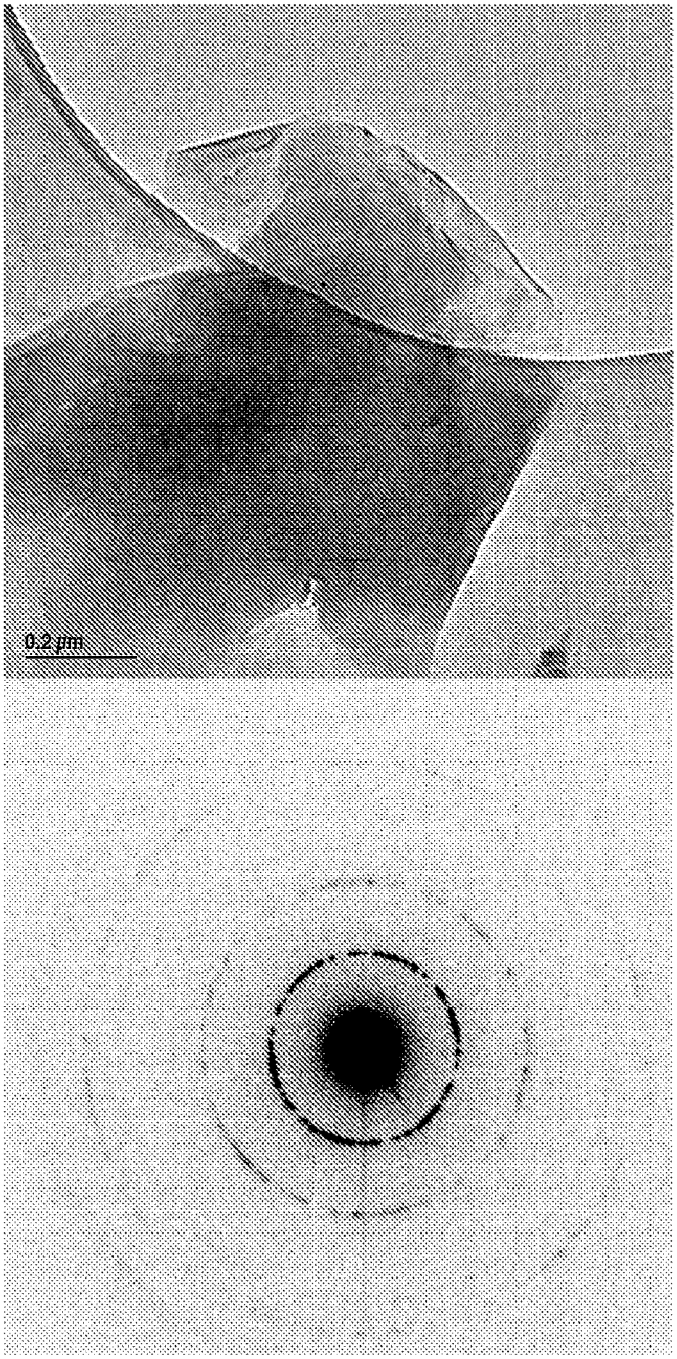
FIG. 18 shows a compacted subhedral lamellar aggregate of montmorillonite.

FIG. 18 shows compacted subhedral lamellar aggregate, ~0.8 μm to ~1.2 μm. Particle is hanging over a hole, top right, of the carbon film. The top edge of the particle is curled, ~1.0 μm. An angular quartz aggregate, ~0.05 μm, located at bottom of particle. Subhedral platelets surround particle on the carbon film side. SAED pattern taken at 60 cm is dominated by rings indicates turbostratic stacking.

Figure 19:
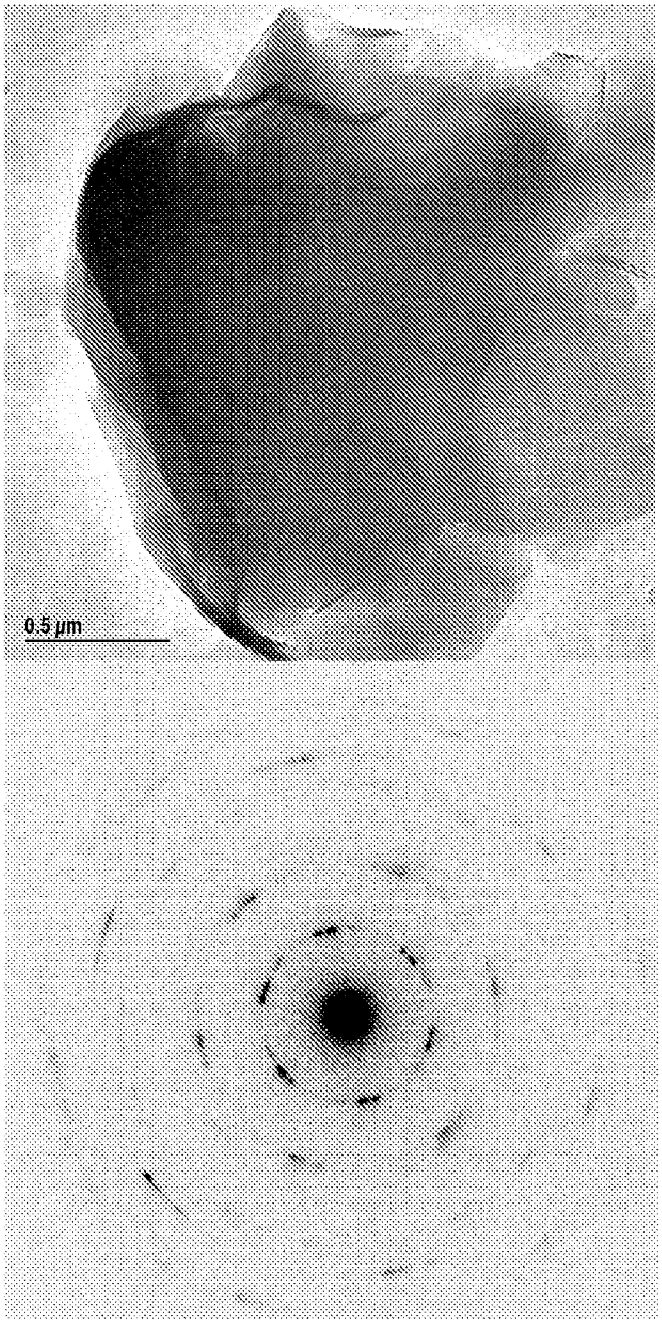
FIG. 19 shows an embodiment of a foliated lamellar aggregate of montmorillonite.

FIG. 19 shows foliated lamellar aggregate, ~2.5 μm to ~3.0 μm. Left side of particle edges are folded, ~3.0 μm. Edges are curling on the top portion of the particle, ~0.1 μm to ~0.5 μm. Subhedral platelets surround the upper left portion of particle. SAED pattern taken at 60 cm is dominated by rings indicates turbostratic stacking. Some discrete [hk0] reflections are observed indicating a higher degree of crystallinity than most other particles.

Figure 20:
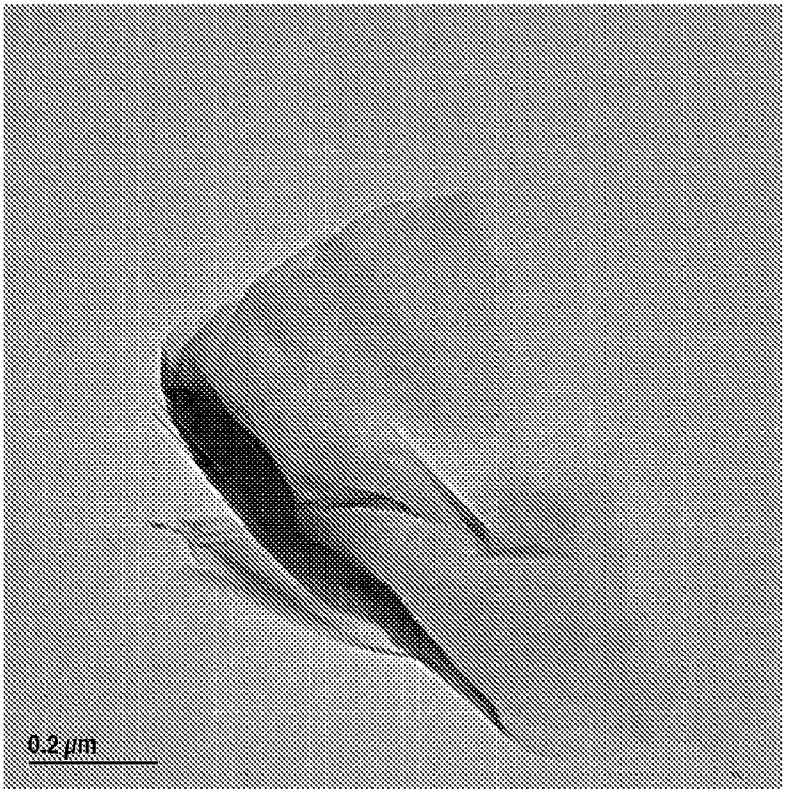
FIG. 20 shows another embodiment of a foliated lamellar aggregate of montmorillonite.

FIG. 20 shows foliated lamellar aggregate, ~0.6 μm to ~1.0 μm. Left side of the particle edges are folded and curled upwards, ~0.8 μm. A small fold, ~0.25 μm, is located in the center of the particle. The upper platelets, ~0.25 μm to ~0.4 μm, overlap each other on the upper portion of the particle. Subhedral platelets surround the whole particle.

Figure 21:
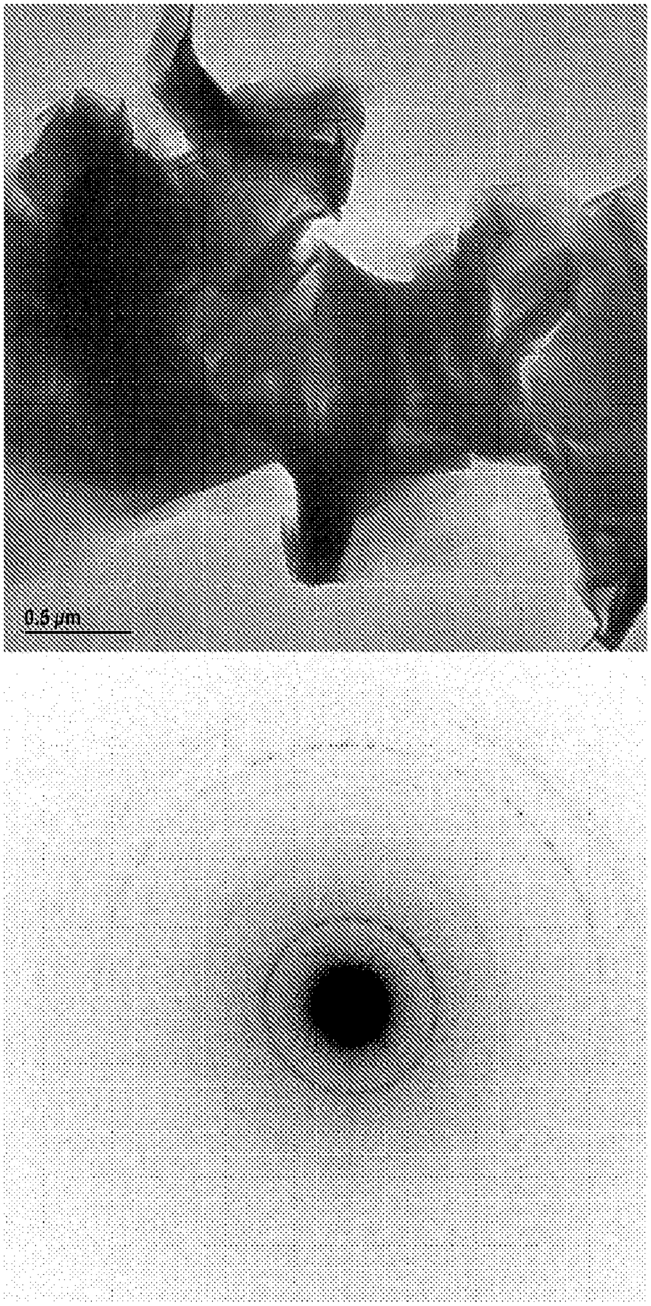
FIG. 21 shows yet another embodiment of a foliated lamellar aggregate of montmorillonite.

FIG. 21 shows foliated lamellar aggregate, ~1.5 μm to ~3.1+ μm. Massive folds throughout particle. Curled edges around the perimeter. SAED pattern taken at 60 cm is dominated by rings indicates turbostratic stacking.

Figure 22:
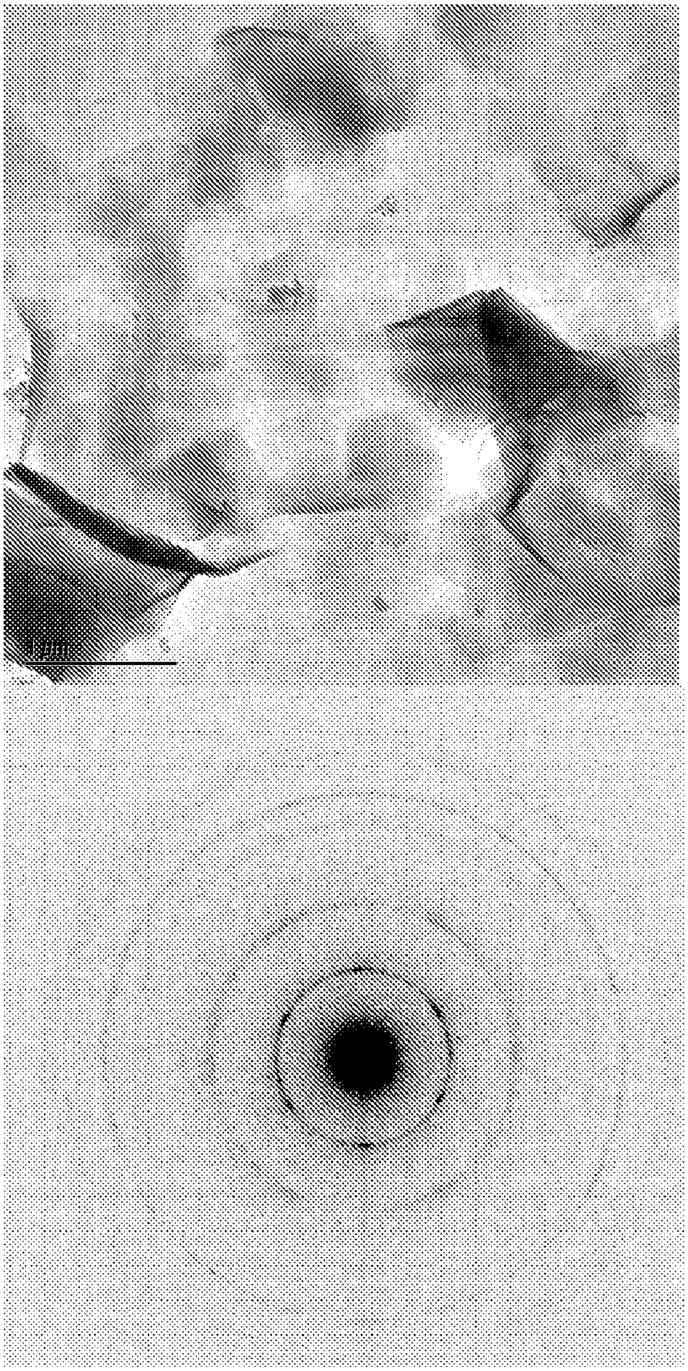
FIG. 22 shows compacted subhedral and foliated lamellar aggregates of montmorillonite.

FIG. 22 shows at the top: compacted subhedral lamellar aggregate, ~0.7 μm to ~1.2 μm. Upper portion of particle is folded, ~0.5 μm. In the middle, what is shown is foliated lamellar aggregate, ~0.6 μm to ~1.5 μm. Curled particle edges are ~0.8 μm. At the bottom, what is shown is foliated lamellar aggregate, ~1.1 μm to ~1.5+ μm. Top of particle is curled, ~2.0 μm. Subhedral platelets surround the three aggregates. Subangular quartz aggregates, ~0.5 μm to ~0.1 μm. SAED pattern taken at 60 cm is dominated by rings indicates turbostratic stacking.

Figure 23:
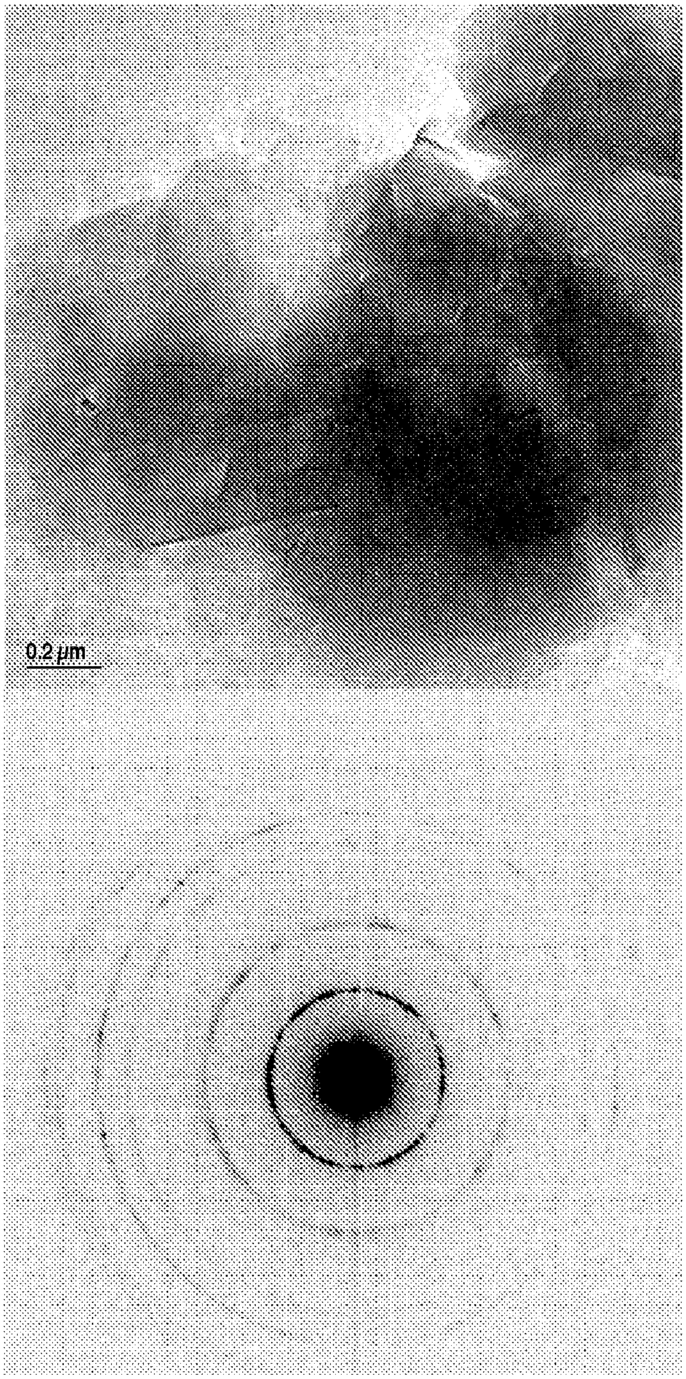
FIG. 23 shows two compacted subhedral lamellar aggregates of montmorillonite.

FIG. 23 shows two compacted subhedral lamellar aggregates, ~0.3 μm to ~1.0 μm. Subhedral platelets surround both particles. SAED pattern taken at 60 cm is dominated by rings indicates turbostratic stacking.

Figure 24:
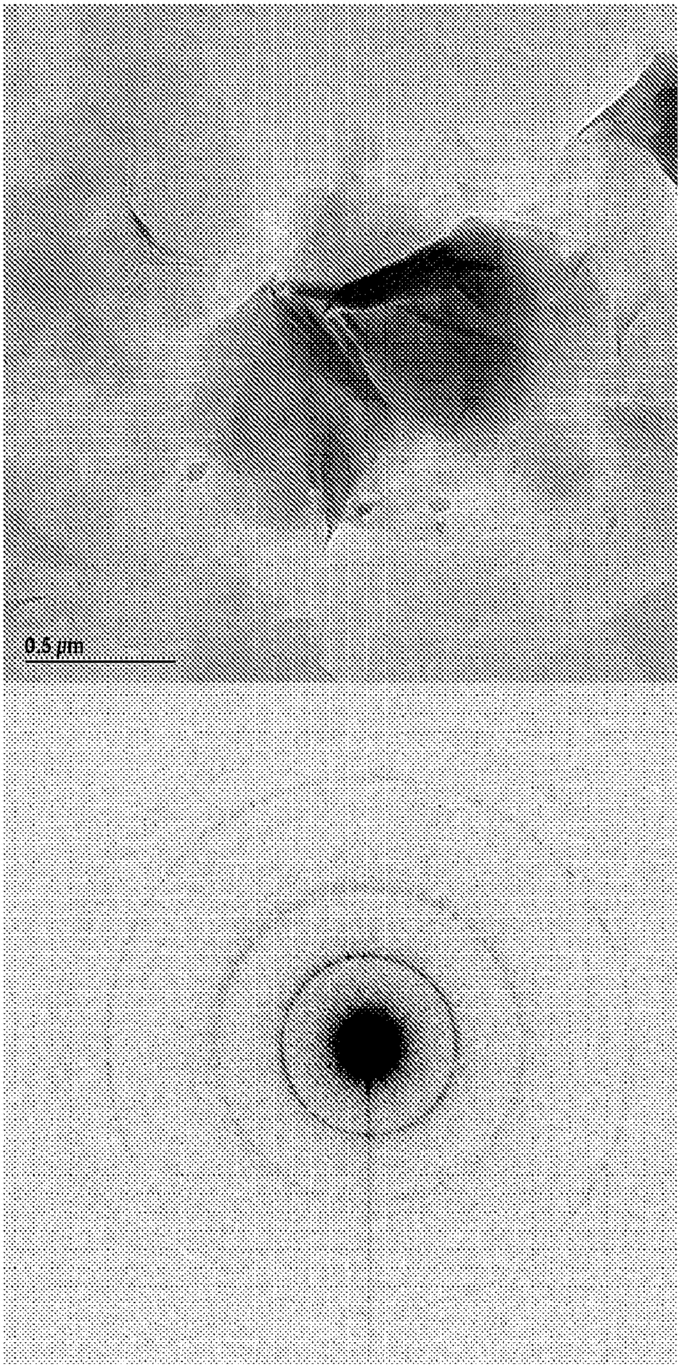
FIG. 24 shows two agglomerated foliated lamellar aggregates of montmorillonite.

FIG. 24 shows two agglomerated foliated lamellar aggregates, ~0.6 μm to ~0.75 μm. A compact lamellar aggregate, ~0.75 μm to ~1.2 μm, with a fold in the center, ~0.15 μm, resides in the upper left corner. Subangular quartz grains, ~0.1 μm. Subhedral platelets surround the particles. SAED pattern taken at 60 cm is dominated by rings indicates turbostratic stacking.

Figure 25:
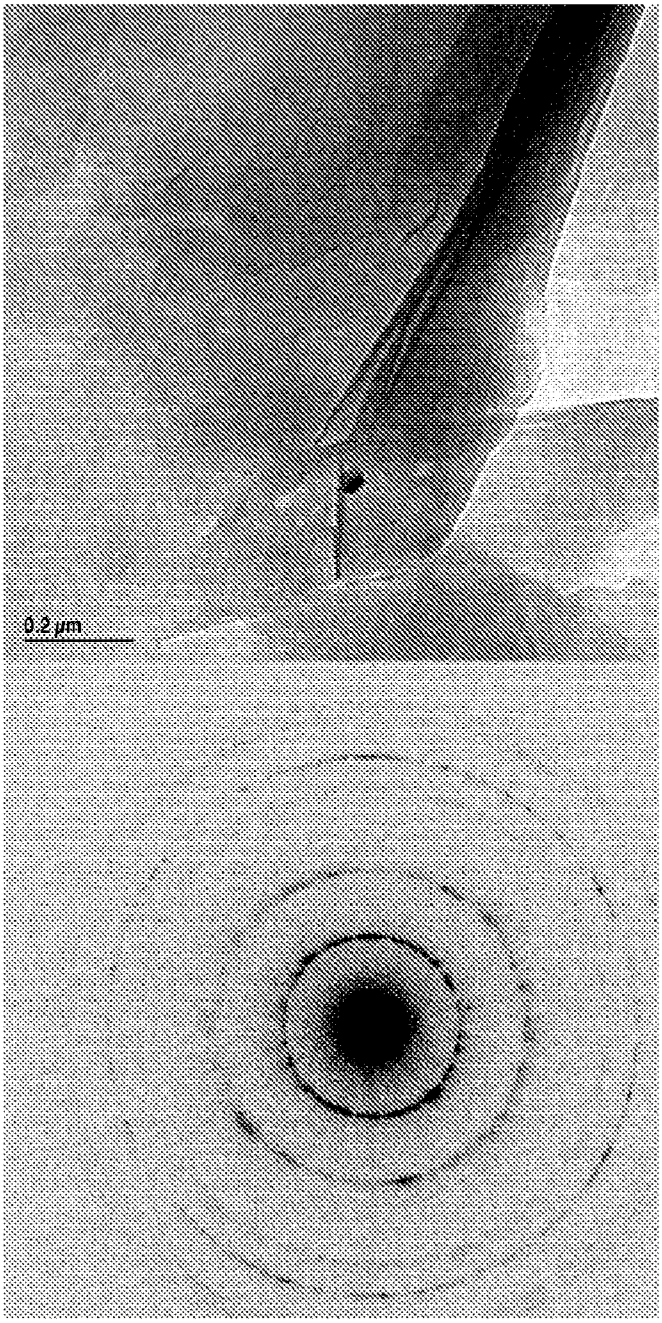
FIG. 25 shows a large montmorillonite aggregate with folding along the particle edges.

FIG. 25 shows a large montmorillonite aggregate with folding along the particle edges. The angle of the particle is approximately 120°. SAED pattern taken at 60 cm is dominated by rings indicates turbostratic stacking.

Figure 26:
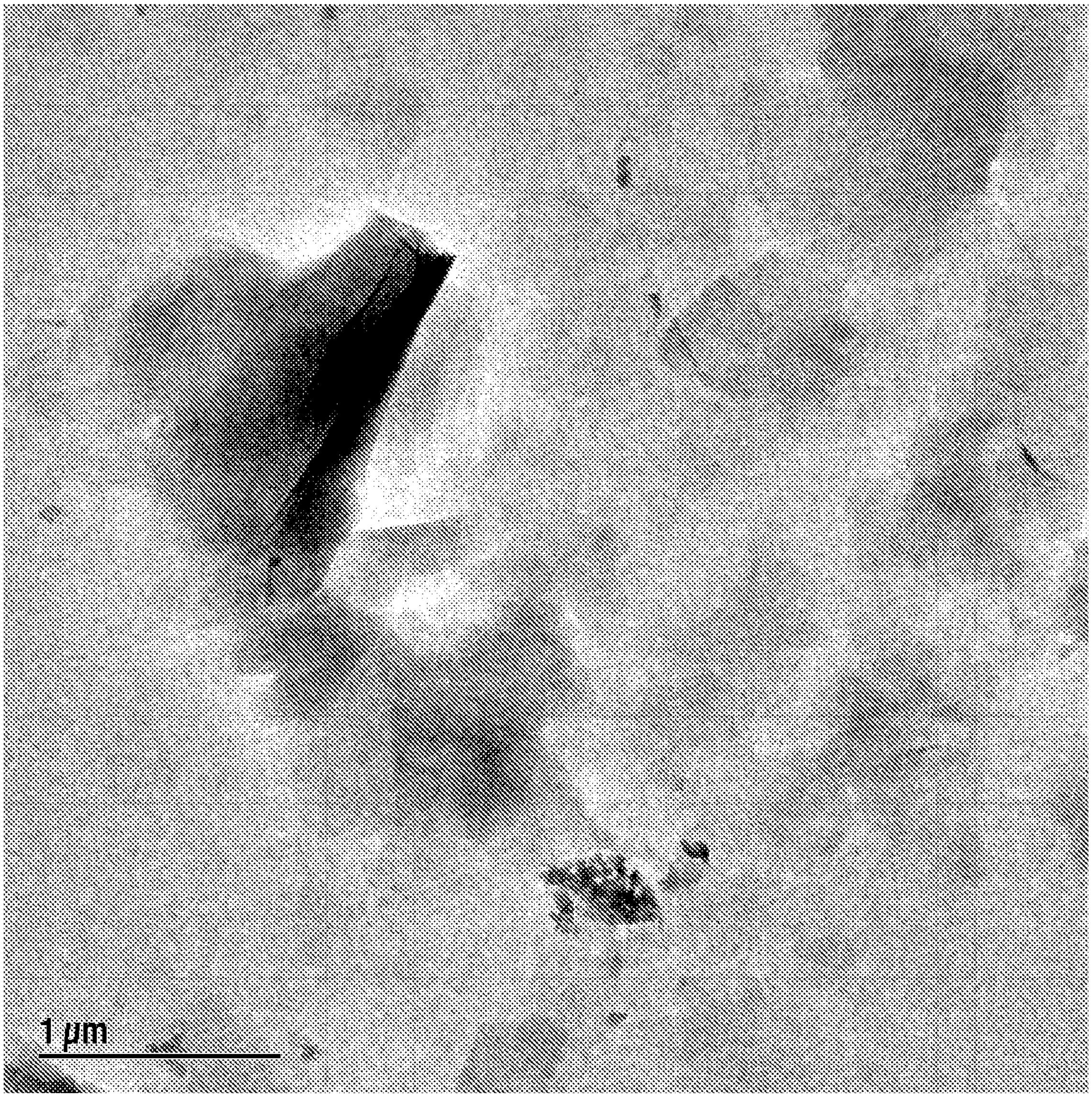
FIG. 26 shows foliated lamellar and angular quartz aggregates of montmorillonite.

FIG. 26 shows foliated lamellar aggregate, ~1.0 μm to ~1.9 μm. Heavy folding occurring along the right side of particle. Angular quartz aggregate, ~0.2 μm to ~0.5 μm. Subhedral platelets surround the particles.

Figure 27:
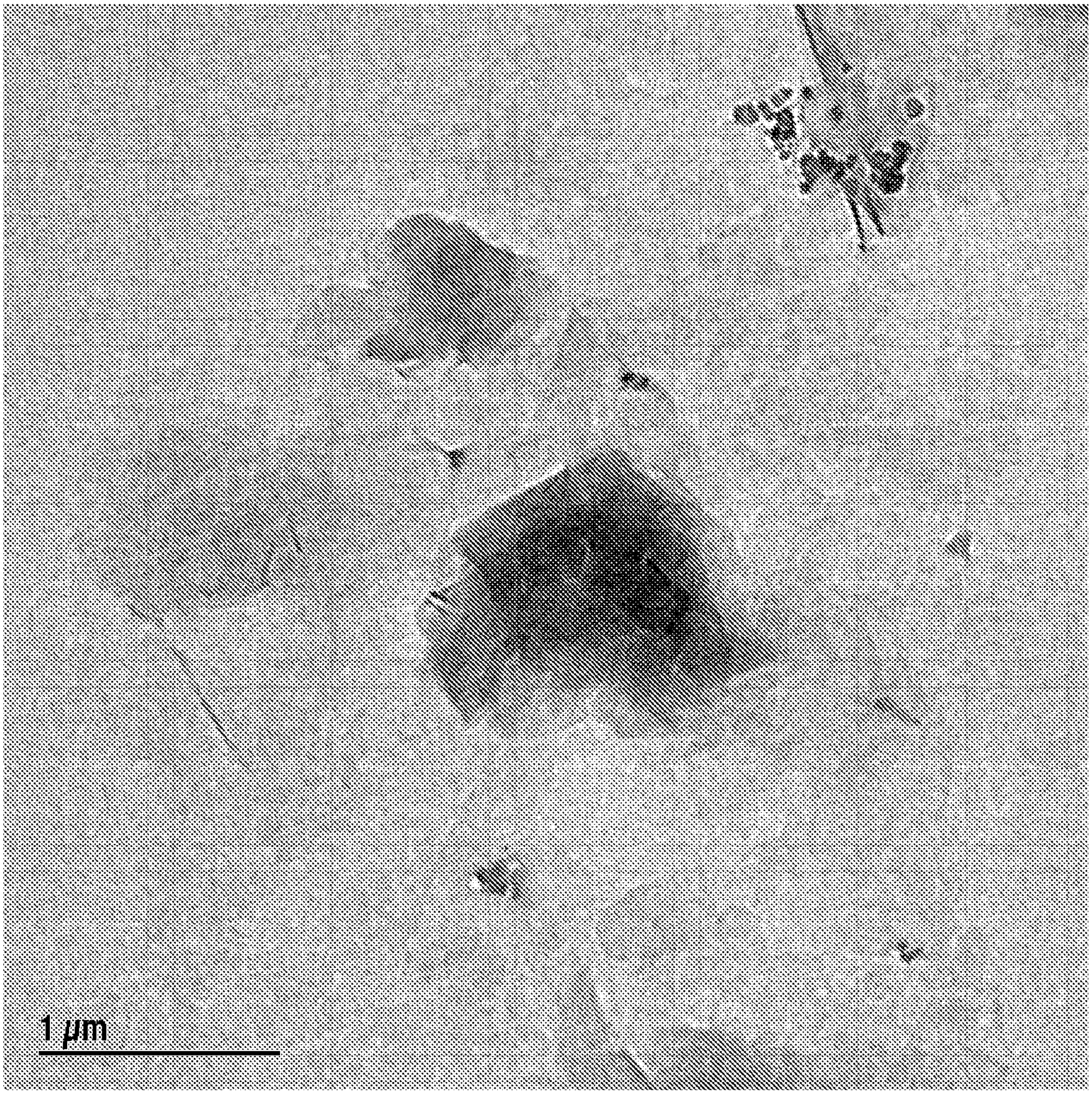
FIG. 27 shows two platy montmorillonite particles overlapping.

FIG. 27 shows two platy montmorillonite particles overlapping, ~0.8 μm to ~1.2 μm. Quartz aggregates are ~0.05 μm to ~0.1 μm. Compacted subhedral lamellar aggregate are ~0.6 μm to ~1.0 μm. Quartz particles dispersed around the larger particles are ~0.05 μm to ~0.1 μm. Subhedral platelets surround all of the particles.

Figure 28:
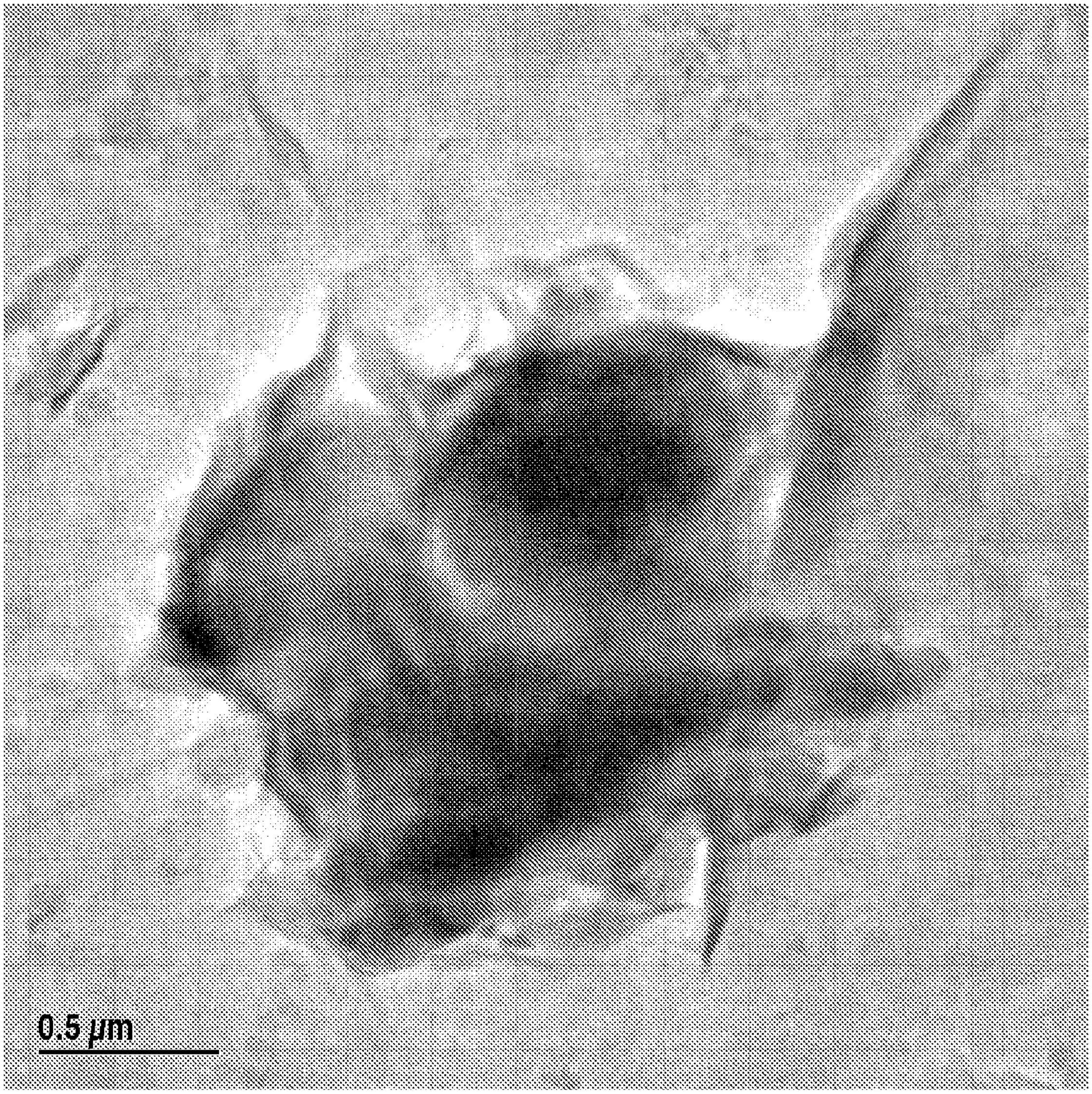
FIG. 28 shows yet another foliated lamellar aggregate of montmorillonite.

FIG. 28 shows foliated lamellar aggregate, ~2.0 μm to ~3.5 μm. Particle edges are folded and curled. Subhedral platelets surround the particle. Quartz aggregates are located above particle.

Figure 29:
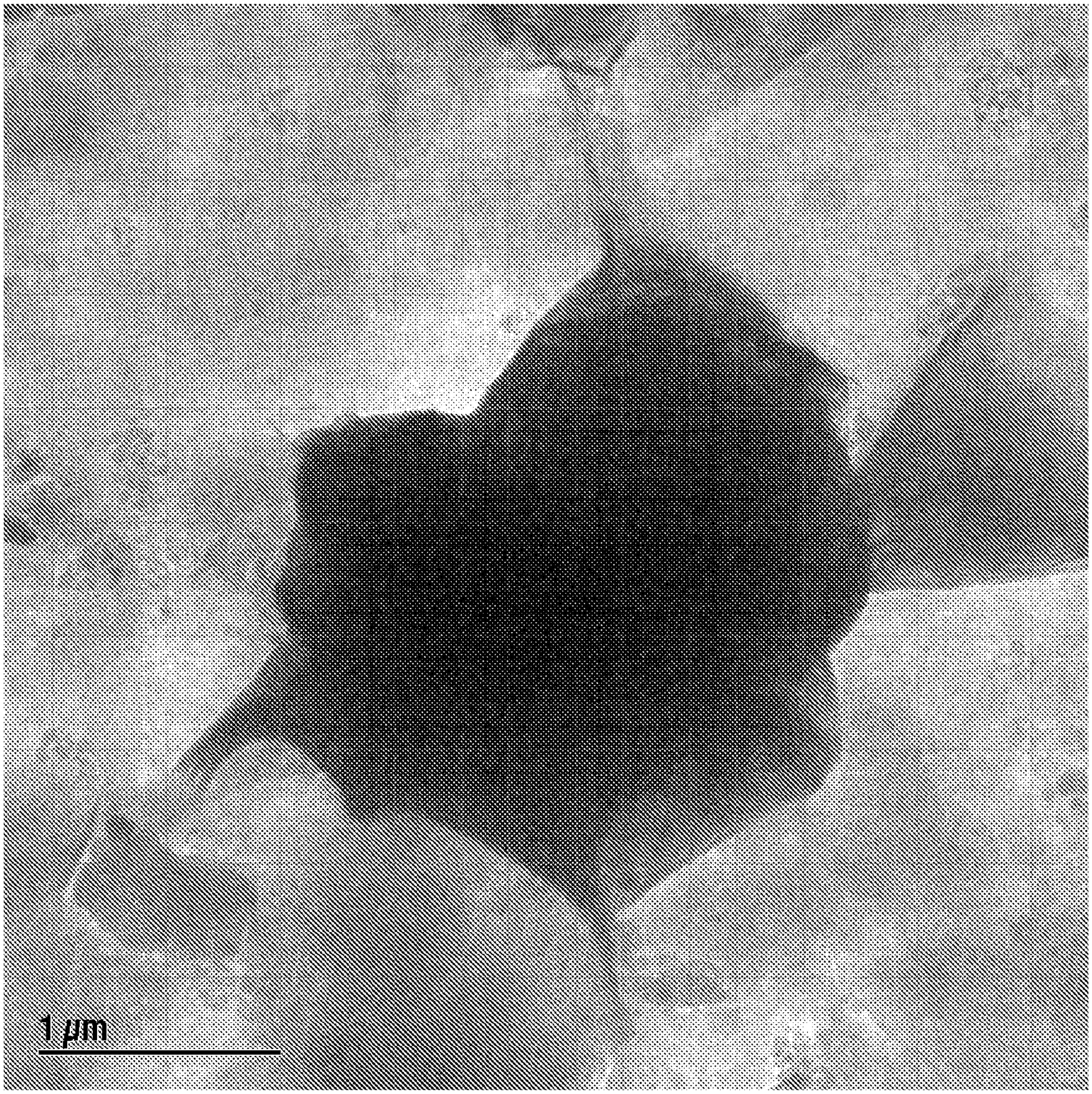
FIG. 29 shows another platy particle of montmorillonite.

FIG. 29 shows platy particle, ~2.0 μm to ~2.2 μm. Quartz aggregates dispersed around platy particle are ~0.2 μm. Subhedral platlets surround quartz and platy aggregates.

Figure 30:
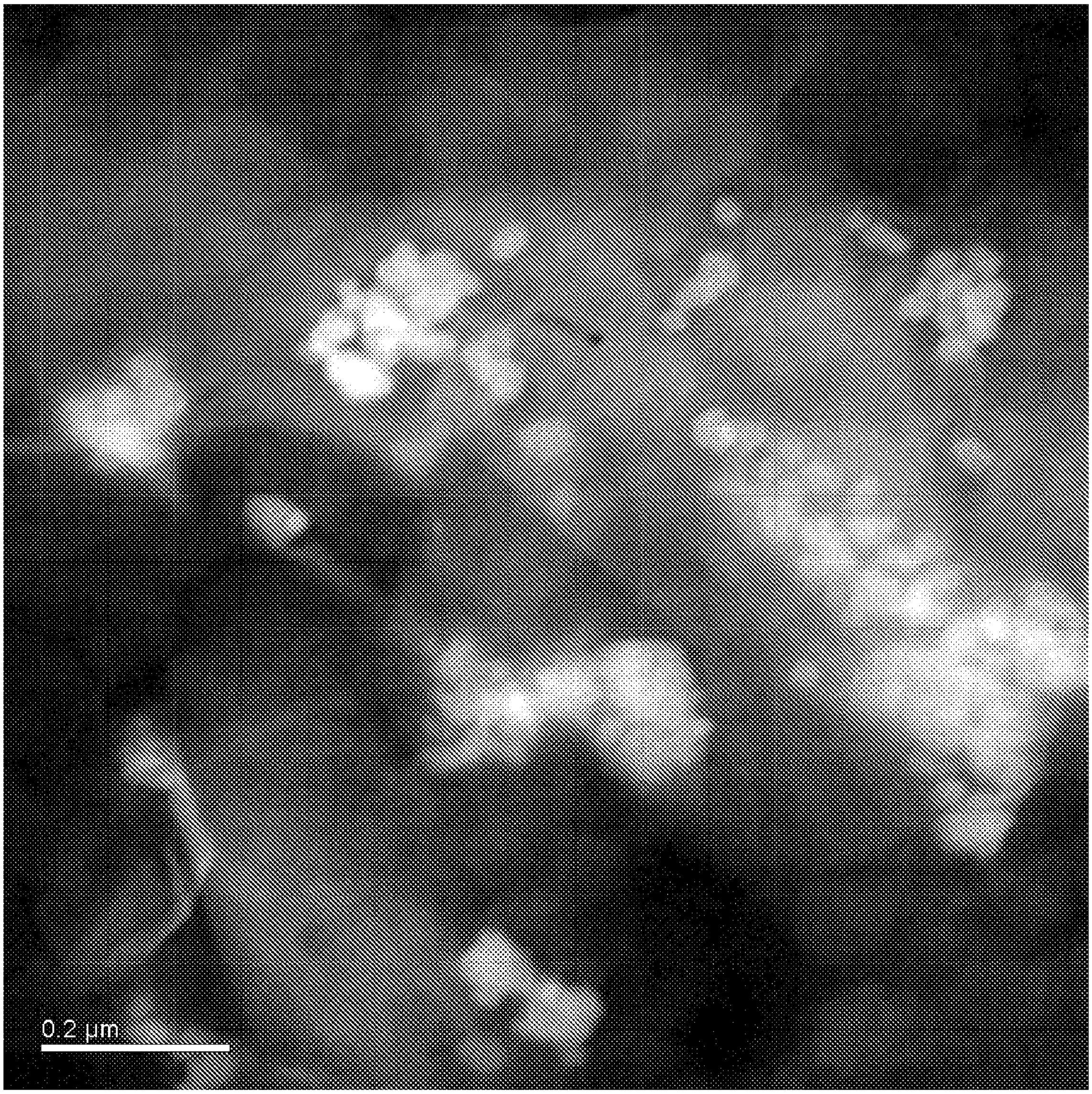
FIG. 30 shows an embodiment of a dark field image of montmorillonite particles.

FIG. 30 shows dark field image of montmorillonite particles ranging from ~0.8 μm to ~1.2 μm and from ~0.2 μm to ~0.6 μm. Quartz aggregates inside particle are ~0.05 μm to ~0.1 μm.

Figure 31:
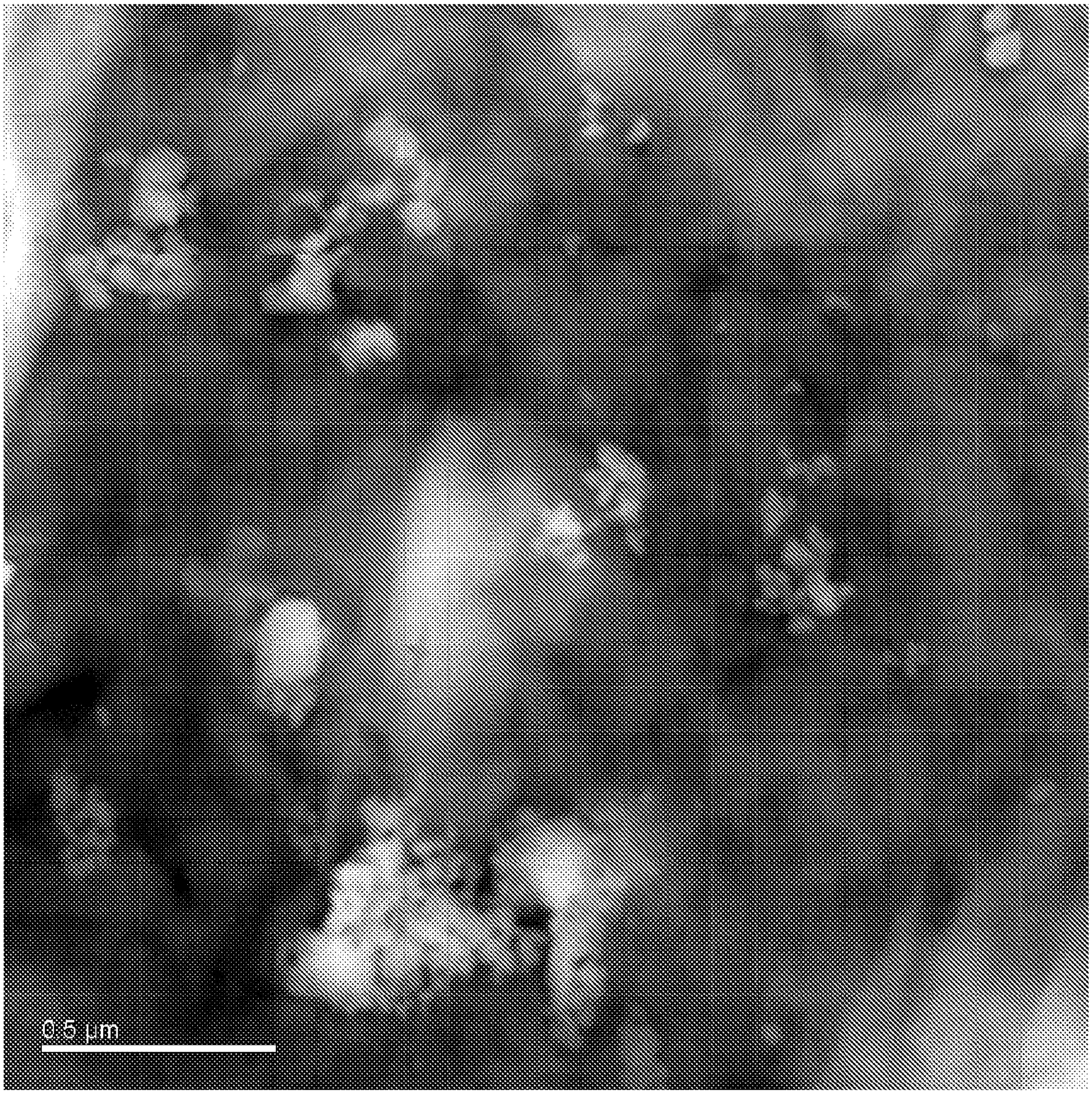
FIG. 31 shows another embodiment of a dark field image of montmorillonite particles.
Figure 32:
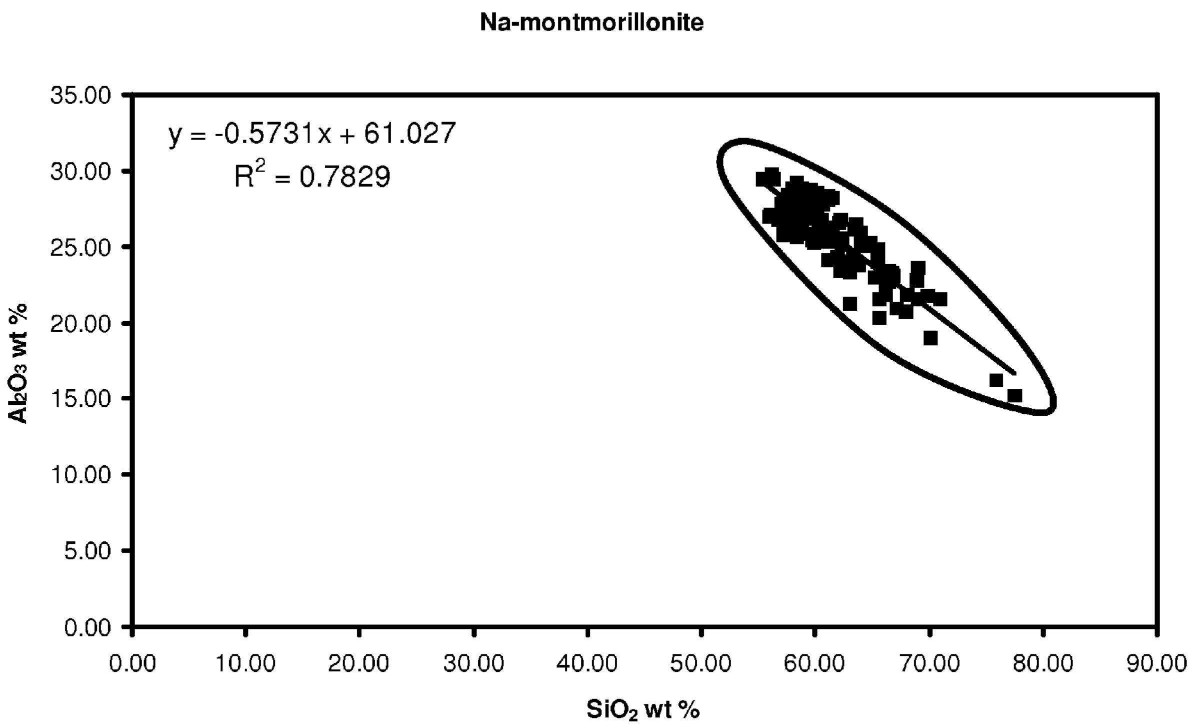
FIG. 32 shows a Na-montmorillonite concentration plot between $Al_2O_3$ and $SiO_2$.
Figure 33:
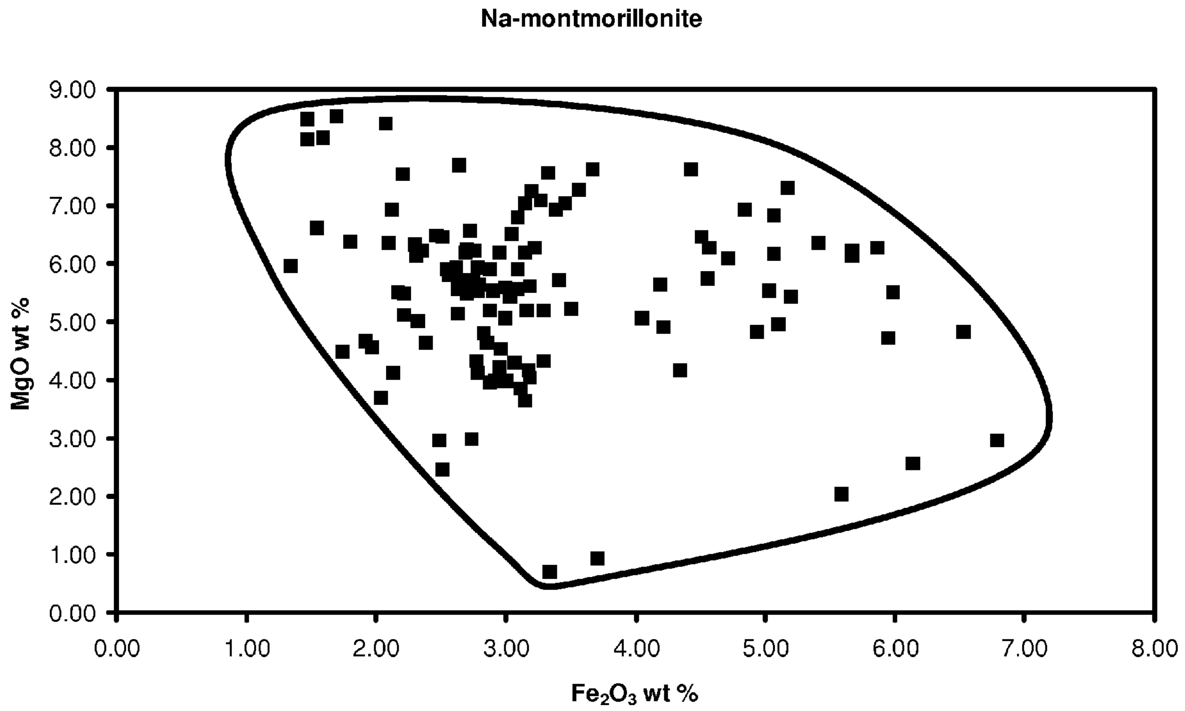
FIG. 33 shows a Na-montmorillonite concentration plot between MgO and $Fe_2O_3$.
Figure 34:
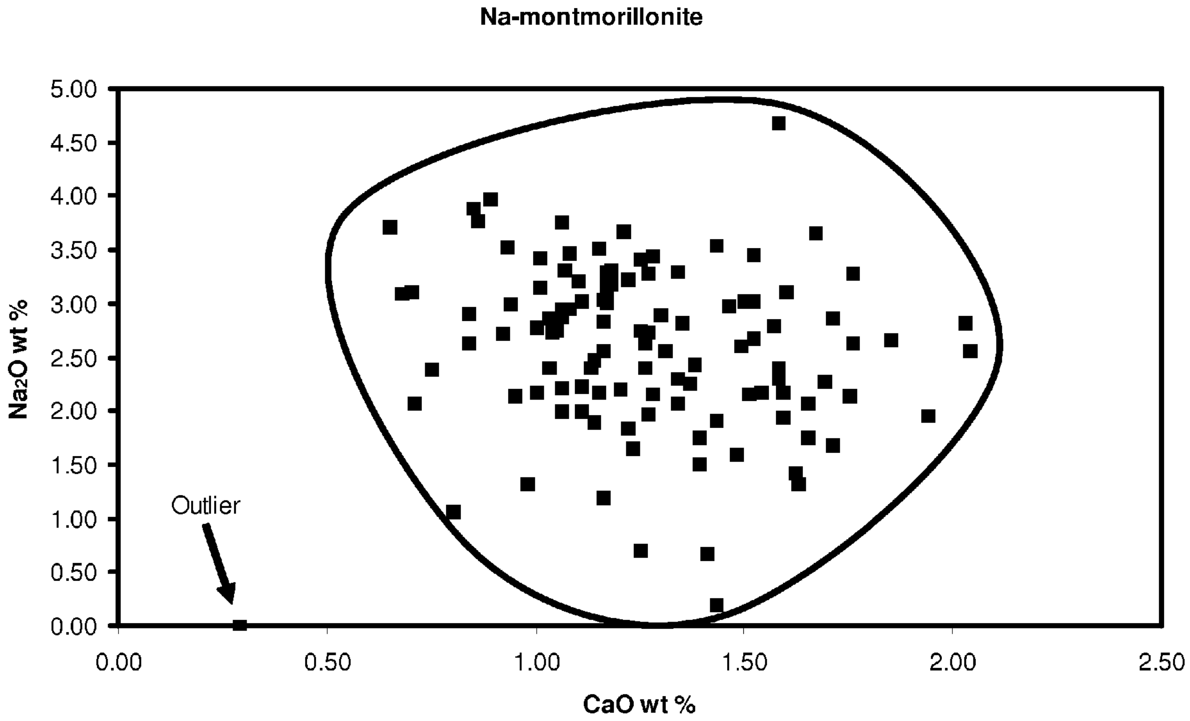
FIG. 34 shows a Na-montmorillonite concentration plot between $Na_2O$ and CaO.
Figure 35:
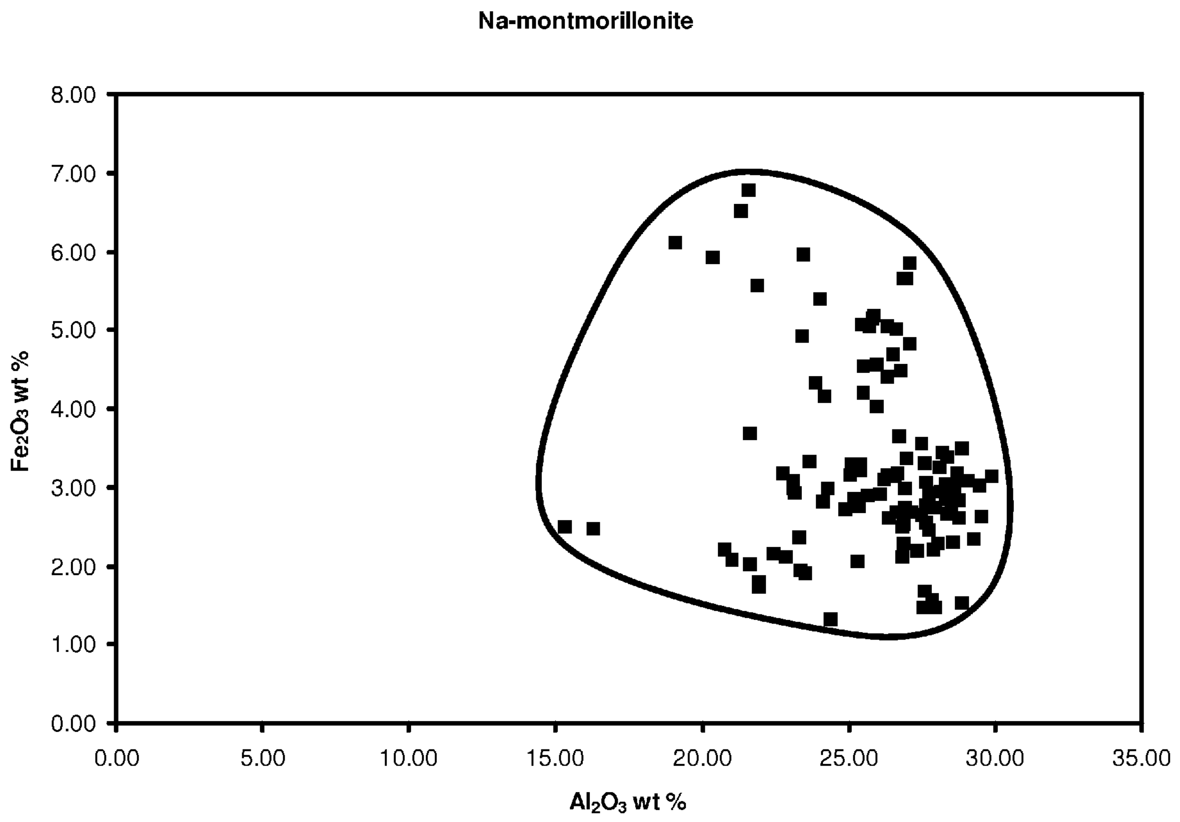
FIG. 35 shows a Na-montmorillonite concentration plot between $Fe_2O_3$ and $Al_2O$.
Figure 36:
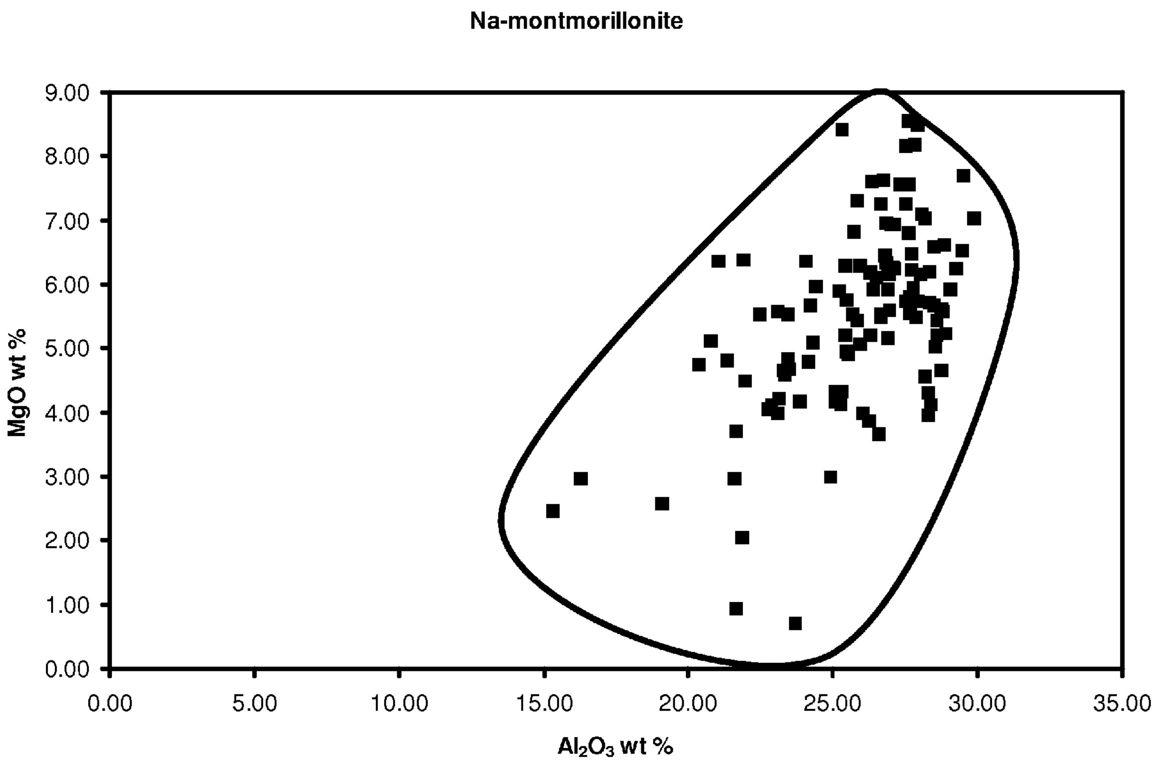
FIG. 36 shows a Na-montmorillonite concentration plot between MgO and $Al_2O_3$.

FIG. 31 shows dark field image of montmorillonite particles. Quartz aggregates dispersed around montmorillonite particles are ~0.25 μm to ~0.5 μm.

Although there may be analytical limitations involved with EDS, it usually is the only method that can provide individual chemical analyses on individual clay particles. The advantage here is that bulk analyses of clay materials are usually a summation of all of the chemical compositions of multiple minerals and thus the true variability of particle composition may not be realized. Several populations of differing compositions may mix to produce the same chemical compositions.

EDS analyses from a 300 kV TEM are generally of higher quality than those from an SEM operating at lower voltages. The use of a 300 kV beam typically ensures that any element with $Z>5$ (that is present at a concentrations greater than a few tenths of a weight percent) is detected. Furthermore, obtaining discrete EDS analyses on individual clay particles with an SEM can be challenging and not easily repeatable.

C. Properties and Behavior of the Aqueous Clay Suspension on CsCl

Repeated feasibility tests show that a small pile of CsCl that is approximately 1 inch in diameter can be contained by 20 to 30 pumps of aqueous clay suspension. The spraying of the suspension on the CsCl powder does not agitate and disperse the powder. This effect is due to the Theological properties of the suspension. The suspension self aggregates and seals the pile. The mixture can then be vacuumed or removed. Upon exchange with $Cs^+$, visible changes in the physical properties occur. After exchange, the color of the aqueous clay suspension turns to Munsell values of 5Y 7/2, 5Y 7/3, 5Y 6/2, 5Y 6/3 or intermediate colors between those values. A dramatic change in the rheological properities occurs where the gel-like consistency of the Na-montmorillonite completely disappears and becomes a waxy paste in the Cs-montmorillonite form. After material is collected it can be heated to 475° for a period of 2 to 7.5 hours. The result of this treatment is conversion of the paste or fluid to a solid brick like substance.

The color of the aqueous clay suspension as compared to a Munsell color chart varies slightly from 2.5Y 6/3 to 2.5Y 6/2. The color is generally uniform within analyses and is not streaked.

Figure 44:
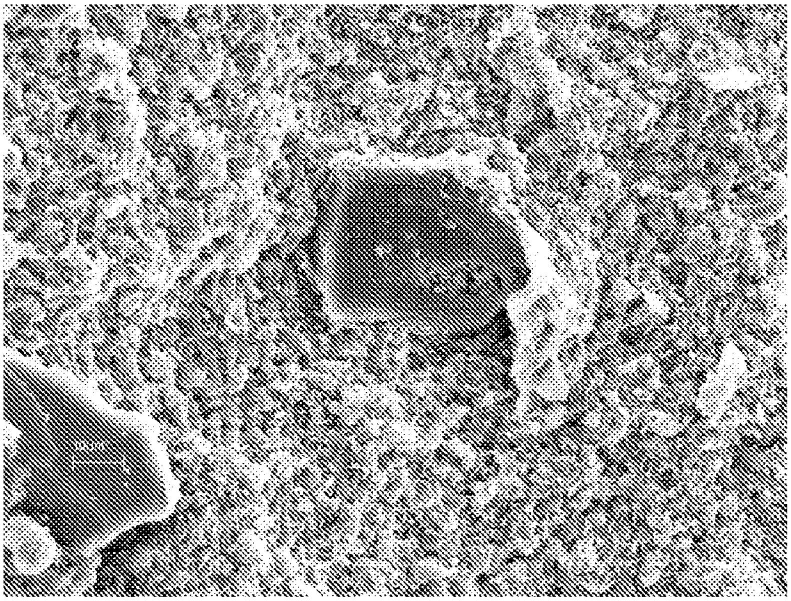
FIG. 44 shows an embodiment of heated Cs-exchanged montmorillonite in solidified state.
Figure 45:
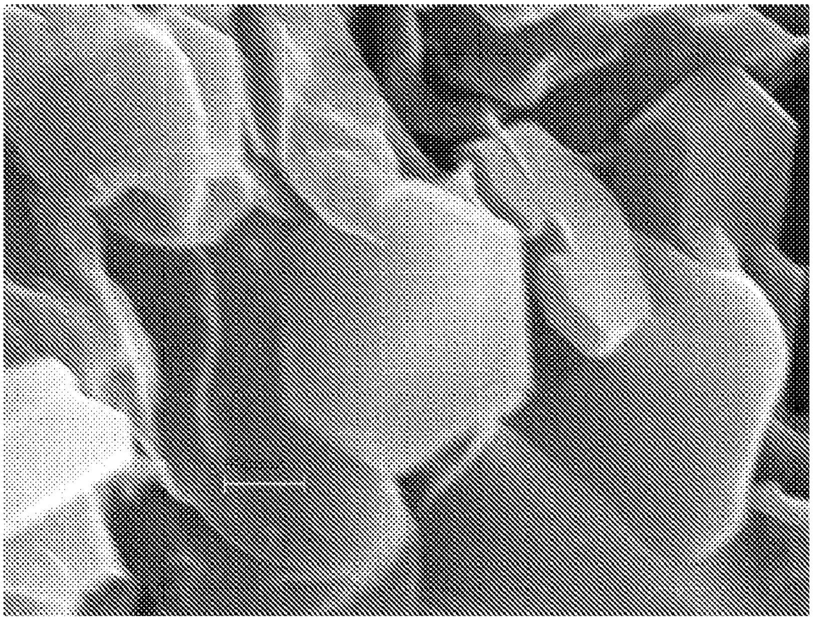
FIG. 45 shows another embodiment of heated Cs-exchanged montmorillonite in solidified state.
Figure 46:
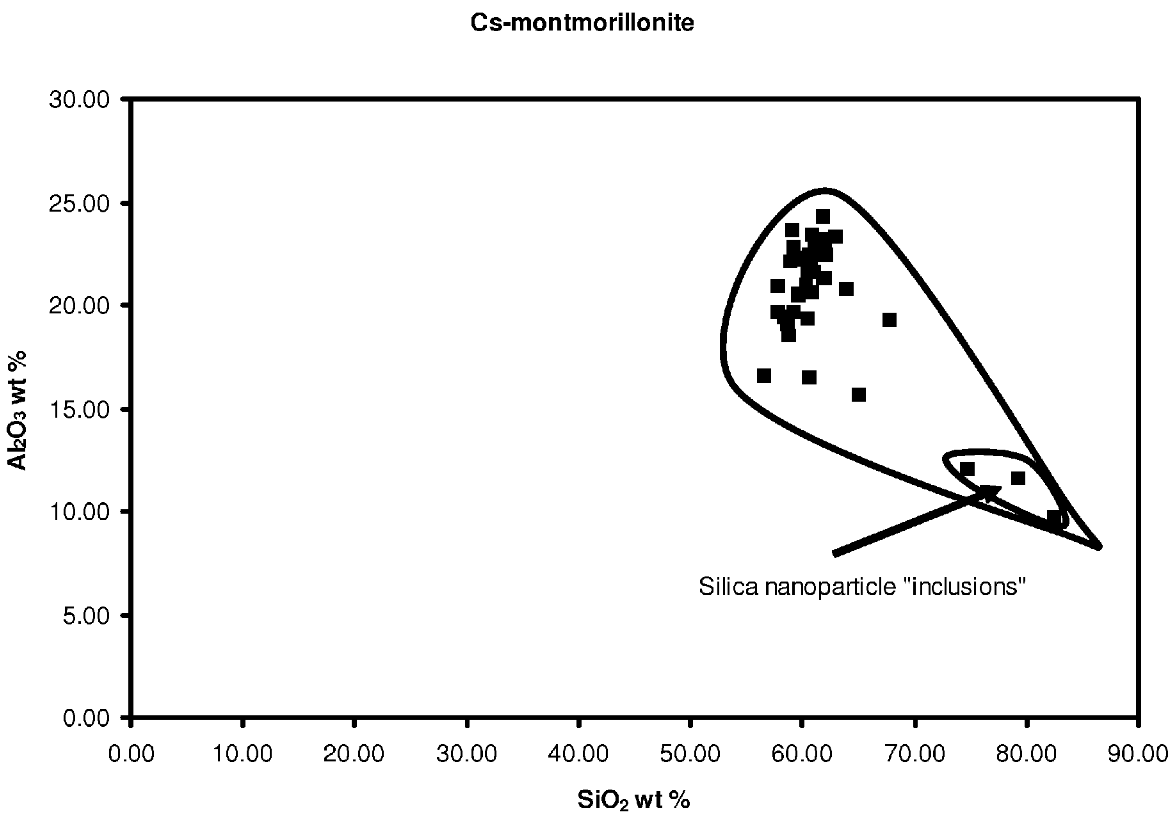
FIG. 46 shows a Cs-montmorillonite concentration plot between $Al_2O_3$ and $SiO_2$.
Figure 47:
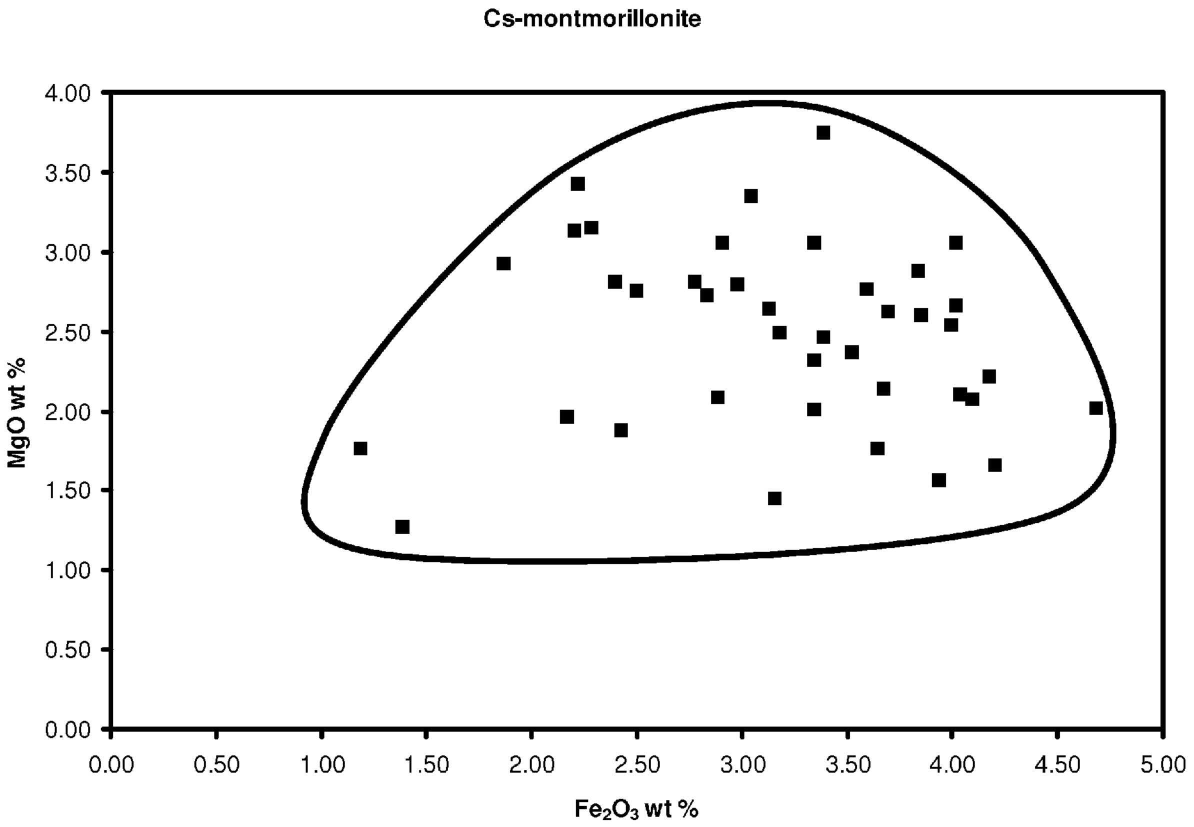
FIG. 47 shows a Cs-montmorillonite concentration plot between MgO and $Fe_2O_3$.
Figure 48:
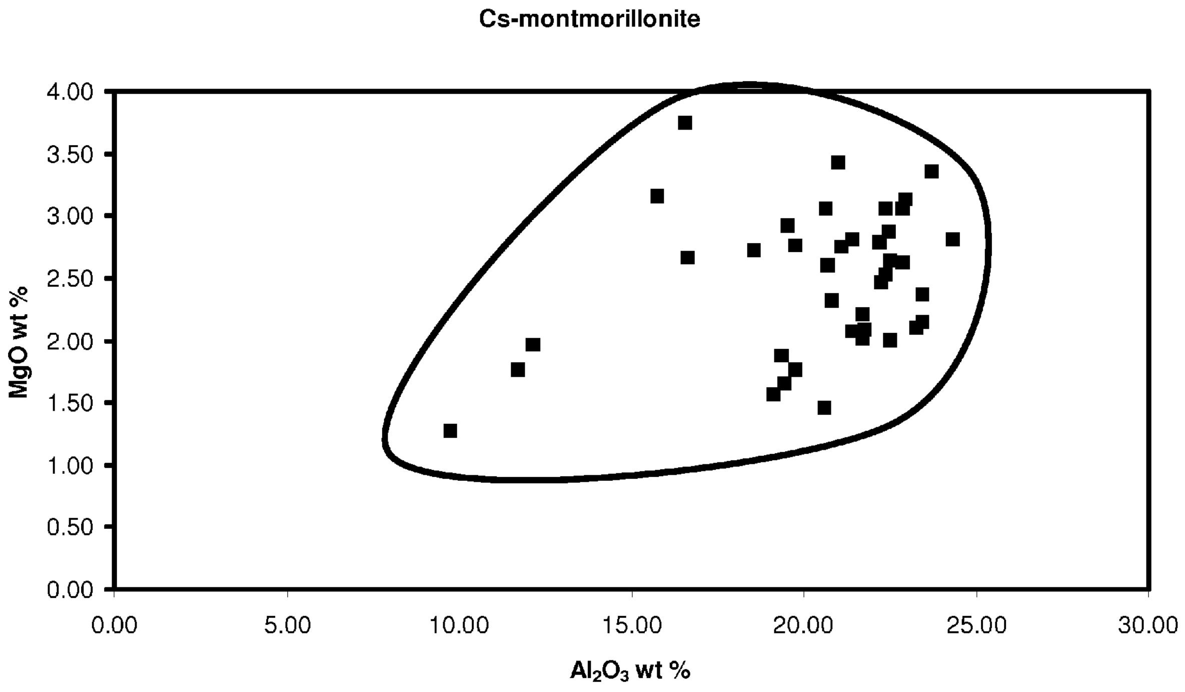
FIG. 48 shows a Cs-montmorillonite concentration plot between MgO and $Al_2O_3$.
Figure 49:
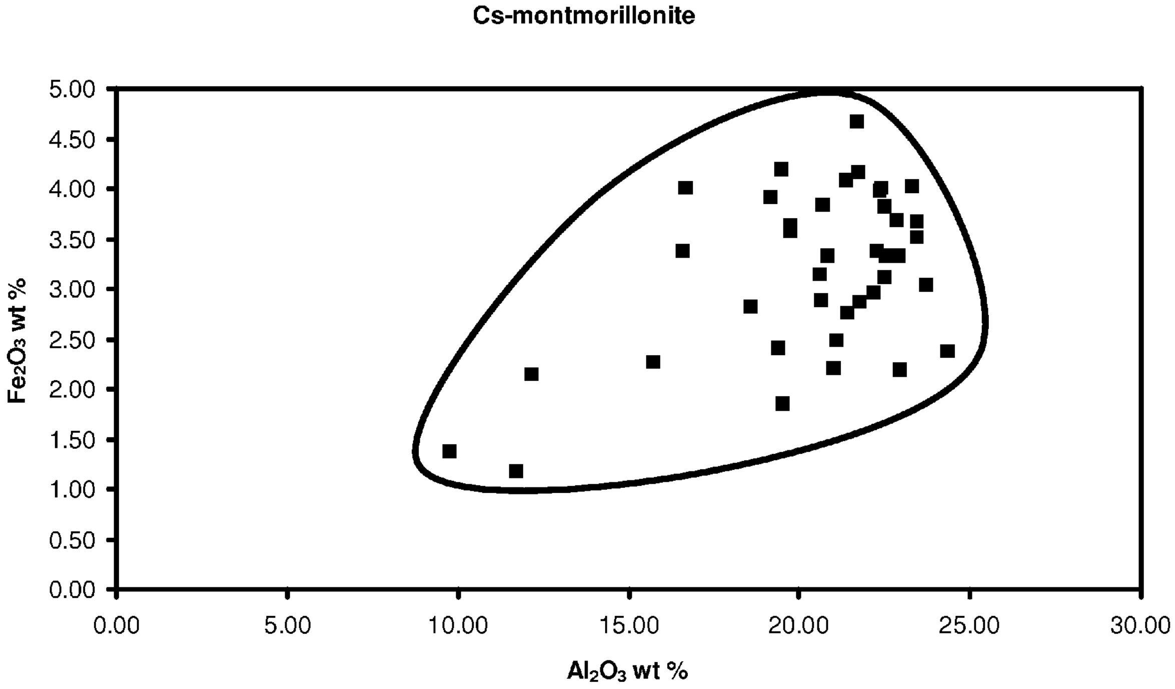
FIG. 49 shows a Cs-montmorillonite concentration plot between $Fe_2O_3$ and $Al_2O_3$.
Figure 50:
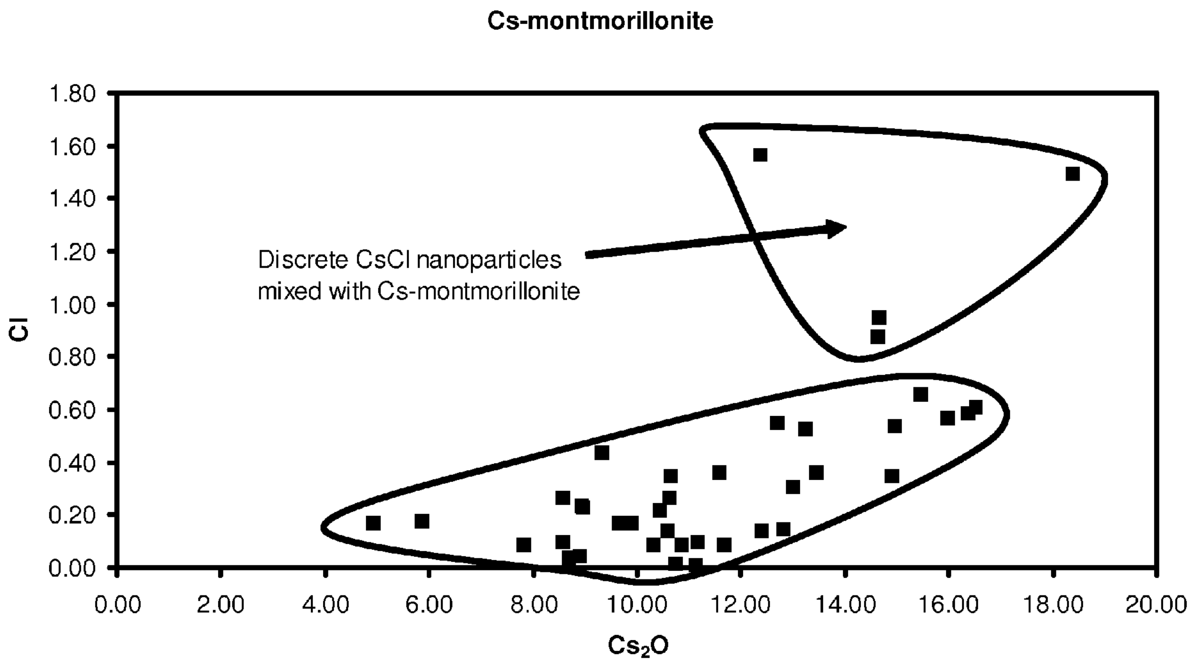
FIG. 50 shows a Cs-montmorillonite concentration plot between Cl and $Cs_2O$.

Each of the forty analyses of Cs-montmorillonite was analyzed for weight percentage of oxides using X-ray diffraction. For transmission electron microscopy investigation, grain mounts were prepared of the Cs-exchanged montmorillonite using alcohol as a dispersing medium. Analyses were prepared on 300 mesh hole carbon Cu grids. Analyses were investigated using a 300 kV JEM 3010 TEM and a 200 kV 2010 SEM. The weight percentages of oxides are shown in Tables 15-18. FIGS. 37-43 show images of observed Cs-montmorillonite, the product of the aqueous clay suspension applied to CsCl. FIGS. 44-45 show heated Cs-exchanged montmorillonited in solidified state. Plot concentrations of oxides from these tables are illustrated in FIGS. 46-50.

TABLE 15

| | Weight % of Oxides in Cs-montmorillonite Analyses 1-10 | | | | | | | | | |
|---|---|---|---|---|---|---|---|---|---|---|
| | 1 | 2 | 3 | 4 | 5 | 6 | 7 | 8 | 9 | 10 |
| $SiO_2$ | 59.18 | 61.74 | 67.68 | 58.64 | 56.55 | 59.09 | 59.34 | 62.90 | 60.69 | 60.83 |
| $Al_2O_3$ | 19.73 | 21.36 | 19.34 | 18.54 | 16.64 | 22.83 | 22.23 | 23.40 | 22.35 | 23.43 |
| $Fe_2O_3$ | 3.64 | 4.09 | 2.42 | 2.83 | 4.01 | 3.69 | 3.38 | 3.67 | 3.99 | 3.52 |
| MgO | 1.77 | 2.08 | 1.88 | 2.73 | 2.67 | 2.63 | 2.47 | 2.15 | 2.54 | 2.37 |
| CaO | 0.18 | 0.00 | 0.01 | 0.33 | 0.28 | 0.00 | 0.05 | 0.00 | 0.02 | 0.05 |
| $K_2O$ | 0.01 | 0.00 | 0.02 | 0.00 | 0.00 | 0.00 | 0.00 | 0.00 | 0.00 | 0.00 |
| $Cs_2O$ | 14.95 | 10.72 | 8.55 | 16.35 | 18.36 | 11.67 | 12.38 | 7.79 | 10.31 | 9.63 |
| Cl | 0.54 | 0.02 | 0.10 | 0.59 | 1.50 | 0.09 | 0.14 | 0.09 | 0.09 | 0.17 |
| Total | 100 | 100.01 | 100 | 100.01 | 100.01 | 100 | 99.99 | 100 | 99.99 | 100 |

TABLE 16

| | Weight % of Oxides in Cs-montmorillonite Analyses 11-20 | | | | | | | | | |
|---|---|---|---|---|---|---|---|---|---|---|
| | 11 | 12 | 13 | 14 | 15 | 16 | 17 | 18 | 19 | 20 |
| $SiO_2$ | 82.40 | 79.22 | 60.74 | 63.78 | 60.34 | 62.02 | 61.55 | 61.55 | 59.04 | 59.51 |
| $Al_2O_3$ | 9.74 | 11.67 | 20.65 | 20.80 | 19.43 | 22.50 | 23.26 | 22.46 | 23.70 | 20.61 |
| $Fe_2O_3$ | 1.38 | 1.18 | 3.85 | 3.34 | 4.20 | 3.34 | 4.03 | 3.83 | 3.04 | 2.90 |
| MgO | 1.28 | 1.77 | 2.61 | 2.33 | 1.66 | 2.01 | 2.11 | 2.88 | 3.36 | 3.06 |
| CaO | 0.00 | 0.15 | 0.02 | 0.00 | 0.44 | 0.09 | 0.09 | 0.10 | 0.00 | 0.14 |
| $K_2O$ | 0.11 | 0.00 | 0.20 | 0.00 | 0.02 | 0.00 | 0.00 | 0.00 | 0.00 | 0.00 |
| $Cs_2O$ | 4.91 | 5.84 | 11.56 | 9.31 | 12.34 | 9.88 | 8.90 | 8.95 | 10.59 | 13.42 |
| Cl | 0.17 | 0.18 | 0.36 | 0.44 | 1.57 | 0.17 | 0.05 | 0.23 | 0.27 | 0.36 |
| Total | 100.00 | 100.01 | 100.00 | 100.00 | 100.00 | 100.00 | 100.00 | 100.00 | 100.00 | 100.00 |

TABLE 17

| | Weight % of Oxides in Cs-montmorillonite Analyses 21-30 | | | | | | | | | |
|---|---|---|---|---|---|---|---|---|---|---|
| | 21 | 22 | 23 | 24 | 25 | 26 | 27 | 28 | 29 | 30 |
| $SiO_2$ | 59.51 | 60.33 | 60.92 | 60.45 | 61.89 | 61.72 | 58.83 | 59.59 | 57.72 | 59.53 |
| $Al_2O_3$ | 20.61 | 21.75 | 21.67 | 22.47 | 22.85 | 24.33 | 22.17 | 20.56 | 19.73 | 22.36 |
| $Fe_2O_3$ | 2.90 | 2.88 | 4.68 | 3.12 | 3.34 | 2.39 | 2.97 | 3.15 | 3.59 | 4.01 |
| MgO | 3.06 | 2.09 | 2.02 | 2.65 | 3.06 | 2.82 | 2.80 | 1.46 | 2.77 | 3.06 |
| CaO | 0.14 | 0.00 | 0.00 | 0.08 | 0.02 | 0.02 | 0.00 | 0.00 | 0.07 | 0.00 |
| $K_2O$ | 0.00 | 0.00 | 0.00 | 0.00 | 0.00 | 0.00 | 0.00 | 0.01 | 0.00 | 0.11 |
| $Cs_2O$ | 13.42 | 12.80 | 10.57 | 11.13 | 8.56 | 8.67 | 12.68 | 14.89 | 15.45 | 10.85 |
| Cl | 0.36 | 0.15 | 0.14 | 0.10 | 0.27 | 0.04 | 0.55 | 0.35 | 0.66 | 0.09 |
| Total | 100.00 | 100.00 | 100.00 | 100.00 | 99.99 | 100.00 | 100.00 | 100.00 | 100.00 | 100.00 |

TABLE 18

| | Weight % of Oxides in Cs-montmorillonite Analyses 31-40 | | | | | | | | | |
|---|---|---|---|---|---|---|---|---|---|---|
| | 31 | 32 | 33 | 34 | 35 | 36 | 37 | 38 | 39 | 40 |
| $SiO_2$ | 58.29 | 60.78 | 57.78 | 60.48 | 64.88 | 74.60 | 61.87 | 60.18 | 61.01 | 58.54 |
| $Al_2O_3$ | 19.50 | 21.68 | 20.96 | 16.54 | 15.72 | 12.12 | 21.37 | 21.07 | 22.93 | 19.13 |
| $Fe_2O_3$ | 1.86 | 4.17 | 2.21 | 3.38 | 2.28 | 2.16 | 2.77 | 2.49 | 2.20 | 3.93 |
| MgO | 2.93 | 2.22 | 3.43 | 3.75 | 3.16 | 1.97 | 2.82 | 2.76 | 3.14 | 1.57 |
| CaO | 0.25 | 0.02 | 0.00 | 0.35 | 0.23 | 0.00 | 0.20 | 0.17 | 0.00 | 0.02 |
| $K_2O$ | 0.05 | 0.00 | 0.05 | 0.00 | 0.00 | 0.00 | 0.00 | 0.04 | 0.07 | 0.29 |
| $Cs_2O$ | 16.50 | 11.12 | 14.63 | 14.61 | 13.21 | 8.92 | 10.62 | 12.99 | 10.43 | 15.95 |
| Cl | 0.61 | 0.01 | 0.95 | 0.88 | 0.53 | 0.24 | 0.35 | 0.31 | 0.22 | 0.57 |
| Total | 100.00 | 100.00 | 100.00 | 99.99 | 100.00 | 100.00 | 100.00 | 100.00 | 100.00 | 100.00 |

Figure 37:
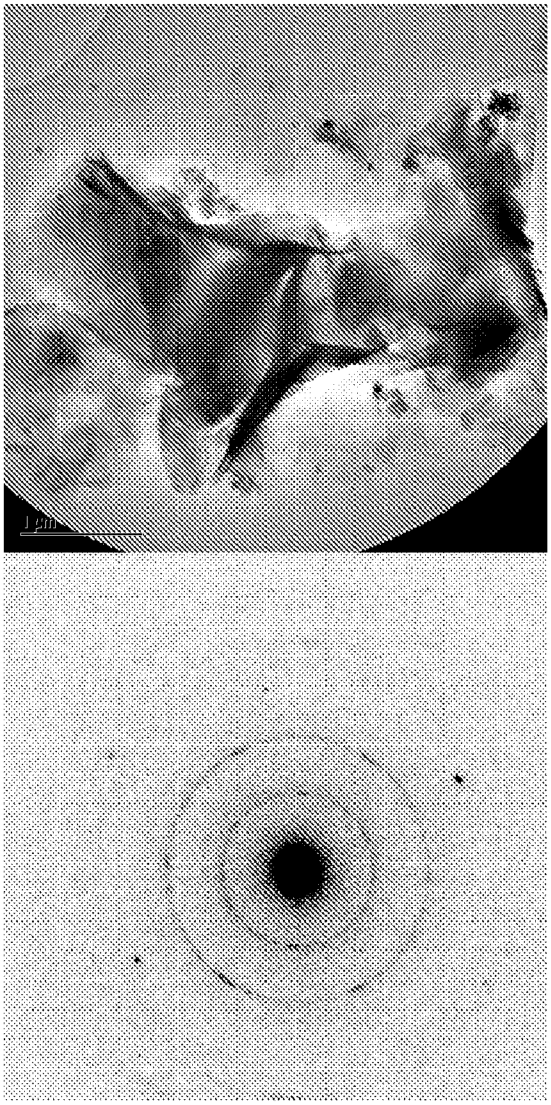
FIG. 37 shows a foliated lamellar aggregate with folded, curled, and straight edges of Cs-exchanged montmorillonite.

FIG. 37 shows foliated lamellar aggregate, center page, ~2.0 μm to ~2.5 μm, with folded, curled, and straight edges. Foliated lamellar aggregate, far right, are ~0.5 μm to ~2.0 μm. Subangular quartz fragments, ~0.05 μm to ~0.2 μm, are accumulated around particles. Aggregates are surrounded by subhedral platelets. Lower SAED pattern shows spots indicating increase in crystallinity.

Figure 38:
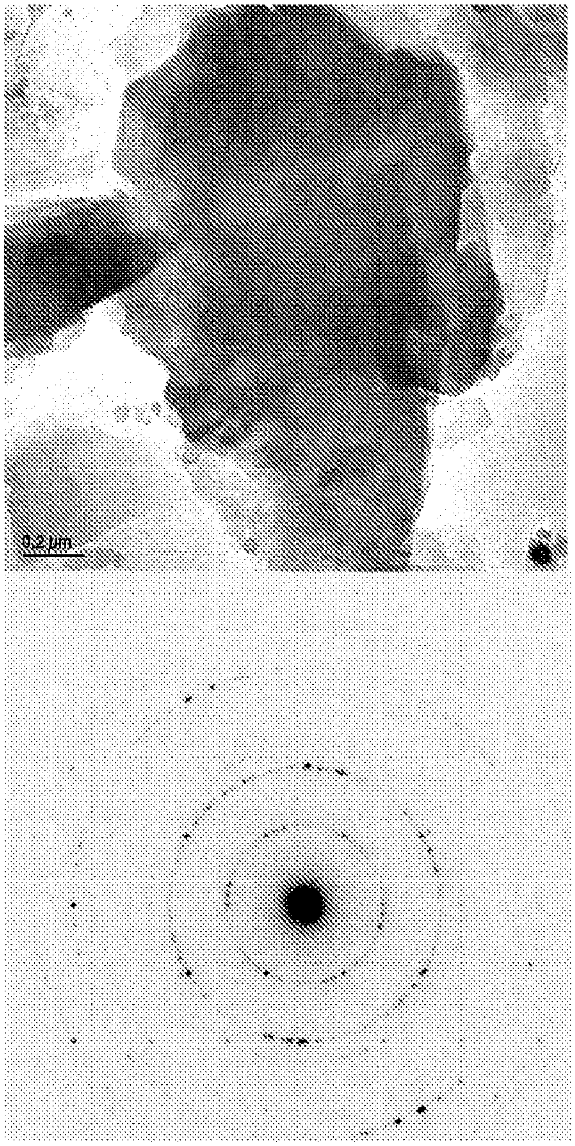
FIG. 38 shows two platy particles, where one is adjacent to a larger particle, of Cs-exchanged montmorillonite.

FIG. 38 shows platy particle, ~1.2 μm to ~2.0 μm, and a ~0.4 μm to ~0.6 μm platy particle adjacent to a larger particle. Quartz grains surround the platy particle, ~0.1 μm. Particles are surrounded by subhedral platelets. Lower SAED pattern shows spots indicating increase in crystallinity.

Figure 39:
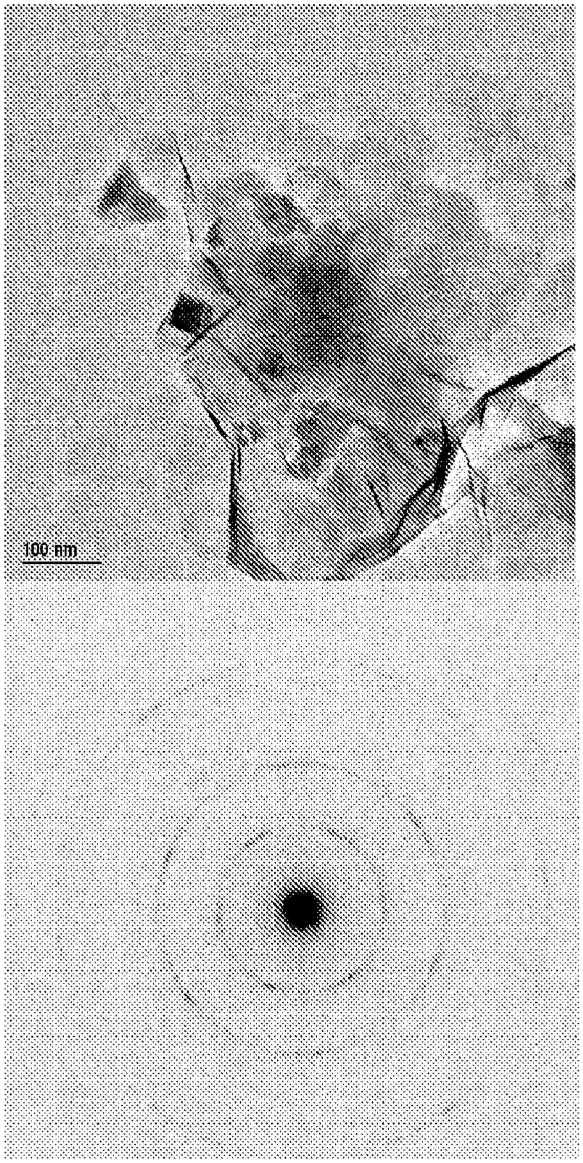
FIG. 39 shows foliated lamellar aggregates of Cs-exchanged montmorillonite.

FIG. 39 shows foliated lamellar aggregates, ~450 nm to ~600 nm. Particle edges are curled and folding occurs within main fragment. Quartz aggregates reside in particle, ~50 nm to ~100 nm. Rhombohedral grain, 50 nm, at left edge of particle. Lower SAED pattern shows spots indicating increase in crystallinity.

Figure 40:
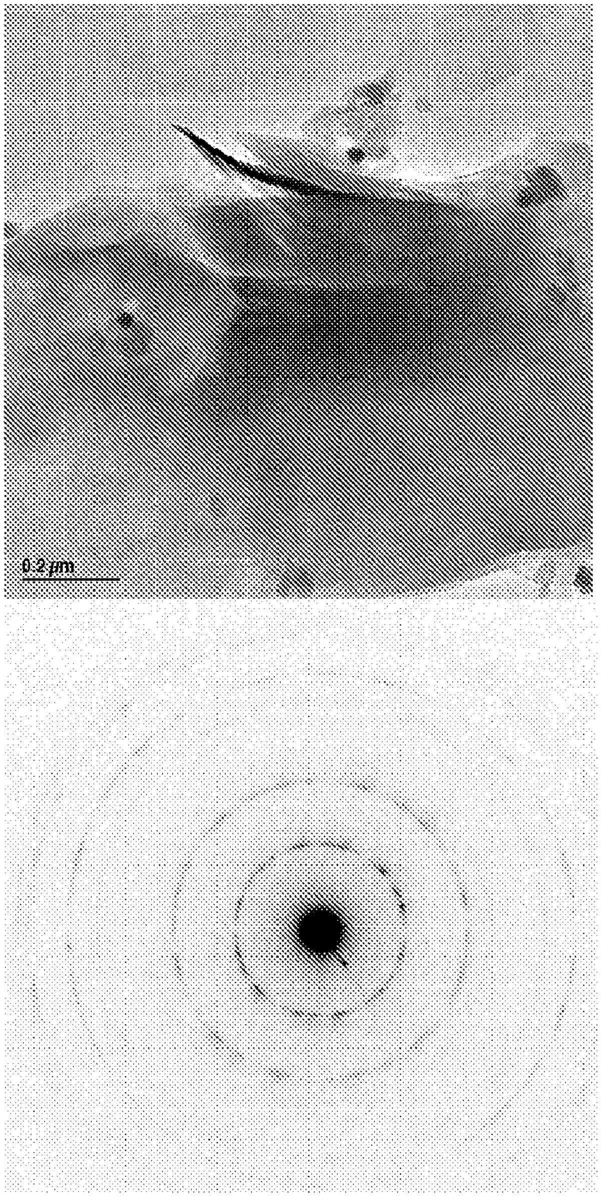
FIG. 40 shows a foliated lamellar aggregate with folding along the center edge of Cs-exchanged montmorillonite.

FIG. 40 shows foliated lamellar aggregate, ~1.0 μm to ~1.9+μm. Folding along the center edge of particle is ~0.6 μm. Quartz aggregates within particle are ~0.05 μm. Quartz aggregates outside of the particle are ~0.2 μm. Lower SAED pattern shows spots indicating increase in crystallinity.

Figure 41:
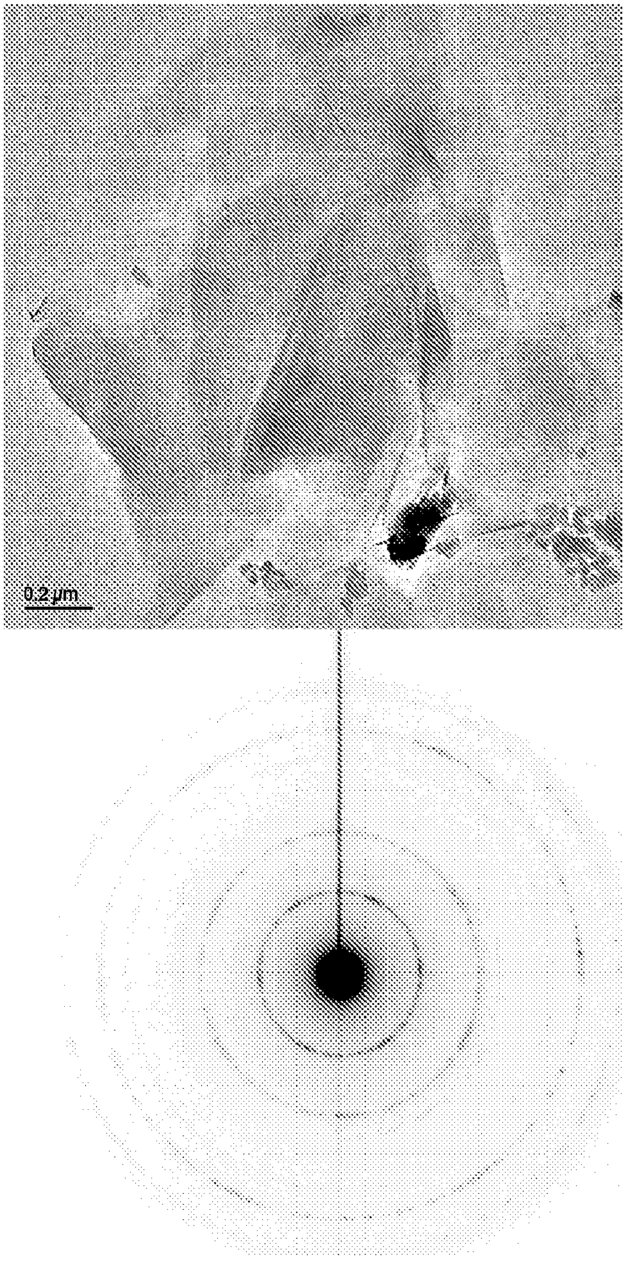
FIG. 41 shows a foliated lamellar aggregate with folding within the center and along the edges of Cs-exchanged montmorillonite.

FIG. 41 shows foliated lamellar aggregate, ~1.4 μm to ~2.0 μm. Folding within the center and along the edges of particle. Quartz aggregates gathered at lower portion of particle are ~0.1 μm to ~0.2 μm. Dark quartz aggregate is ~0.175 μm to ~0.3 μm. Lower SAED pattern shows spots indicating increase in crystallinity.

Figure 42:
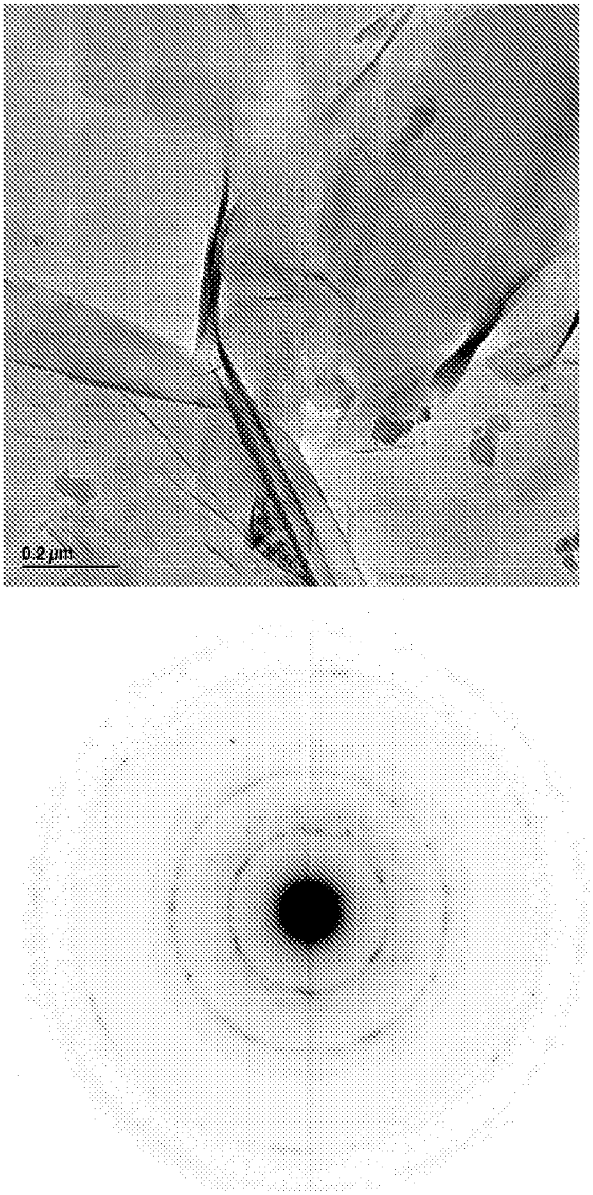
FIG. 42 shows two foliated lamellar aggregates as another embodiment of Cs-exchanged montmorillonite.

FIG. 42 shows two foliated lamellar aggregates, ~0.8 μm to ~1.2 μm, and ~1.6 μm to ~1.2 μm. Folding edges are illustrated between both particles. Quartz aggregates, ~0.1 μm. Lower SAED pattern shows spots indicating increase in crystallinity.

Figure 43:
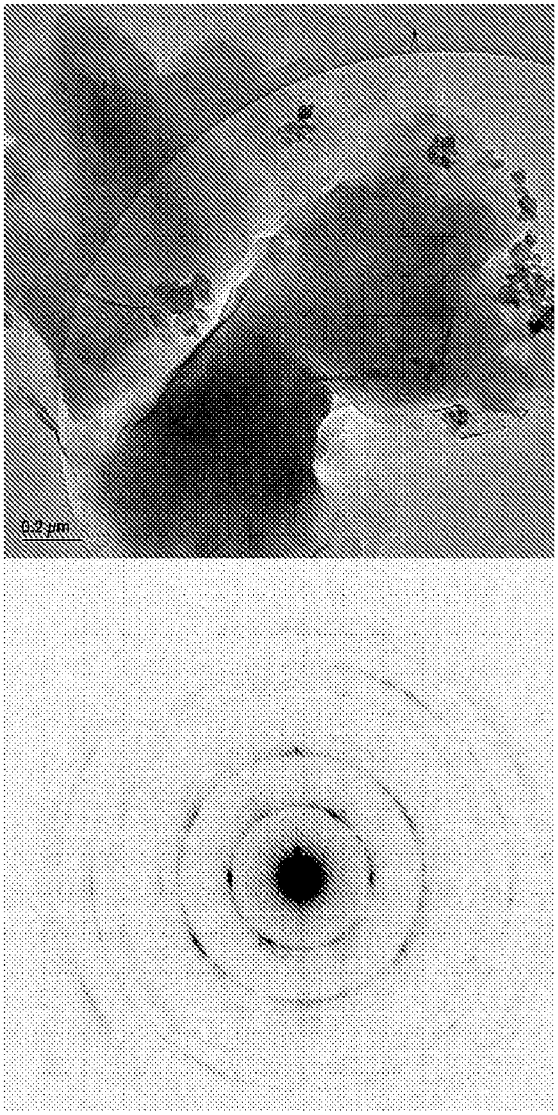
FIG. 43 shows two adjoining compact lamellar aggregates with curled edges of Cs-exchanged montmorillonite.

FIG. 43 shows two adjoining compact lamellar aggregates, ~0.7 μm to ~0.8 μm. Both particles have curled edges. Large compact lamellar aggregates are ~1.0 μm to ~1.4 μm. Quartz aggregates surround particles, ~0.1 m to ~0.2 μm. Lower SAED pattern shows spots indicating increase in crystallinity.

FIG. 44 shows an SEM image of heated Cs-exchanged montmorrillonite in solidified state. The solid mass is composed of interlocking particles. Large grains are biotite impurities.

FIG. 45 shows a higher magnification SEM image of heated Cs-exchanged montmorillonite in solidified state. Three types of particles are present—Cs-montmorillonite, intermediate rounded grains of Cs-illite, and euhedral crystals of Cs-illite.

D. pH of Na-montmorillonite

In addition to the data above, the pH of Na-montmorillonite was also measured. In forty different analyses, the pH values of several preparations of the aqueous clay suspension were measured directly using an accumet XL 15 pH meter. Each measurement took between 10 and 20 minutes to stabilize. The pH value gradually would climb from approximately 7 to final numbers obtained. A stable value was considered to be one that did not fluctuate for 3 minutes. Three measurements were made for each analysis. For each weight percent solid determination, the product was placed in aluminum dishes and heated at 120° C. for a minimum of 24 hours. The pH values varied from 8.60 to 9.42 with 9.21 being the average. The standard deviation is 0.19. Weight percent solids varied from 2.60 to 13.99 with 5.33 being the average. The standard deviation is 4.28. The data is shown in Tables 19-20.

Although the pH is elevated with respect to environmental waters, it is still comparatively low compared to many bases, and therefore is safe for building materials to which it would be applied. The pH range is also acceptable for short term human exposure.

TABLE 19 pH and mV of Na-montmorillonite

| | pH | | | | mV | | |
|---|---|---|---|---|---|---|---|
| Analysis | Trial 1 | Trial 2 | Trial 3 | Average | Trial 1 | Trial 2 | Trial 3 |
| 1 | 9.24 | 9.35 | 9.34 | 9.31 | −146.1 | −151.3 | −151.3 |
| 2 | 9.31 | 9.25 | 9.29 | 9.28 | −149.3 | −146.4 | −148.6 |
| 3 | 9.31 | 9.34 | 9.34 | 9.33 | −150.0 | −151.2 | −151.1 |
| 4 | 9.35 | 9.33 | 9.33 | 9.34 | −151.4 | −150.1 | −150.5 |
| 5 | 9.40 | 9.39 | 9.39 | 9.39 | −154.9 | −154.2 | −153.6 |
| 6 | 9.42 | 9.36 | 9.36 | 9.38 | −156.5 | −152.5 | −152.9 |
| 7 | 9.37 | 9.34 | 9.34 | 9.35 | −152.7 | −151.6 | −150.8 |
| 8 | 9.32 | 9.29 | 9.28 | 9.30 | −149.9 | −148.5 | −147.9 |
| 9 | 9.38 | 9.35 | 9.31 | 9.35 | −154.0 | −152.2 | −149.9 |
| 10 | 9.35 | 9.34 | 9.29 | 9.33 | −151.8 | −151.7 | −148.5 |
| 11 | 9.31 | 9.26 | 9.28 | 9.28 | −149.4 | −146.5 | −147.9 |
| 12 | 8.69 | 8.77 | 8.81 | 8.76 | −113.5 | −118.1 | −120.1 |
| 13 | 9.04 | 9.05 | 9.07 | 9.05 | −133.8 | −134.3 | −135.6 |
| 14 | 9.20 | 9.15 | 9.15 | 9.17 | −143.3 | −140.4 | −140.4 |
| 15 | 9.17 | 9.12 | 9.12 | 9.14 | −141.9 | −138.8 | −138.6 |
| 16 | 9.15 | 9.13 | 9.11 | 9.13 | −140.1 | −139.0 | −137.8 |
| 17 | 9.21 | 9.19 | 9.19 | 9.20 | −143.9 | −142.7 | −142.6 |
| 18 | 8.61 | 8.88 | 8.84 | 8.78 | −108.6 | −124.6 | −122.6 |
| 19 | 9.12 | 9.07 | 9.12 | 9.10 | −139.4 | −135.8 | −139.2 |
| 20 | 9.27 | 9.22 | 9.23 | 9.24 | −147.6 | −145.0 | −145.8 |
| 21 | 9.28 | 9.31 | 9.31 | 9.30 | −148.2 | −150.2 | −150.1 |
| 22 | 9.31 | 9.30 | 9.30 | 9.30 | −150.4 | −149.4 | −149.4 |
| 23 | 9.32 | 9.32 | 9.30 | 9.31 | −150.9 | −151.0 | −149.8 |
| 24 | 9.35 | 9.36 | 9.31 | 9.34 | −152.7 | −153.4 | −150.4 |
| 25 | 9.23 | 9.25 | 9.32 | 9.27 | −145.9 | −146.8 | −150.9 |
| 26 | 9.32 | 9.31 | 9.29 | 9.31 | −150.7 | −150.2 | −149.4 |
| 27 | 8.60 | 8.80 | 8.67 | 8.69 | −108.4 | −120.4 | −112.2 |
| 28 | 9.08 | 9.08 | 9.15 | 9.10 | −136.5 | −136.8 | −141.2 |
| 29 | 9.09 | 9.05 | 9.02 | 9.05 | −137.3 | −134.9 | −133.3 |
| 30 | 9.20 | 9.19 | 9.20 | 9.20 | −143.7 | −143.3 | −143.6 |
| 31 | 9.32 | 9.34 | 9.32 | 9.33 | −151.2 | −152.4 | −151.1 |
| 32 | 9.42 | 9.40 | 9.38 | 9.40 | −157.2 | −156.6 | −154.8 |
| 33 | 9.31 | 9.34 | 9.14 | 9.26 | −151.1 | −153.2 | −141.9 |
| 34 | 9.33 | 9.39 | 9.36 | 9.36 | −153.3 | −156.9 | −154.9 |
| 35 | 9.23 | 9.27 | 9.30 | 9.27 | −147.2 | −149.5 | −151.5 |
| 36 | 9.37 | 9.39 | 9.41 | 9.39 | −155.4 | −156.8 | −158.0 |
| 37 | 9.40 | 9.44 | 9.44 | 9.43 | −157.7 | −159.6 | −159.6 |
| 38 | 8.87 | 8.89 | 8.90 | 8.89 | −126.1 | −126.1 | −127.6 |
| 39 | 8.90 | 8.92 | 8.96 | 8.93 | −127.7 | −127.7 | −130.4 |
| 40 | 8.93 | 8.93 | 8.95 | 8.94 | −128.7 | −128.7 | −130.1 |
| Average | 9.20 | 9.21 | 9.21 | 9.21 | −144.0 | −144.5 | −144.1 |
| Maximum | 9.42 | 9.44 | 9.44 | 9.43 | −108.4 | −118.1 | −112.2 |
| Minimum | 8.60 | 8.77 | 8.67 | 8.69 | −157.7 | −159.6 | −159.6 |
| Std. Dev. | | 0.191 | | | | | |

TABLE 20

Temp (° C.) and Weight % Solid of Na-montmorillonite for the respective pH and mV values in Table 19

| | Temp (C.) | | | |
|---|---|---|---|---|
| Analysis | Trial 1 | Trial 2 | Trial 3 | % solid |
| 1 | 18.0 | 15.9 | 17.1 | 2.94 |
| 2 | 17.1 | 17.3 | 17.3 | 2.89 |
| 3 | 17.2 | 17.1 | 16.4 | 3.00 |
| 4 | 16.3 | 15.5 | 16.9 | 2.97 |
| 5 | 17.2 | 17.2 | 17.1 | 2.98 |
| 6 | 17.6 | 17.5 | 17.3 | 2.96 |
| 7 | 16.7 | 17.2 | 16.3 | 2.94 |
| 8 | 17.1 | 16.8 | 17.2 | 2.95 |
| 9 | 17.8 | 17.4 | 17.6 | 3.01 |
| 10 | 17.3 | 17.6 | 17.1 | 3.05 |
| 11 | 17.0 | 16.9 | 17.2 | 2.99 |

TABLE 20-continued

Temp (° C.) and Weight % Solid of Na-montmorillonite for the respective pH and mV values in Table 19

| | Temp (C.) | | | |
|---|---|---|---|---|
| Analysis | Trial 1 | Trial 2 | Trial 3 | % solid |
| 12 | 18.2 | 17.8 | 17.0 | 2.87 |
| 13 | 17.7 | 17.4 | 17.8 | 2.98 |
| 14 | 17.9 | 18.0 | 18.1 | 2.99 |
| 15 | 18.0 | 17.9 | 18.0 | 3.04 |
| 16 | 17.1 | 17.2 | 17.6 | 3.09 |
| 17 | 17.5 | 17.5 | 17.5 | 2.77 |
| 18 | 18.9 | 18.7 | 18.8 | 2.60 |
| 19 | 18.6 | 18.6 | 18.7 | 2.67 |
| 20 | 18.4 | 18.5 | 18.6 | 2.68 |
| 21 | 18.2 | 18.6 | 18.6 | 2.77 |
| 22 | 18.1 | 18.1 | 17.9 | 2.72 |
| 23 | 18.4 | 18.4 | 18.5 | 2.69 |
| 24 | 18.7 | 18.5 | 18.6 | 2.73 |
| 25 | 18.7 | 18.4 | 19.0 | 2.72 |
| 26 | 18.6 | 18.8 | 18.6 | 2.75 |
| 27 | 18.9 | 18.7 | 18.8 | 2.92 |
| 28 | 18.5 | 18.5 | 18.8 | 3.08 |
| 29 | 18.8 | 18.8 | 19.0 | 3.00 |
| 30 | 18.5 | 18.6 | 18.6 | 3.10 |
| 31 | 19.4 | 19.4 | 19.4 | 12.32 |
| 32 | 19.8 | 19.8 | 19.7 | 11.70 |
| 33 | 20.1 | 20.6 | 20.6 | 13.38 |
| 34 | 21.8 | 21.6 | 21.6 | 10.90 |
| 35 | 21.7 | 21.5 | 21.5 | 12.76 |
| 36 | 21.3 | 21.5 | 21.5 | 13.08 |
| 37 | 21.6 | 21.6 | 21.7 | 13.99 |
| 38 | 20.7 | 20.7 | 20.7 | 12.43 |
| 39 | 20.4 | 20.4 | 20.4 | 13.04 |
| 40 | 20.7 | 20.4 | 20.4 | 12.62 |
| | | | Average | 5.33 |
| | | | Maximum | 13.99 |
| | | | Minimum | 2.60 |
| | | | Std. Dev. | 4.288 |

E. Proving the Exchange of $Cs^{\pm}$

Transmission electron microscopy investigation of the aqueous clay suspension indicates that the material does indeed exchange with Cs and sequesters the cation. The crystallinity of the montmorillonite generally increases with the exchange of Cs into the structure. SAED data show that diffraction along [hk0] in Na-montmorillonite particles is heavily streaked as expected from the turbostratic stacking. However, the Cs-exchanged montmorillonite shows discrete spots along [hk0] in a pseudohexagonal net indicating a higher degree of crystallinity. The overall morphology of the particles does not appear to change significantly.

The foregoing descriptions of the embodiments of the invention have been presented for purposes of illustration and description. They are not intended to be exhaustive or be limiting to the precise forms disclosed, and obviously many modifications and variations are possible in light of the above teaching. The illustrated embodiments were chosen and described in order to best explain the principles of the invention and its practical application to thereby enable others skilled in the art to best utilize it in various embodiments and with various modifications as are suited to the particular use contemplated without departing from the spirit and scope of the invention. In fact, after reading the above description, it will be apparent to one skilled in the relevant art(s) how to implement the invention in alternative embodiments. Thus, the invention should not be limited by any of the above described example embodiments. For example, the invention may be practiced over environmental and/or biohazardous spills, water treatment plants, etc.

In addition, it should be understood that any figures, graphs, tables, examples, etc., which highlight the functionality and advantages of the invention, are presented for example purposes only. The architecture of the disclosed is sufficiently flexible and configurable, such that it may be utilized in ways other than that shown. For example, the steps listed in any flowchart may be reordered or only optionally used in some embodiments.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical invention of the application. The Abstract is not intended to be limiting as to the scope of the invention in any way.

Furthermore, it is the applicants' intent that only claims that include the express language "means for" or "step for" be interpreted under 35 U.S.C. §112, paragraph 6. Claims that do not expressly include the phrase "means for" or "step for" are not to be interpreted under 35 U.S.C. § 112, paragraph 6.

A portion of the invention of this patent document contains material which is subject to copyright protection. The copyright owner has no objection to the facsimile reproduction by anyone of the patent document or the patent invention, as it appears in the Patent and Trademark Office patent file or records, but otherwise reserves all copyright rights whatsoever.

What is claimed is:

1. A radionuclide containment composition for containing a radioactive material, the radionuclide containment composition comprising a mixture of a clay mineral and water, said mixture being refined by filtering said mixture with sieves to remove coarse material prior to its application on the radioactive material, and said clay mineral consisting of at least about 95% montmorillonite particles, with the remaining percentage consisting silica particles, wherein said montmorillonite particles comprise:

a. about 50% to about 75% foliated lamellar aggregates;

b. about 10% to about 30% subhedral platelets and compact subhedral lamellar aggregates; and c. about 5% to about 10% subhedral lamellar aggregates.

2. A process for making a radionuclide containment composition for containing a radioactive material comprising:

a. creating an aqueous clay suspension by mixing a clay mineral with water; and b. refining said aqueous clay suspension by filtering said aqueous clay suspension with sieves to remove coarse material prior to its application on the radioactive material; and wherein said clay mineral consists of at least about 95% montmorillonite particles, with the remaining percentage consisting silica particles; and wherein said montmorillonite particles comprise:

a. about 50% to about 75% foliated lamellar aggregates;

b. about 10% to about 30% subhedral platelets and compact subhedral lamellar aggregates; and c. about 5% to about 10% subhedral lamellar aggregates.

3. A method for removing radionuclides from a radioactive material comprising contacting said radioactive material with a radionuclide containment composition, allowing said radionuclides to be exchanged with said radionuclide containment composition, a. said contacting resulting in an aqueous slurry; and b. said radionuclide containment composition being an aqueous clay suspension comprising a filtered mixture of a clay mineral and water, wherein said clay mineral consists of at least about 95% montmorillonite particles, with the remaining percentage consisting silica particles; and wherein said montmorillonite particles comprise:

a. about 50% to about 75% foliated lamellar aggregates;

b. about 10% to about 30% subhedral platelets and compact subhedral lamellar aggregates; and c. about 5% to about 10% subhedral lamellar aggregates.

* * * * *